US006580497B1

United States Patent
Asaka et al.

(10) Patent No.: US 6,580,497 B1
(45) Date of Patent: Jun. 17, 2003

(54) COHERENT LASER RADAR APPARATUS AND RADAR/OPTICAL COMMUNICATION SYSTEM

(75) Inventors: Kimio Asaka, Tokyo (JP); Yoshihito Hirano, Tokyo (JP); Shusou Wadaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/579,462

(22) Filed: May 26, 2000

(30) Foreign Application Priority Data

| May 28, 1999 | (JP) | 11-149545 |
| May 28, 1999 | (JP) | 11-149546 |
| May 28, 1999 | (JP) | 11-149547 |

(51) Int. Cl.$^7$ .......................... G01S 17/10
(52) U.S. Cl. .......................... 356/28.5
(58) Field of Search ............... 356/4.07, 5.1, 356/5.15, 5.09, 28.05, 5.01; 359/341.5; 375/140

(56) References Cited

U.S. PATENT DOCUMENTS

| 4,856,893 A | * | 8/1989 | Breen ..................... 356/5 |
| 5,125,736 A | * | 6/1992 | Vaninetti et al. .......... 356/5 |
| 5,377,219 A | * | 12/1994 | Geiger ..................... 356/301 |
| 5,430,537 A | * | 7/1995 | Liessner et al. .......... 356/5.1 |
| 5,768,012 A | * | 6/1998 | Zanoni et al. ............ 359/341 |
| 5,835,199 A | * | 11/1998 | Phillips et al. ........... 356/5.03 |
| 5,847,817 A | * | 12/1998 | Zediker et al. ........... 356/5.09 |
| 6,163,372 A | * | 12/2000 | Sallee et al. ............. 356/5.1 |

OTHER PUBLICATIONS

Weik, Martin H., "Fiber Optics Standard Dictionary", Chapman & Hall, 1997.*

(List continued on next page.)

*Primary Examiner*—Thomas G. Black
*Assistant Examiner*—Deandra M. Hughes
(74) *Attorney, Agent, or Firm*—Birch, Stewart, Kolasch & Birch, LLP

(57) ABSTRACT

In a coherent CW laser radar apparatus, a soft target such as rain, fog, and air turbulence can be detected by using a CW laser. The coherent CW laser radar apparatus is arbandd by comprising: as an optical component, a CW laser oscillating a laser radiation having a single wavelength; a dividing means for dividing laser radiation derived from the CW laser; an optical modulator for modulating one of the laser radiation divided by the dividing means; an optical antenna for projecting the modulated laser radiation as transmitted radiation toward a target, and also for receiving scattered radiation from the target as received radiation; combining means for combining the other of the laser radiation divided by the dividing means as local radiation with the received radiation received from the optical antenna; and a photodetector for optical-heterodyne-detecting the combined radiation. Also, this coherent CW laser radar apparatus is further arbandd by employing: as an electric component, a pseudo-random modulation signal generator for supplying a pseudo-random modulation signal to the optical modulator; a variable delay device for time-delaying a portion of the pseudo-random modulation signal generated from the pseudo-random modulation signal generator; a correlating device for multiplying the output signal of the photodetector by the pseudo-random modulation signal time-delayed by the variable delay device; and signal processing means for acquiring physical information such as a distance of the target and a velocity of the target based upon a intensity and a frequency of the output signal from the correlating device, and also the delay time set by the variable delay device. In this radar apparatus, an optical path between the optical components is constituted by an optical fiber.

20 Claims, 29 Drawing Sheets

OTHER PUBLICATIONS

Timofeev et al., "High spectral purity millimetre–wave modulated optical signal generation using fibre grating laser", Electronics Letters, Apr. $2^{nd}$, 1998, vol. 34, No. 7, pp. 668–669.*

Myslinski et al., "Applications of Rare–Earth–Doped Fibres", IEEE 1993, pp. 290–294.*

Bjarklev, Anders, "Optical Fiber Amplifiers: Design and System Applications", Artech House, 1993, pp. 40–42.*

Sumiyoshi et al, "High–Power continuous–ave cascade–oscillation at 3 micrometers and 2 micrometers with a holmium–doped fiber laser pumped bya fiber Raman laser", LEOS '98, Dec. 1–4, 1998, pp. 51–52.*

Holmes et al., Dept. of Elec. Engineering and App. Phys., pp. 10–13 'Path Resolved Doppler Wind Measurement System Using a Coherent, CW, Pseudo–Random Code Modulated $CO_2$ Lidar', 1999.

* cited by examiner

MODULATION EXAMPLE td=tr

|td−tr| > τ

SIGNAL INTENSITY

SEQUENCE LENGTH OF PSEUDO-RANDOM MODULATION

SIGNAL INTENSITY

SEQUENCE LENGTH OF PSEUDO-RANDOM MODULATION

SIGNAL INTENSITY

SEQUENCE NUMBER LENGTH OF PSEUDO-RANDOM MODULATION SIGNAL

COHERENT LASER RADAR APPARATUS AND RADAR/OPTICAL COMMUNICATION SYSTEM

BACKGROUND OF THE INVENTION

1. Field of the Invention

The present invention generally relates to a laser radar apparatus. More specifically, the present invention is directed to a coherent laser radar apparatus capable of measuring physical information such as a distance of a target, a target velocity, a density distribution of a target, and a velocity of a target, while using as a light source a laser oscillated with having a single wavelength, for instance, is directed to such a coherent laser radar apparatus in which transmitted radiation is modulated by a pseudo-random sequence (PN code), while employing a CW laser radiation source oscillated with having a single wavelength. Furthermore, the present invention is related to a compact/highly reliable coherent laser radar apparatus mounted on a mobile object such as an aircraft and a vehicle. Also, the present invention is related to a system constituted by integrating an optical space communication apparatus with a coherent laser radar apparatus.

2. Description of the Related Art

There are various coherent laser radar apparatus using light waves (lasers) and also pulse Doppler radars with employment of microwaves and millimeter-waves, which may function as apparatuses designed to measure various physical information such as distances, velocities, density distributions, velocity distributions as to targets. Among these radar apparatuses, the pulse Doppler radars are capable of measuring targets over wide bands and also over long distances, whereas the coherent laser radar apparatuses are capable of realizing both high spatial resolution and high speed resolution, due to differences in frequencies under use. There is such a definition as to a target. That is, a single target which owns a certain dimension and also a boundary surface functioning as a reflection surface and a scattering surface is referred to as a "hard target", for instance, an aircraft and a vehicle. Also, in such a case that scattered radiation is synthesized with each other to constitute received radiation and this scattered radiation is derived from a large number of very fine scattering members which are distributed in a certain space, this spatially distributed target is referred to as a "soft target".

While measuring soft targets such as a wind velocity and a wind velocity distribution, a pulse Doppler radar measures a Doppler shift of an echo of a scattering object mainly including particles of rain droplets, fog, cloud in the atmosphere, and then acquires a wind velocity. As a result, in fine weather where no particles of rain droplets, fog, and cloud are present in the atmosphere, echoes having sufficiently large intensitys cannot be acquired. Therefore, there is such a drawback that the pulse Doppler radars cannot measure clean-air turbulence.

Since a coherent laser radar apparatus with employment of laser radiation may acquire a sufficiently high scattering intensity even from aerosol in the atmosphere, this laser radar apparatus may measure a wind velocity and a wind velocity distribution even in fine weather. As a result, such a coherent laser radar apparatus may be expected as an obstacle sensing apparatus capable of sensing various obstacles including air turbulence, which may be mounted on an aircraft, or in an airport.

As a coherent laser radar apparatus, there are a radar apparatus in which a pulse laser oscillated having a single frequency is employed as a light source, and another radar apparatus in which a CW laser is employed as a light source.

FIG. 29 schematically shows a structural diagram of a coherent laser radar apparatus in which the injection-seeded pulsed laser apparatus is employed a light source, which is disclosed in U.S. Pat. No. No. 5,237,331 issued to Sammy W. Henderson at al.

In FIG. 29, reference numeral 1 shows a laser radiation source oscillated having a single frequency, reference numeral 2 indicates a first optical dividing device, reference numeral 3 represents a frequency shifter, reference numeral 4 is an injection-seeded pulsed laser, reference number 5 shows a beam splitter, reference numeral 6 indicates a ¼ wavelength plate, reference numeral 7 denotes a transceiver optics, reference numeral 8 represents a scanning optics, reference numeral 9 indicates a first combining device, and reference numeral 10 shows a first photodetector. Also, reference numeral 11 is a second optical dividing device, reference numeral 12 shows a third optical dividing device, reference numeral 13 is a second combining device, reference numeral 14 is a second photodetector, reference numeral 15 shows an A/D converter, reference numeral 16 represents a signal processing apparatus, reference numeral 17 shows an adjusting mechanism constructed of a piezo-electric transducer of a resonator length of the injection-seeded pulse laser 4, reference numeral 18 shows a control circuit of the adjusting mechanism, reference numeral 19 shows laser radiation emitted from the laser radiation source 1, and reference numeral 20 denotes seed light. Also, reference numeral 21 indicates pulse laser radiation, reference numeral 22 is an optical axis of the transmitted/resceived radiation, reference numeral 23 shows transmitted radiation, reference numeral 24 represents received radiation, reference numeral 25 shows local radiation, and furthermore, reference numeral 26 shows mixture light made by combining the received radiation 24 with the local radiation 25.

Next, operations will now be made.

The laser radiation 19 supplied from the laser radiation source 1 oscillated having a single wavelength "$f_0$" is subdivided by the first optical dividing device 2 into two laser radiations. One laser radiation is employed as the local radiation 25, and the other laser radiation is shifted by the frequency shifter 3 by a frequency "$f_{IF}$" to become such laser radiation whose frequency is increased only by this frequency $f_{IF}$. This frequency-shifted laser radiation is supplied as the seed radiation 20 to the injection-seeded pulsed laser 4. The injection-seeded pulsed laser 4 oscillates a laser pulse having a single frequency (single wavelength) in an axial mode having such a frequency located at the nearest frequency of the seed radiation 20.

Since the laser pulse radiation 21 emitted from the injection-seeded laser pulse 4 is linear-polarized, this laser pulse radiation 21 is reflected by the beam splitter 5. After this reflected laser pulse radiation is converted into the circular-polarized laser radiation by the ¼ wavelength plate 6, this circular-polarized laser radiation is traveled through both the transceiver optics 7 and the scanning optics 8, and then is projected toward the target. The scattering radiation originated from the target is received via such an optical path opposite to the above-explained optical path of the transmitted radiation.

The received radiation 24 is traveled via both the scanning optics 8 and the transceiver optics 7, and then, is processed by the ¼ wavelength plate 6 to become linear-polarized laser radiation which is shifted by 90 degrees with respect to the polarizing plane of the laser pulse radiation 21. Then, the linear-polarized laser radiation passes through the beam splitter 5 so as to be conducted to the first combining device 9. In the first combining device 9, the received radiation 24 is mixed with the local radiation 25. The combined radiation 26 is coherent-detected in the first photodetector 10. The signal detected by the first photodetector 10 is sampled by the A/D converter 15, and the signal processing apparatus 16 extracts the distance of the target from the temporal waveform of the intensity signal, and also extracts the velocity of the target from the Doppler signal.

As previously explained, since the injection-seeded pulse laser 4 oscillates the pulse having the single frequency in the axial mode having such a frequency located at the nearest frequency of the seed light 20, a difference between the frequency of the pulse laser radiation 21 and the frequency of the local radiation 25 must be monitored in order to obtain the accurate Doppler signal. To this end, a portion of the pulse laser radiation 21 and a portion of the local radiation 25 are derived by the second optical branch 11 and the third optical branch 12. After the derived light portions are mixed with each other by the second optical combining device 13, the combined radiation is coherent-detected by the second photodetector 14. Similar to the received radiation, the detected laser radiation is sampled by the A/D converter 15 so as to calculate a. frequency difference between the pulse laser radiation 21 and the local radiation 25 by the signal processing apparatus 16. Assuming now that the frequency of the local radiation 25 is selected to be "$f_O$", the respective frequencies "$f_S$", "$f_T$", "$f_R$", "$f_M$", and "$f_{sig}$" of the seed light, the pulse laser radiation, the received radiation, the frequency monitor signal, and the recept on signal are expressed by the following formulae:

$$f_s = f_O + f_{IF}$$

$$f_T = f_s + \Delta f$$

$$f_R = f_T + f_d$$

$$f_M = f_{IF} + \Delta f$$

$$f_{sig} = f_M + f_d$$

In the formulae, symbol "$\Delta f$" indicates the frequency difference between the laser pulse radiation and the seed light, and symbol "$f_d$" shows the Doppler frequency of the target. Since the difference between the reception signal "$f_{sig}$" and the frequency monitor signal "$f_M$" is calculated, the Doppler frequency "$f_d$" of the target can be acquired.

To realize the injection seeding operation under stable condition, the resonator length of the pulsed laser 4 is adjusted by the adjusting mechanism 17 made of the piezoelectric transducer element. This adjusting mechanism 17 constructed of the piezoelectric transducer element is controlled by the control circuit 18. The signal processing apparatus 16 supplies the value of "$\Delta f$" obtained from the monitor signal for the frequency difference between the laser pulse radiation 21 and the local radiation 25 to the control circuit 18. Under control of the control circuit 18, the resonator length of the pulsed laser 4 is adjusted by the adjusting mechanism 17 constructed of the piezoelectric transducer element in order that the value of "$\Delta f$" becomes smaller than or equal to the set value, or otherwise becomes zero.

As previously explained, the pulse laser radiation oscillated in a single mode (single wavelength) can be obtained under stable condition.

In the coherent laser radar apparatus by employing the pulse laser, two sets of lasers are required, namely both the pulsed laser and the CW laser functioning as the local radiation source are needed. Also, in order to obtain such a pulse width larger than or equal to several hundreds ns in the pulsed laser, the resonator length is longer than or equal to 1 m, and also since the high speed switching operation is carried out in the Q switching operation, the electromagnetic noise is produced. This fact may cause the drawback when this coherent laser radar apparatus is used in the field of the aircraft mount type radar apparatus which necessarily requires the compact, highly reliable, and low electromagnetic noise characteristics.

A coherent laser radar apparatus in which a coherent CW laser is employed in a light source can solve the above-explained drawback of the coherent laser radar apparatus with employment of the pulsed laser, and also may probably realize both an arbitrary distance resolution and a velocity resolution by modulating transmitted radiation.

FIG. 30 is a structural diagram for indicating such a coherent CW laser radar apparatus in which the CW laser oscillating a laser radiation having a single wavelength is employed as the light source, as disclosed in Japanese Patent Application Laid-open No. Hei 2-284087 field by HIRANO et al.

In the arrangement shown in FIG. 30, the laser radiation emitted from the CW laser oscillator 31, having a single wavelength is subdivided into two sets of the laser radiation by the optical distributor 32. One of the subdivided laser radiation is modulated by the optical modulator 34 which performs the modulating operation based upon the pseudo-random modulation signal generated by the sequence generator 33. The optically modulated laser radiation is propagated via the pollarizer 35 and the ¼-wavelength plate 36, and then is projected from the transceiver optics 37 toward the target 39 as the transmitted radiation 38. The transmitted radiation 38 is scattered, or reflected by the target 39. Then, a portion of either the scattered radiation or the reflection light is received by the transceiver optics 37 as the received radiation 40. The received received radiation 40 is propagated via the ¼-wavelength plate 36, and then, is separated from the transmitted radiation 38 in the polarizer 35 to be conducted to the wavelength division multiplexer 41.

The other laser radiation which is emitted from the laser oscillator 31 and then is subdivided by the optical distributor 32 is employed as the local radiation used in the optical heterodyne detection. The local radiation is propagated via the reflection mirror 42 to the frequency shifter 43, and then the optical frequency of this local radiation is shifted by the intermediate frequency "$f_{IF}$". Thereafter, the frequency-shifted local radiation is processed by the ½-wavelength plate 44 in such a manner that the polarization plane of this local radiation is rotated so as to make this polarization plane coincident with the polarization surface of the received radiation 40 in the second optical separator 41. Then, the resulting local radiation is combined with the received radiation 40 in the second optical separator 41. The combined radiation between the local radiation and the received radiation 40 is optical-heterodyne-detected in the PD45 corresponding to the photodetector. The reception signal supplied from the PD45 is amplified by the amplifier 46, and then, the amplified reception signal is supplied via the band-pass filter 47 to the correlating device 48.

In the correlating device 48, the reception signal is multiplied by the pseudo-random modulation signal to acquire the correlation. This pseudo-random modulation signal is produced by modulating the transmitted radiation to which arbitrary delay time $t_d$ is applied by the variable delay circuit 28. When the target 39 is such a hard target having a sufficiently high reflectance, a peak value of output power from the correlating device 48 may be obtained by the power measuring device 49 in such a case that the reciprocation time "$t_r$" of the received radiation up to this hard target 39 becomes equal to the delay time "$t_d$". Assuming now that the Doppler frequency of the received radiation while the target is moved is selected to be "$f_d$", a frequency difference of ($f_{IF}-f_d$) is acquired as the output frequency of the correlating device 48 by the frequency discriminator 26.

As a consequence, since the delay time $t_d$ is swept by the control apparatus 27 over the measuring area, the distance information of the target may be acquired from the power measuring device 49, and also the velocity information of the target may be acquired from the frequency discriminator 26.

As previously explained, the coherent laser radar apparatus with employment of the pulsed laser, as shown in FIG. 29, owns the following drawbacks. That is to say, two sets of lasers are required, namely both the pulsed laser and the CW laser functioning as the local radiation source are needed. Also, the resonator length of pulsed laser longer than or equal to 1 m, making the apparatus large. Further, since the high speed switching operation is carried out in the Q switching operation, the electromagnetic noise is produced. In addition, since the laser pulse having the high peak power is employed, there are other drawbacks that the reliabilities as to the optical components are lower than the reliability of the CW laser radiation, and the laser radiation is traveled within the apparatus by way of the space propagation manner. This fact may cause the drawback when this coherent laser radar apparatus is used in the field of the aircraft mount type radar apparatus that necessarily requires the compact, highly reliable, and low electromagnetic noise characteristics.

Also, as shown in FIG. 30, the laser radar apparatus in which while the CW laser apparatus is employed, the modulating operation is carried out by using the pseudo-random signal, owns the below-mentioned drawbacks:

(1). The signal light is traveled within this laser radar apparatus by way of the space propagation manner. In the optical heterodyne detection, the wave front of the received radiation must be made coincident with the wave front of the local radiation on the photodetector. In order to acquire the reception signal under stable condition, a large number of optical elements provided in the optical path are required to be fixed in such a manner that these optical elements can have high rigidness and this high rigidness is not varied. As a consequence, the laser radar apparatus becomes complex and the reliability thereof is lowered. Furthermore, the spatial free degrees of this laser radar apparatus are restricted when this laser radar apparatus is mounted on the mobile object such as an aircraft.

(2). Since the CW laser radiation source oscillating a laser radiation having a single wavelength is constructed of a solid-state laser, output power of this solid-state laser is not so high, namely on the order of several tens of mW to several hundreds of mW, so that a sufficiently high S/N ratio cannot be obtained.

(3). The monitoring time during which the S/N ratio can be improved in a linear manner is restricted by both the line width of the CW laser radiation source and the frequency dispersion given to the reception signal based on the target. The maximum monitoring time is equal to approximately the inverse number thereof. Since the line width of the CW laser radiation source oscillated, having a single wavelength is equal to several KHz, the accumulation time by the correlating process operation is limited to less than 1 ms. As a result, even when the accumulation time is prolonged, the higher S/N ratio cannot be obtained.

(4). In such a case that the reflected/scattered radiation (internal reflection light) occurred in the window formed in the transceiver optics, or the mobile object housing is larger than the signal received from the target, even when the spread spectrum process operation is carried out as the non-correlative component by the pseudo-random modulating manner, the spectrum intensity cannot be made sufficiently higher than the peak intensity of the target, and therefore, the high S/N ratio measurement cannot be carried out.

(5). In order to obtain the velocity distribution, the delay time "$t_d$" must be swept, so that both the variable delay device and the control circuit thereof are required.

Furthermore, in such a system that the coherent laser radar apparatus is mixed with the optical space communication apparatus, two sets of plural optical systems and also two sets of optical components are necessarily provided. As a consequence, the entire apparatus is made complex, resulting in another drawback.

FIG. 31 indicates the laser radar apparatus disclosed in Japanese Examined Patent Publication No. Sho 64-2903 filed by TAKEUCHI et al., which corresponds to such a laser radar apparatus capable of acquiring the distance information of the target by modulating the transmitted radiation by the pseudo-random signal by employing the CW laser in the optical light source.

In FIG. 31, reference numeral 1 shows a transmission unit, reference numeral 2 indicates a reception unit, reference numeral 3 represents a transmitter optics, and reference numeral 4 denotes a receiver optics. The transmission unit 1 is arranged by the laser oscillator 5 for oscillating CW light, the modulator 6, and the sequence generator 7 for generating the pseudo-random signal (for example, M sequence and Barker Number series). Also, the reception unit 2 is arranged by the photodetector 8, the delay correlator 9, and the display recording unit 10.

Next, a description will now be made of operations of the laser radar apparatus with the arbandment shown in the drawing.

The CW laser radiation oscillated from the laser oscillator 5 is modulated by the pseudo-random signal (one sequence length=M bits, and time width per 1 bit=τ) generated from the sequence generator 7, and then the modulated CW light is projected as the transmitted radiation from the transmitter optics 3 into the atmosphere. It is now assumed that a distance over which a ratio is changed from 0 to plus is set as Rm. At this ratio, the transmitted radiation is included in the field of the receiver optics 4. This distance Rm corresponds to the minimum measuring distance of this laser radar apparatus, and therefore, this laser radar apparatus can measure such a target located further than this distance Rm.

The reflection radiation reflected from the target is received by the receiver optics 4, is detected by the photodetector 8, and then is converted into the electric signal. This reception signal is recorded, and then, the delay correcting device 9 performs the correlating process operation is such a manner that this recorded reception signal is multiplied by the pseudo-random signal derived from the sequence generator 7 and multiplied by the time delay $t_d$. Since this delay time $t_d$ is adjusted, the information of the reflection intensity of such a distance that the reciprocation time $t_r$ of the received radiation is made equal to the delay time $t_d$ can be measured based on the distance resolution c τ/2 (symbol "c"

indicates light velocity). As a result, since the delay time $t_d$ is swept within the measurement region, when the target is a hard target, a position of this hard target can be measured, whereas when the target is a soft target, a spatial distribution of this soft target can be measured.

While the CW laser oscillating a laser radiation having a single frequency is employed as the light source, since the heterodyne detection is carried out in the reception unit, the Doppler shift amount of the target is detected, so that not only the distance information of the target, but also the velocity information thereof can be acquired.

A coherent laser radar apparatus in which a coherent CW laser is employed in a light source can solve the above-explained drawback of the coherent laser radar apparatus with employment of the pulsed laser, and also may probably realize both an arbitrary distance resolution and a velocity resolution by modulating transmitted radiation.

FIG. 32 is a structural diagram for indicating such a coherent CW laser radar apparatus in which the CW laser oscillating a laser radiation having a single wavelength is employed as the light source, as disclosed in Japanese Patent Application Laid-open No. Hei 2-284087 filed by HIRANO et al.

In the arbandment shown in FIG. 32, the laser radiation emitted from the CW laser oscillator 31, having a single wavelength is subdivided into two sets of the laser radiation by the optical distributor 32. One of the subdivided laser radiation is modulated by the optical modulator 34 which performs the modulating operation based upon the pseudo-random modulation signal generated by the sequence generator 33. The optically modulated laser radiation is propagated via the polarizer 35 and the ¼-wavelength plate 36, and then is projected from the transceiver optics 37 toward the target 39 as the transmitted radiation 38. The transmitted radiation 38 is scattered, or reflected by the target 39. Then, a portion of either the scattered radiation or the reflection radiation is received by the transceiver optics 37 as the received radiation 40. The received received radiation 40 is propagated via the ¼-wavelength plate 36, and then, is separated from the transmitted radiation 38 in the polarizer 35 to be conducted to the second optical separator 41.

The other laser radiation that is emitted from the laser oscillator 31 and then is subdivided by the first optical separator 32 is employed as the local radiation used in the optical heterodyne detection. The local radiation is propagated via the reflection mirror 42 to the frequency shifter 43, and then the optical frequency of this local radiation is shifted by the intermediate frequency "$f_{IF}$". Thereafter, the frequency-shifted local radiation is processed by the ½-wavelength plate 44 in such a manner that the polarizationc plane of this local radiation is rotated so as to make this polarization plane coincident with the polarization plane surface of the received radiation 40 in the second optical separator 41. Then, the resulting local radiation is combined with the received radiation 40 in the second optical separator 41. The combined radiation between the local radiation and the received radiation 40 is optical-heterodyne-detected in the PD45 corresponding to the photodetector. The reception signal supplied from the PD45 is amplified by the amplifier 46, and then, the amplified reception signal is supplied via the band-pass filter 47 to the correlating device 48.

In the correlating device 48, the reception signal is multiplied by the pseudo-random modulation signal to acquire the correlation. This pseudo-random modulation signal is produced by modulating the transmitted radiation to which arbitrary delay time $t_d$ is applied by the variable delay circuit 28. When the target 39 is such a hard target having a sufficiently high reflectance, a peak value of output power from the correlating device 48 may be obtained by the power measuring device 49 in such a case that the reciprocation time "$t_r$" of the received radiation up to this hard target 39 becomes equal to the delay time "$t_d$". Assuming now that the Doppler frequency of the received radiation while the target is moved is selected to be "$f_d$", a frequency difference of $(f_{IF}-f_d)$ is acquired as the output frequency of the correlating device 48 by the frequency discriminator 26.

As a consequence, since the delay time $t_d$ is swept by the control apparatus 27 over the measuring area, the distance information of the target may be acquired from the power measuring device 49, and also the velocity information of the target may be acquired from the frequency discriminator 26.

FIG. 33 represents a structural diagram for explaining such a case that a soft target is measured.

As apparent from the structural diagram shown in FIG. 32, a signal processing unit subsequent to the correlating device 48 of the structural diagram shown in FIG. 33 is different. The operations of the modulation of the laser radiation and also the correlating operation between the transmission/received radiation and the pseudo-random modulation signal in FIG. 33 are identical to those of FIG. 32.

The correlation between the output signal from the correlating device 48 and a reception signal received from such a distance that the reciprocation time $t_r$ of the received radiation is made equal to the delay time $t_d$ is made coincident, and this output signal has a large peak in the frequency $(f_{IF}-f_d)$. As to all reception signals received from distances other than the above-explained distance, the output signal of the correlating device 48 becomes non-correlative. The frequency spectra of these reception signals is spread, and is extended into a wide frequency band.

In the signal processing unit shown in FIG. 33, the output signal of the correlating device 48 is converted into a digital signal by an A/D converter 101, this digital signal is processed by an FFT circuit 102 to acquire a frequency spectrum, and then, a signal processing circuit 103 detects such a peak that the frequency thereof becomes $(f_{IF}-f_d)$. Based upon the frequency of the peak and the intensity thereof, a velocity of a target and a density distribution thereof may be calculated, and this target is located at such a distance that the reciprocation time $t_r$ of the received radiation is made equal to the delay time $t_d$.

A reception signal derived from a coherent CW laser radar apparatus when a soft target is present as a measuring target is expressed by the following formula (1):

$$P_r = \eta P_{CW} T_t T_r \int_0^\infty \frac{\pi D_r^2}{4R^2} \frac{\beta(R)T(R)^2}{SRF(R)} dR \tag{1}$$

In this formula (1), the respective symbols are defined as follows:

$P_{CW}$: transmitted radiation output;

β (R): backward scattering coefficient of target (soft target);

$D_r$: aperture radius of receiver optics;

T(R): atmospheric transmittance;

$T_r$: transmittance of receiver optics;

SRF(R): signal reduction factor; and

R: distance.

Also, both the atmospheric transmittance T(R) and the signal reduction factor SRF(R) are expressed by the below-mentioned formulae (2) to (4):

$$T(R)^2 = \exp\left[-2\int_0^R \alpha(R')dR'\right] \quad (2)$$

$$SRF(R) = \left[1 + \left(1 - \frac{R}{F}\right)^2\left(\frac{kD_r^2}{8R}\right)^2 + \left(\frac{D_r}{2S_0(R)}\right)^2\right] \quad (3)$$

$$S_0(R) = \left[Hk^2\int_0^R C_n^2(R)\left(1 - \frac{R'}{R}\right)^{\frac{5}{3}}dR'\right]^{-\frac{3}{5}} \quad (4)$$

In this formula 2, the respective symbols are defined as follows:

(R'): atmospheric attenuation coefficient;
F: focal point distance of receiver optics; and
$K=2\pi/\lambda$, $H=2.914383$,
$C_n^2(R)$: atmospheric structural constant.

In such a case that a soft target distributed in a space, for example, air, is measured by using CW laser radiation, as illustrated in FIG. 34, this space is considered as a series connection of thin layers. A thickness of each of the thin layers is equal to "$\Delta R$", and these thin layers are positioned along an optical axis of transmitted radiation. In this case, the thickness "$\Delta R$" is equal to distance resolution, and is expressed by the following formula (5):

$$\Delta R = \frac{c\tau}{2} \quad (5)$$

In this formula 5, the symbol is defined as follows:

$\tau$: time width of pseudo-random modulation signal per 1 bit (element).

Assuming now that each of these layers contains such a reflection member having the same reflectance as that owned by a target (soft target) of this own layer, the above-described formula (1) is given as follows:

$$P_r = \eta P_{CW}T_tT_r\frac{\pi D_r^2}{4}\sum_{i=1}^{\infty}\frac{\beta(R_i)T(R_i)^2}{R_i^2 SRF(R_i)}\Delta R \quad (6)$$

In a pseudo-random modulation CW coherent rider laser radar, a reception signal of a single atmospheric layer is used as a signal component by executing a correlative process operation. A reception signal obtained from a K-th layer is expressed as follows:

$$P_{r,i} = \eta P_{CW}T_tT_r\frac{\pi D_r^2}{4R_i^2}\frac{\beta(R_i)T(R_i)^2}{SRF(R_i)}\Delta R \quad (7)$$

In general, an S/N ratio is expressed by a ratio of a signal intensity to system noise of a reception system such as s hot noise and thermal noise. The S/N ratio is expressed by the f following formula:

$$\frac{S}{N} = \frac{\eta_f P_{r,i}}{h\nu B} \quad (8)$$

In this formula 6, symbols are defined as follows:

$\eta_f$: electric filter coefficient; and
B: reception bandwidth.

The reception bandwidth is inverse proportional to time required to perform the correlation process operation, namely time (one sequence length time) equivalent to one sequence length of a pseudo-random modulation signal. As a result, one sequence length time required to obtain a necessary S/N ratio may be calculated based upon the formula (8).

Different from the case of the hard target, when a soft target is measured, scattered radiation from a plurality of space layers is received at the same time, as defined in the formula (6). Since the pseudo-random modulation is carried out, reception signals of non-correlative space layers which are not of interest are spectrum-spread. However, considering a summation of spread spectra of a plurality of space layers, a maximum value of reception signal intensitys should be sufficiently suppressed with respect to reception signals received from correlative space layers which are of interest.

FIG. 35 graphically represents a distance depending characteristic about reception intensitys of a coherent CW laser radar apparatus, which is calculated by employing the formula (7).

A position of a peak and a dimension of this peak are determined based upon a focal point distance "F" of a receiver optics, and an aperture diameter $D_r$ of a receiver optics. As apparent from this drawing, it may be understood that there is an effective reception distance band from which an effective reception intensity is obtained. As a result, a reception signal received from a space layer existed in this effective reception distance band.

Under a condition indicated in FIG. 36, a frequency spectrum of a reception signal obtained by the FFT circuit 102 is acquired. While the effective reception distance band is selected to be 9 (see FIG. 36A) xequivalent to 9 bits of a pseudo-random modulation signal, one sequence length of the pseudo-random modulation signal obtained from the formula (8) is selected to be 31 bits (see FIG. 36B). As a result, one sequence length time equivalent distance (defined as such a distance over which signal can be reciprocated within time of one sequence length) is equal to $31\times\Delta R$. While the pseudo-random sequence (PN code) used in the pseudo-random modulation signal is assumed as a 31-bit M sequence, delay time is set in such a manner that a correlation can be made coincident with a single space layer existed in the effective reception distance band. A Doppler shift is present only in a correlative space layer.

FIG. 37 represents a calculation result of a frequency spectrum of a reception signal obtained by the FFT circuit 102 under this condition.

An abscissa of FIG. 37 represents a frequency where an intermediate frequency $f_{IF}$ is used as a reference frequency. A summation of spread spectra of a plurality of non-correlative space layers constitutes such a signal which is extended to a wide frequency area, in which a spectrum waveform owned by a rectangular wave having a pulse width "$\tau$" is employed as an envelope line ($f_B=1/\tau$ in this drawing). However, as apparent from this drawing, there are several peaks having large values, depending upon a sort of a pseudo-random modulation signal, a sequence length, and a time width. When these peak values are substantially equal to, or larger than such a peak value owned by a spectrum of a reception signal received from a correlative space layer in interest it is not possible to acquire the information about the correlative space layer in interest. In FIG. 37, the spectrum of the reception signal received from the correlative space layer owns a single and sharp peak at a frequency of "$-f_d$", but is hidden by a summation of spread spectra of a plurality of non-correlative space layers.

As explained above, because of the adverse influence caused by the summation of the spread spectra of a plurality of non-correlative space layers, there is such a drawback that the soft target cannot be measured with maintaining sufficiently high precision by employing the coherent CW laser radar apparatus.

Also, in the above-described coherent CW laser radar apparatus for modulating the transmitted radiation by using the pseudo-random sequence (PN code), since the monitoring time per 1 measuring operation is prolonged, the sufficiently high S/N ratio can be acquired even when the CW laser having the lower power than that of the pulse laser is employed. However, to this end, there are some possibilities that the pseudo-random sequence (PN code) whose sequence length would become several hundreds bits and would exceed several thousands bits may be employed.

FIG. 38 graphically shows a spectrum of a reception signal in such a case that a uniform soft target is measured by employing a pseudo-random sequence (PN code) whose sequence length is equal to 127 bits.

An abscissa of this graph indicates a frequency, in which a frequency ($f_{IF}-f_d$) of the below-mentioned reception signal is used as a reference frequency. This reception signal is received from a distance where reciprocation time "$t_r$" of received radiation is made equal to delay time "$t_d$." At a frequency $O(f_{IF}-f_d)$, a sharp peak of correlated reception signals appears. Also, over a wide frequency band defined from $-f_B$ up to $f_B(=1/\tau;\tau$: time width per 1 bit), such reception signals are distributed which are spectrum-spread from the non-correlative entire distance within the distance band from which the effective reception intensity can be acquired. When the soft target measurement is carried out, the peak value of the correlative reception signals must be made sufficiently large, as compared with the spectrum-spread reception signal derived from the non-correlative overall distance.

As explained, furthermore, in the conventional coherent CW laser radar apparatus for measuring the soft target, the monitoring time for one measuring operation is prolonged so as to obtain the sufficiently high S/N ratio. Also, the pseudo-random sequence (PN code) is employed in which the time equivalent to one sequence length corresponds to the monitoring time per one measuring operation. As a result, such a pseudo-random sequence (PN code) of a long sequence length may be employed.

On the other hand, a frequency analysis of a reception signal is required so as to obtain a Doppler frequency. To carry out a correlation process operation, data of a reception signal for a time period equivalent to one sequence length must be employed in order to analyze this frequency. As indicated in FIG. 33, in the case that both the A/D converter and the FFT are employed in the signal processing unit, the FFT process operation must be carried out by using a large number of A/D-converted data of the reception signals for the time equivalent to 1 sequence length. A total calculation amount of FFT calculation is direct proportional to approximately a squared value of a total number of used data. As a result, there is such a drawback that the calculation amount for the FFT calculation becomes very large.

SUMMARY OF THE INVENTION

The present invention has been made to solve the above-described conventional problems of these laser radar apparatuses, and therefore, has an object to provide a coherent laser radar apparatus having a high reliability, which can increase structural free degrees of optical elements, and also can readily assemble these optical structural elements.

Another object of the present invention is to provide such a coherent laser radar apparatus capable of increasing an S/N ratio, and also capable of suppressing an adverse influence caused by a summation of spread spectra of a plurality of non-correlative space layers. This S/N ratio is expressed by a ratio of a signal intensity to system noise of a reception system such as shot noise and thermal noise.

Furthermore, another object of the present invention is to provide a coherent laser radar apparatus capable of detecting a peak of a reception signal in high precision, which is received from a correlative distance.

To achieve the above-described objects, a coherent laser radar apparatus, according to a first aspect of the present invention, is featured by comprising: as an optical component, a CW laser oscillating a laser radiation having a single wavelength; a dividing means for dividing laser radiation derived from the CW laser; an optical modulator for modulating one of the laser radiation divided by the dividing means; an optical antenna for projecting the modulated laser radiation as transmitted radiation toward a target, and also for receiving scattered radiation from the target as received radiation; combining means for combining the other of the laser radiation divided by the dividing means as local radiation with the received radiation received from the optical antenna; and a photodetector for optical-heterodyne-detecting the combined radiation; and also comprising: as an electric component, a pseudo-random modulation signal generator for supplying a pseudo-random modulation signal to the optical modulator; a variable delay device for time-delaying a portion of the pseudo-random modulation signal generated from the pseudo-random modulation signal generator; a correlating device for multiplying the output signal of the photodetector by the pseudo-random modulation signal time-delayed by the variable delay device; and signal processing means for acquiring physical information such as a distance of the target and a velocity of the target based upon a intensity and a frequency of the output signal from the correlating device, and also the delay time set by said variable delay device; wherein: an optical path between the optical components is constituted by an optical fiber.

In the coherent laser radar apparatus according to the first aspect, an optical fiber amplifier having a gain in the vicinity of a wavelength of the modulated laser radiation is further provided in the optical path between the optical modulator and the optical antenna.

In the coherent laser radar apparatus according to the first aspect, the CW laser corresponds to a CW laser oscillating a laser radiation having a single wavelength, the oscillation wavelength of which is a 1.5 $\mu$m band, whereas the optical fiber amplifier corresponds to an optical fiber amplifier with employment of an $Er^{3+}$ ion-doped optical fiber having a gain in the 1.5 $\mu$m band.

In the coherent laser radar apparatus according to the first aspect, the CW laser corresponds to a CW laser oscillating a laser radiation having a single wavelength, the oscillation wavelength of which is any one of a 1.06 $\mu$m band, a 0.98 $\mu$m band, and a 1.3 $\mu$m band, whereas the optical fiber amplifier is an optical fiber amplifier with employment of an $Nd^{3+}$ ion-doped optical fiber having a gain in any one of the 1.06 $\mu$m band, 0.98 $\mu$m band, and 1.3 $\mu$m band.

In the coherent laser radar apparatus according to the first aspect, the CW laser corresponds to a CW laser oscillating a laser radiation having a single wavelength, the oscillation wavelength of which is a 1.3 $\mu$m band, whereas the optical fiber amplifier corresponds to an optical fiber amplifier with employment of a $Pr^{3+}$ ion-doped optical fiber having a gain in the 1.3 $\mu$m band.

In the coherent laser radar apparatus according to the first aspect, the CW laser corresponds to a CW laser oscillating a laser radiation having a single wavelength, the oscillation wavelength of which is a 1 μm band, whereas the optical fiber amplifier corresponds to an optical fiber amplifier with employment of a $Yb^{3+}$ ion-doped optical fiber having a gain in the 1 μm band.

In the coherent laser radar apparatus according to the first aspect, the CW laser corresponds to a CW laser oscillating a laser radiation having a single wavelength, the oscillation wavelength of which is a 2.1 μm band, whereas the optical fiber amplifier corresponds to an optical fiber amplifier with employment of an $Ho^{3+}$ ion-doped optical fiber having a gain in the 2.1 μm band.

In the coherent laser radar apparatus according to the first aspect, the CW laser corresponds to a CW laser oscillating a laser radiation having a single wavelength, the oscillation wavelength of which is a 2.0 μm band, whereas the optical fiber amplifier corresponds to an optical fiber amplifier with employment of an $Tm^{3+}$ ion-doped optical fiber having a gain in the 2.0 μm band.

In the coherent laser radar apparatus according to the first aspect, the CW laser corresponds to a CW laser radiation source having a high spectrum purity, in which a line width of oscillated laser radiation is made narrower than a width of a frequency dispersion which is applied to the received radiation and is caused by the target.

In the coherent laser radar apparatus according to the first aspect, the CW laser radiation source having the high spectrum purity includes: a solid-state laser module oscillated having a single wavelength, which contains a means for fine-controlling all, or any one of a temperature, a resonator length, and pumping intensity; and phase noise compensating means for detecting phase noise of output radiation from the solid-state laser module by using a portion of the output radiation thereof, and for supplying a feedback signal used to fine-control all, or any one of said temperature, said resonator length, and the pumping intensity from the phase noise detection output to the solid-state laser module.

The coherent laser radar apparatus according to the first aspect is featured by further comprising: means for detecting a time change in a summation between an optical path length of the transmitted radiation and an optical path length of the received radiation, and also for detecting a time change in a difference between an optical path length of the local radiation and the optical path lengths of the transmission/received radiation; and means for controlling the optical path length of any one of the transmitted radiation, the received radiation, and the local radiation based upon the output signal derived from the means for detecting the time change in the difference of the optical path lengths.

In the coherent laser radar apparatus according to the first aspect, the means for detecting the time change in the difference of the optical path lengths is arbandd by: a fixed delay device for applying a constant time delay to a portion of the pseudo-random modulation signal generated from the pseudo-random modulation signal generator; a correlating device for multiplying the output signal of the photodetector by the time-delayed modulation signal derived from the fixed delay device; a microwave reference oscillator having a high spectrum purity; and means for detecting a phase difference between the output signal of the correlating device and the output signal of the microwave reference oscillator.

In the coherent laser radar apparatus according to the first aspect, the means for controlling the optical path length is arbandd by: an electro-optical crystal element positioned in an optical path; and means for applying an electric field to the electro-optical crystal element.

In the coherent laser radar apparatus according to the first aspect, the respective structural elements of the coherent laser radar apparatus are set on a mobile object such as an aircraft, a satellite, and a vehicle.

In the coherent laser radar apparatus according to the first aspect, the pseudo-random signal generator generates a pseudo-random signal as a modulation signal in such a manner that a time width "τ" of the pseudo-random signal per 1 bit is set to $(\tau > 1/f_L)$ in the case that a minimum frequency of a measuring frequency band to be measured is selected to be "$f_L$."

In the coherent laser radar apparatus according to the first aspect, the coherent laser radar apparatus includes at least one set of such a combination between a fixed delay device and a correlating device, instead of both the variable delay device and the correlating device; the fixed delay device applies a constant time delay to a portion of the pseudo-random modulation signal of the pseudo-random modulation signal generator; and the correlating device multiplies the output signal derived from the photodetector by the output signal derived from the fixed delay device.

In the coherent laser radar apparatus according to the first aspect, the coherent laser radar apparatus is further comprised of an optical space communication apparatus including: an optical switch provided in a reception optical path from the optical antenna, for switching the optical paths; an optical receiver for receiving received radiation of an optical communication from the optical switch via an optical circulator; an optical transmitter for outputting transmitted radiation for the optical communication via the optical circulator to the optical switch; and a communication signal processing apparatus for demodulating the optical communication received radiation received from the optical receiver so as to extract communication information therefrom, and also for producing a modulation signal based upon communication information to be transmitted so as to output the produced modulation signal to the optical transmitter; and wherein: the optical antenna functions as an optical antenna for an optical communication purpose by switching the optical path by the optical switch, whereby a function of an optical space communication is additionally provided with the coherent laser radar apparatus.

In the coherent laser radar apparatus according to the first aspect, the coherent laser radar apparatus is further comprised of: a communication signal processing apparatus for demodulating the received optical communication received radiation so as to extract communication information therefrom, and also for producing a modulation signal based upon communication information to be transmitted so as to output the produced modulation signal; and wherein: the optical modulator modulates transmitted radiation for an optical communication by the modulation signal outputted from said communication signal processing apparatus; and a function of an optical space communication is added to the coherent laser radar apparatus by employing a function of an optical transmitter in which optical communication transmitted radiation is outputted by said CW laser and the optical modulator; a function as an optical communication optical antenna to the optical antenna; and a function as an optical receiver for receiving the optical communication received radiation to the photodetector.

Also, a coherent laser radar apparatus, according to a second aspect of the present invention, is featured by comprising: as an optical component, a CW laser oscillating a laser radiation having a single wavelength; a dividing means for dividing laser radiation derived from the CW laser; an optical modulator for modulating one of the laser radiation divided by the dividing means; an optical antenna for projecting the modulated laser radiation as transmitted radiation toward a target, and also for receiving scattered radiation from the target as received radiation; combining means for combining the other of the laser radiation divided by the dividing means as local radiation with the received radiation received from the optical antenna; and a photodetector for optical-heterodyne-detecting the combined radiation; and also comprising: as an electric component, a pseudo-random modulation signal generator for supplying a pseudo-random modulation signal to the optical modulator; a time delay device for time-delaying a portion of the pseudo-random modulation signal generated from the pseudo-random modulation signal generator; a correlating device for multiplying the output signal of the photodetector by the pseudo-random modulation signal time-delayed by the time delay device; and signal processing means for acquiring physical information such as a distance of the target and a velocity of the target based upon a intensity and a frequency of the output signal from the correlating device, and also the delay time set by the time delay device; wherein: the pseudo-random modulation signal generator employs as a pseudo-random modulation signal, such a pseudo-random sequence (PN code) that time required for one sequence length is sufficiently longer than time required for light which is reciprocated within a distance band where received radiation having sufficiently high intensity can be obtained by the optical antenna.

Furthermore, a coherent laser radar apparatus, according to a third aspect of the present invention, is featured by comprising: as an optical component, a CW laser oscillating a laser radiation having a single wavelength; a dividing means for dividing laser radiation derived from the CW laser; an optical modulator for modulating one of the laser radiation divided by the dividing means; an optical antenna for projecting the modulated laser radiation as transmitted radiation toward a target, and also for receiving scattered radiation from the target as received radiation; combining means for combining the other of the laser radiation divided by the dividing means as local radiation with the received radiation received from the optical antenna; and a photodetector for optical-heterodyne-detecting the combined radiation; and also comprising: as an electric component, a pseudo-random modulation signal generator for supplying a pseudo-random modulation signal to the optical modulator; a time delay device for time-delaying a portion of the pseudo-random modulation signal generated from the pseudo-random modulation signal generator; a correlating device for multiplying the output signal of the photodetector by the pseudo-random modulation signal time-delayed by the time delay device; and signal processing means for acquiring physical information such as a distance of the target and a velocity of the target based upon a intensity and a frequency of the output signal from said correlating device, and also the delay time set by the time delay device; wherein: the pseudo-random modulation signal generator owns a function capable of switching pseudo-random modulating signals produced based on a plurality of pseudo-random sequence (PN code) different from each other to thereby produce the switched pseudo-random modulating signal.

BRIEF DESCRIPTION OF THE DRAWINGS

The above and further objects, novel features and advantages of the present invention will more fully become obvious upon an understanding of the following detailed description taken in connection with the accompanying drawings, in which.

DETAILED DESCRIPTION OF THE PREFERRED EMBODIMENTS

Embodiment Mode 1

Figure 1:
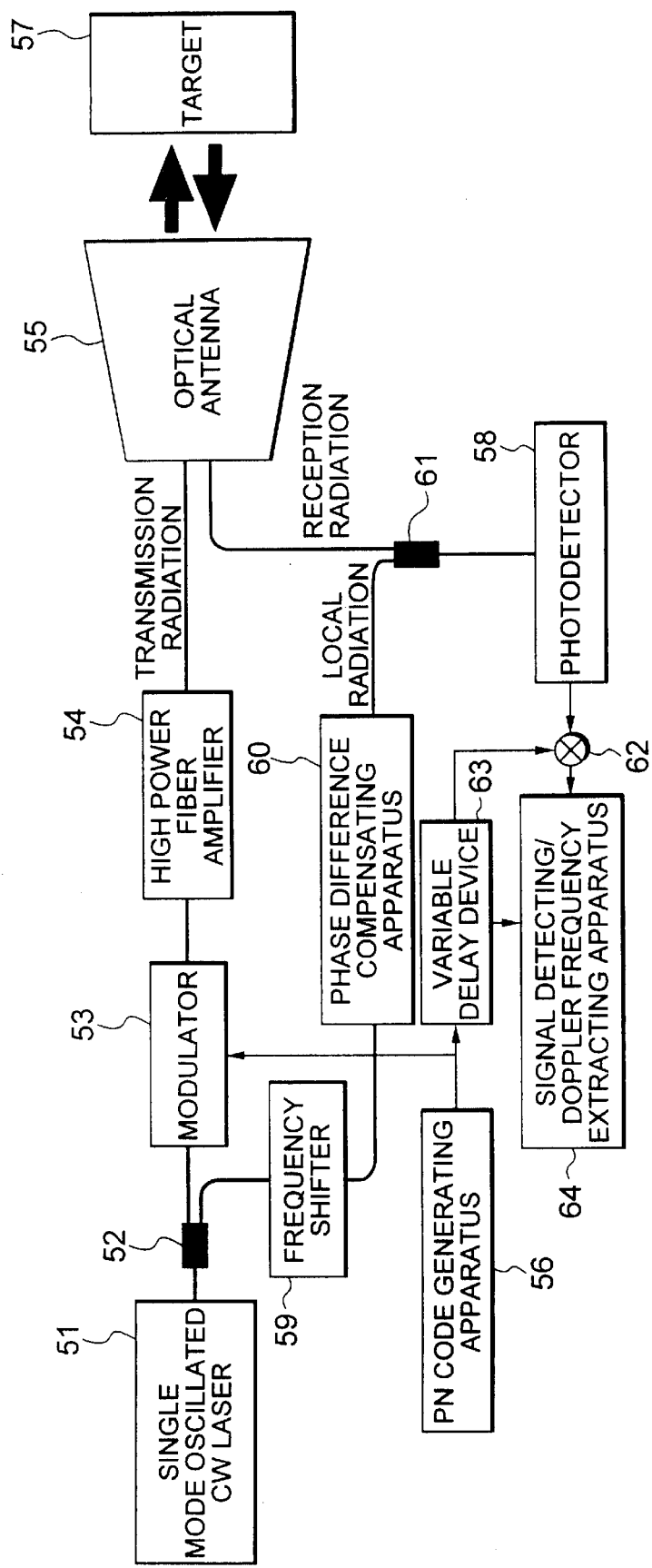
FIG. 1 is a structural diagram for schematically representing a coherent laser radar apparatus according to an embodiment mode 1 of the present invention.

FIG. 1 is a block diagram for schematically showing an arbandment of a coherent CW laser radar apparatus according to an embodiment mode 1 of the present invention.

In the coherent laser radar apparatus having the arbandment shown in this drawing, laser radiation emitted from a CW (continuous wave) laser 51 which is oscillated with having a single wavelength of "$f_0$" is entered via an optical fiber into a first fiber type optical coupler 52, and then is separated into two sets of CW laser radiation. One of the two-divided laser radiation is used as transmitted radiation, and the other of the two-divided laser radiation is employed as local radiation used in an optical heterodyne detection.

The transmitted radiation is traveled via an optical modulator 53 and a high power optical fiber amplifier 54, which are provided in an optical path of the optical fiber, to a an optical antenna 55. The optical modulator 53 modulates transmitted radiation by a pseudo-random modulation signal corresponding to a pseudo-random sequence (PN code) (for example, M sequence) derived from a pseudo-random signal generating apparatus 56. As this modulating method, any one of the intensity modulating method, the frequency modulating method, and the phase modulating method may be employed. In this embodiment mode 1, the M sequence (total sequence being "N" and time width of 1 bit being "τ") is employed as the pseudo-random sequence (PN code), and the phase modulating method is employed as the modulating method.

Figure 2:
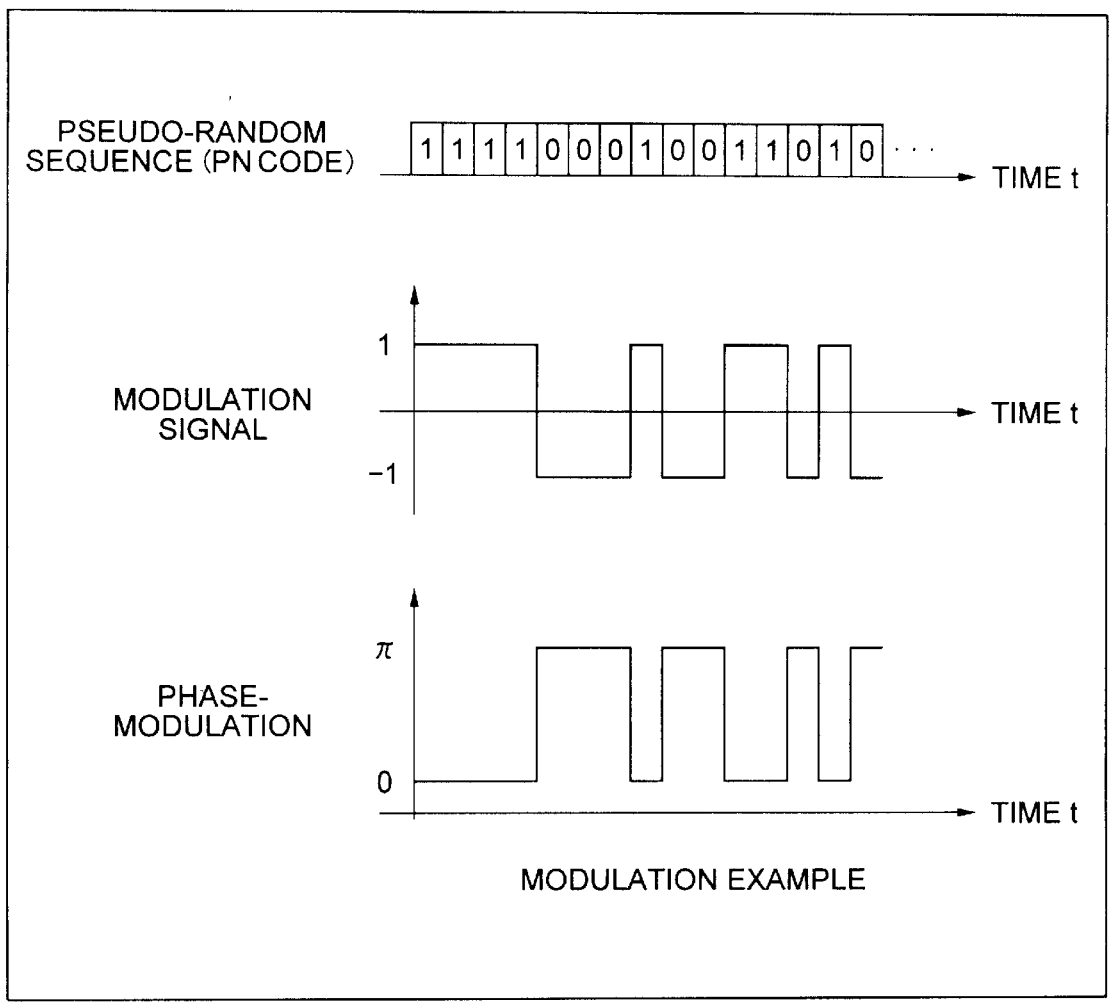
FIG. 2 is an explanatory diagram for explaining a modulation example of transmitted radiation employed in the coherent laser radar apparatus of the embodiment mode 1.

FIG. 2 represents examples of modulation methods for transmitted radiation. The pseudo-random signal generating apparatus 56 repeatedly generates a pseudo-random modulation signal in a continuous manner. This pseudo-random modulation signal outputs a voltage of [1, −1] in response to a value [1, 0] of a pseudo-random sequence (PN code) every time τ has passed. The optical modulator 53 phase-modulates the transmitted radiation in response to the value [1, −1] of the pseudo-random modulation signal by using two values of [0, −τ].

Next, the modulated transmitted radiation is amplified by the high power fiber amplifier 54.

The transmission/reception separating optical antenna 55 owns a first function and a second function. As to this first function, the transmission/reception separating optical antenna 55 converts the transmitted radiation transmitted from the optical fiber into a laser beam having a beam diameter "Dr" and a radial curvature "F" of a wave front, and then projects this converted laser beam toward a target 57. As to the second function, the transmission/reception separating optical antenna 55 receives a portion of scattered radiation, or reflected light of the above-explained laser beam from the target 57, and then couples the received light to an optical fiber conducted to a photodetector 58 which performs an optical heterodyne detection. When the target 57 is moved with respect to the laser radar apparatus, since the received radiation is Dopper-shifted in response to the moving speed (velocity) of the target 57, the frequency of the received radiation becomes $f_0+f_d$, assuming now that the Doppler frequency is selected to be "$f_d$".

On the other hand, the other laser radiation, which is employed as the above-explained local radiation and is produced by subdividing the laser radiation by 2 by employing the first fiber type optical coupler 52, is processed by a frequency shifter 59 and a phase difference compensating apparatus 60, which are provided in the optical path of the optical fiber. Then, the processed laser radiation is combined with received radiation supplied from the optical antenna 55 by a second fiber type optical coupler 61, and thereafter, the combined laser radiation is supplied to the photodetector 58. In the frequency shifter 59, the local radiation is frequency-shifted by a component of an intermediate frequency "$f_{IF}$" and thus, the frequency of this shifted local radiation becomes $f_0+f_{IF}$.

The received radiation combined with the local radiation is optical-heterodyne-detected by the photodetector 58 in a square detection. As a result, a beat signal between the received radiation and the local radiation is outputted from the photodetector 58. The beat signal between the received radiation and the local radiation is multiplied in a correlating device 62 by such a pseudo-random modulation signal so as to be correlated. This pseudo-random modulation signal is generated from the pseudo-random signal generating apparatus 56, and is time-delayed by arbitrary delay time "$t_d$" by a variable delay device 63.

A signal processing apparatus 64 analyzes a signal intensity and a frequency of a correlation signal derived from the correlating device 62, so as to detect the target, and also the Doppler frequency. In this embodiment mode 1, it is now assumed that the following time can be neglected. That is to say, the negligible time is: time required after the pseudo-random modulation signal is generated by the pseudo-random signal generating apparatus 56 and until the transmitted radiation is modulated by the optical modulator 53; and further time required after the pseudo-random modulation signal is generated by the pseudo-random modulation signal and then is reached to the correlating device 62 except for the delay time $t_d$ given by the variable delay device 63; and also time required when the beat signal between the received radiation and the local radiation is reached from the photodetector 58 to the correlating device 62.

Figure 3A:
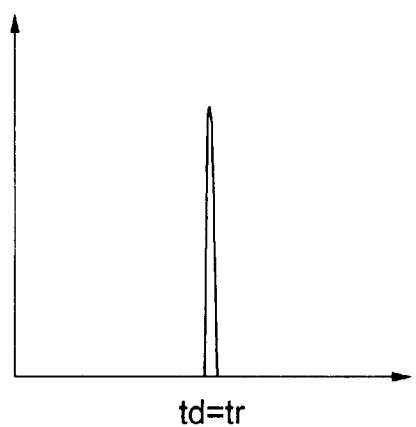
FIGS. 3A and 3B are explanatory diagrams for explaining a spectrum of a correlation signal derived from a correlating device that a target is a hard target.
Figure 3B:
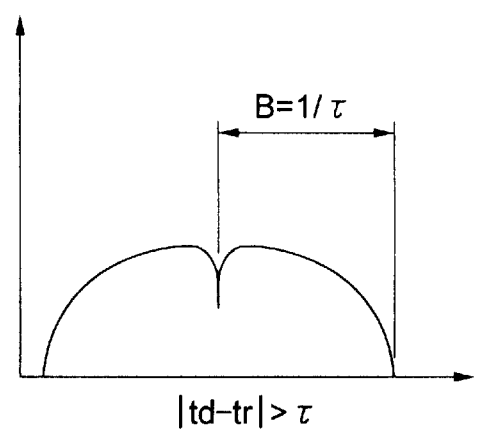

FIGS. 3A and 3B represent a spectrum of a correlation signal derived from the correlating device 62 in the case that the target 57 is a hard target. Assuming now that time defined by that the received radiation is reached from the optical modulator 53 to the photodetector 58 is defined as "$t_r$", when $t_d$ is equal to $t_r$, the correlation relationship can be completely established between the beat signal produced between the received radiation and the local radiation, and the pseudo-random modulation signal which is time-delayed by the delay time $t_d$. As indicated in FIG. 3A, at this stage, the spectrum of the correlation signal owns a strong peak at a frequency of $f_d-f_{IF}$. While the delay time $t_d$ is shifted with respect to the time $t_r$, the strong peak appeared in the frequency $f_d-f_{IF}$ becomes small. When td–tr>τ, the correlation relationship between the beat signal and the pseudo-random modulation signal is not completely established. As a result, as indicated in FIG. 3B, the resultant spectrum of the correlation signal is spread by a width of 1/τ. When this nature is employed, the target can be detected, and the velocity of this target can be calculated from the peak frequency, while this target is detected, by changing the delay time $\tau_d$ of the variable delay device 63.

Furthermore, the contents of the coherent laser radar apparatus according to this embodiment mode 1 and the effects thereof will now be described in detail.

As previously described, in the embodiment mode 1, the optical paths among the optical- elements employed in the coherent laser radar apparatus are constructed of the optical fibers. Since the optical fiber has the higher free degrees of the setting conditions, various setting conditions of the respective optical elements such as precision, a rigidness, and a stability degree with respect to the coherent laser radar apparatus can be largely mitigated, as compared with the conventional structure in which the signal mediation is propagated through the space. As a consequence, the structural free degrees of the respective optical elements, the easy assembling characteristics thereof, and the high reliability thereof can be achieved. In particular, with respect to the optical heterodyne detection, the wave front of the received radiation must be made coincident with the wave front of the local radiation. In the arbandment with employment of the optical fiber, the wave front of the received radiation can be easily made coincident with the wave. front of the local radiation in the high reliability by employing the optical fiber type optical coupler. While both the received radiation and the local radiation, which are propagated through the optical fiber, are merely entered into the optical fiber type optical coupler, the combined radiation between the received radiation and the local radiation can be obtained in the optical fiber provided on the output side, which are propagated in the same mode.

As apparent from the foregoing description, since the optical paths among the optical elements are constituted by using the optical fiber, there are such advantages that the higher structural free degrees of the respective optical elements, the easy assembling characteristics thereof, and the higher reliability thereof can be furthermore achieved.

Next, in the embodiment mode 1, the high power optical fiber amplifier 54 is provided in the optical path of the transmitted radiation. This high power optical fiber amplifier 54 has a gain in the vicinity of the wavelength of the transmitted radiation, namely the oscillation wavelength of the CW laser 51.

Figure 4:
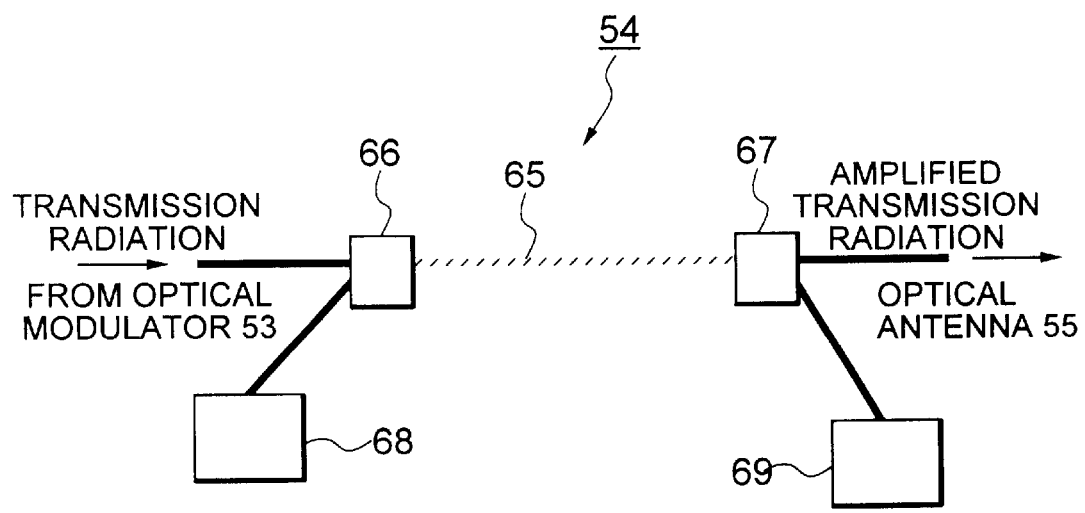
FIG. 4 is a schematic block diagram for indicating a structural example of a high power optical fiber amplifier.

FIG. 4 is a structural example of this high power optical fiber amplifier 54.

As illustrated in FIG. 4, an ion doped optical fiber 65 is provided via both a first wavelength division multiplexer 66 and a second wavelength division multiplexer 67 within an optical fiber corresponding to the optical path of the transmitted radiation. A specially selected ion is doped in this ion doped optical fiber 65 in order that this optical fiber 65 may have a gain in the vicinity of the oscillation wavelength of the CW laser 51.

The first wavelength division multiplexer 66 owns such a function that both the transmitted radiation. and. pumping light produced from a first pumping light source 68 are entered into the optical fiber, and then radiation obtained by synthesizing the transmitted radiation with the pumping light is entered into the ion-doped optical fiber 65. This pumping light of the first pumping light source 68 has a wavelength of an absorption wavelength band of the ion doped in the ion-doped optical fiber 65.

The second wavelength division multiplexer 67 owns an optical fiber used to propagate the transmitted radiation to the optical antenna 55, the optical fiber 65, and another optical fiber connected to a second pumping light source 69 as input/output ports. This second pumping light source 69 produces pumping light having the wavelength of the absorption wavelength band of the ion doped in the ion-doped optical fiber 65. In addition, the second wavelength division multiplexer 67 owns such a function that the pumping light produced from the second pumping light source 69 is outputted to the ion-doped optical fiber 65, and the amplified transmitted radiation which is derived from the ion-doped optical fiber 65 is outputted to the optical fiber connected to the optical antenna 55.

The following example is considered where the oscillation wavelength of the CW laser 51 is selected to be 1.5 μm band, and an $Er^{3+}$ ion having a gain in the 1.5 μm band is doped in the ion-doped optical fiber 65. In this case, the wavelengths of the pumping light produced from the first pumping light source 68 and also from the second pumping light source 69 are selected to be in either a 0.98 μm band or a 1.48 μm band.

Figure 5:
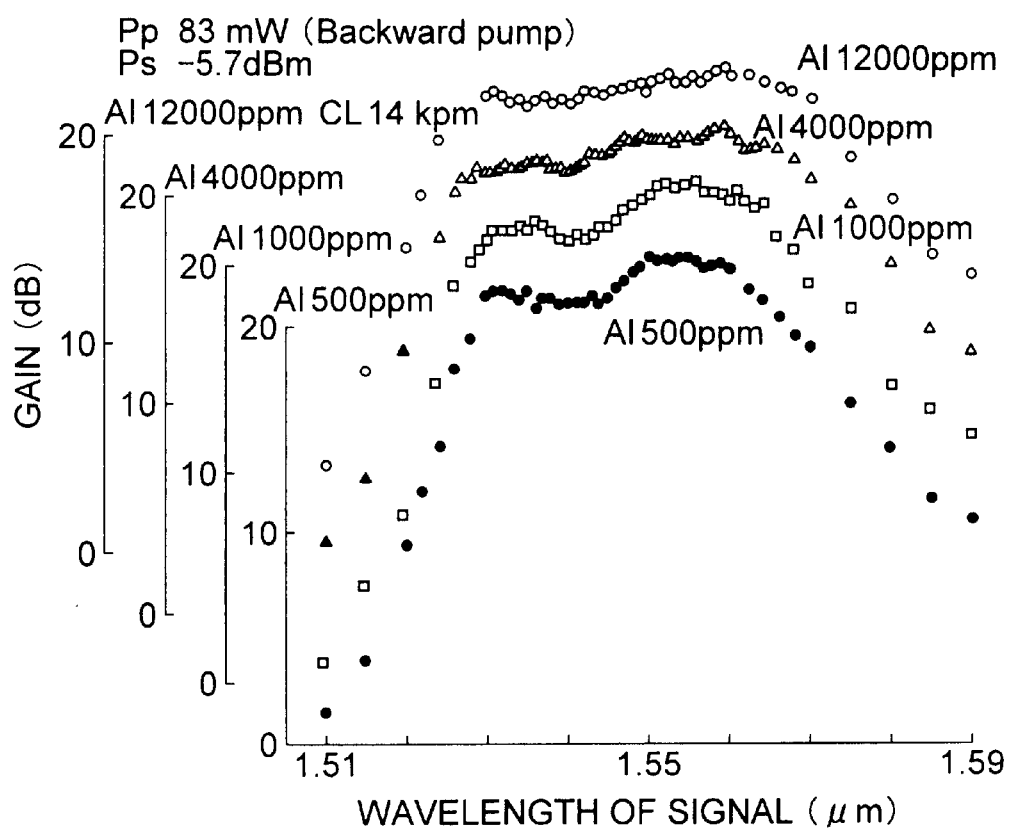
FIG. 5 is an explanatory diagram for showing a gain distribution of an $Er^{3+}$ ion-doped optical fiber.

FIG. 5 indicates a gain distribution of an $Er^{3+}$ ion-doped optical fiber.

As shown in FIG. 5, it can be seen that this ion-doped optical fiber owns a gain in a 1.5 μm band. An $Er^{3+}$ ion-doped optical fiber amplifier has been developed in a communication use field. A high power $Er^{3+}$ ion-doped optical fiber amplifier can be accomplished. That is, an amplification factor with respect to a small signal is higher than or equal to 20 dB, and maximum output power is 10 W. On the other hand, normally, a CW laser oscillating a laser radiation having a single wavelength is constructed of a microchip laser, or a laser having a wavelength selecting element, and output power of this CW laser is selected to be several tens of mW to several hundreds of mW. The wavelength selecting element of this laser is provided within the resonator. The resonator length of this microchip laser is shortened so as to be oscillated in a single axial mode.

As a consequence, since the optical fiber amplifier is provided in the optical fiber corresponding to the optical path of the transmitted radiation, the power of the transmitted radiation which is projected to the target can be multiplied more than several tens times higher than the original power of this transmitted radiation. As a result, there is such a merit that the high S/N ratio can be achieved as compared width that of the coherent CW laser radar apparatus having the conventional arbandment.

Also, similar to the above-explained coherent CW laser radar apparatus of this embodiment mode 1, the below-mentioned coherent CW laser radar apparatus may achieve such a merit that a high S/N ratio may be realized, as compared with that of the coherent CW laser radar apparatus with the conventional arbandment. That is, even in this coherent CW laser radar apparatus, a CW laser oscillating a laser radiation having a single wavelength in the following wavelength bands is combined with the ion-doped optical fiber amplifier:

(1). A coherent CW laser radar apparatus with employment of the above-described arbandment, in which a CW laser oscillating a laser radiation having a single wavelength within a 1.06 μm band, 0.98 μm band, or 1.3 μm band is employed as the CW laser 51, and an $Nd^{3+}$ ion-doped optical fiber amplifier into which an $Nd^{3+}$ ion is doped is employed as the ion-doped optical fiber amplifier 54.

(2). A coherent CW laser radar apparatus with employment of the above-described arbandment, in which a CW laser oscillating a laser radiation having a single wavelength within a 1.3 μm band is employed as the CW laser 51, and also a $Pr^{3+}$ ion-doped optical fiber amplifier in which a $Pr^{3+}$ ion is doped is employed as the ion-doped optical fiber amplifier 54.

(3). A coherent CW laser radar apparatus with employment of the above-described arbandment, in which a CW laser oscillating a laser radiation having a single wavelength within a 1 μm band is employed as the CW laser 51, and also a $Yb^{3+}$ ion-doped optical fiber amplifier in which a $Yb^{3+}$ ion is doped is employed as the ion-doped optical fiber amplifier 54.

(4). A coherent CW laser radar apparatus with employment of the above-described arbandment, in which a CW laser oscillating a laser radiation having a single wavelength within a 2.1 μm band is employed as the CW laser 51, and also an $Ho^{3+}$ ion-doped optical fiber amplifier in which an $Ho^{3+}$ ion is doped is employed as the ion-doped optical fiber amplifier 54.

(5). A coherent CW laser radar apparatus with employment of the above-described arbandment, in which a CW laser oscillating a laser radiation having a single wavelength within a 2.0 μm band is employed as the CW laser 51, and also a $Tm^{3+}$ ion-doped optical fiber amplifier in which a $Tm^{3+}$ ion is doped is employed as the ion-doped optical fiber amplifier 54.

Next, the embodiment mode 1 is featured by employing such a CW laser radiation source having a high spectrum purity, especially, lower than or equal to 100 Hz of a line width, while being smaller than or equal to frequency dispersion applied to a reception signal reflected from a target, as the CW laser 51.

In a coherent laser radar apparatus, under such an ideal condition that a frequency dispersion is negligible and is applied to a reception signal based upon both a line width of a laser radiation source and a target, if a product made by output power of the laser radiation source and monitoring time is equal to each other, then the same S/N ratios are obtained. In a coherent pulse laser radar apparatus, monitoring time corresponds to a pulse width, whereas in a coherent laser CW radar apparatus, monitoring time corresponds to a time gate width. This implies that under such an ideal condition, if the monitoring time is prolonged, the output power of the laser radiation source can be decreased, and further, if the same output power is produced, then the S/N ratio can be improved in a linear form. However, in the actual case, the monitoring time during which the S/N ratio can be improved in the linear manner is limited by both the line width of the laser radiation source and also the frequency dispersion given to the reception signal by the target. The maximum monitoring time may be on the order of an inversed number of the frequency dispersion.

Normally, a CW laser oscillating a laser radiation having a single wavelength is arbandd by a laser in which a wavelength selecting element is provided within a resonator, or a microchip laser in which a length of a resonator is shortened in order to be oscillated in a single axial mode. A line width of this CW laser is on the order of several KHz. On the other hand, a frequency dispersion applied to a reception signal based upon a target is caused by a variation in scattering intensitys of the target and also a variation in velocities. There are many targets whose frequency dispersion becomes lower than or equal to 100 Hz, for instance, stable flow field, and target moved in an equi-speed.

As a consequence, in the case that such a target is measured by the conventional coherent CW laser radar apparatus, the monitoring time during which the S/N ratio can be improved in the linear manner is restricted by the CW laser, namely is shorter than or equal to 1 msec. In this case, since an external feedback circuit is provided with the CW laser, if the line width is made smaller than or equal to the frequency dispersion applied to the reception signal based upon the target, then the monitoring time can be prolonged upon to an inverse number of the above-explained frequency dispersion. As a result, since the output power of the CW laser can be reduced, there are such effects that reliabilities of both the CW laser and the optical components can be improved, and also the S/N ratio can be increased.

Figure 6:
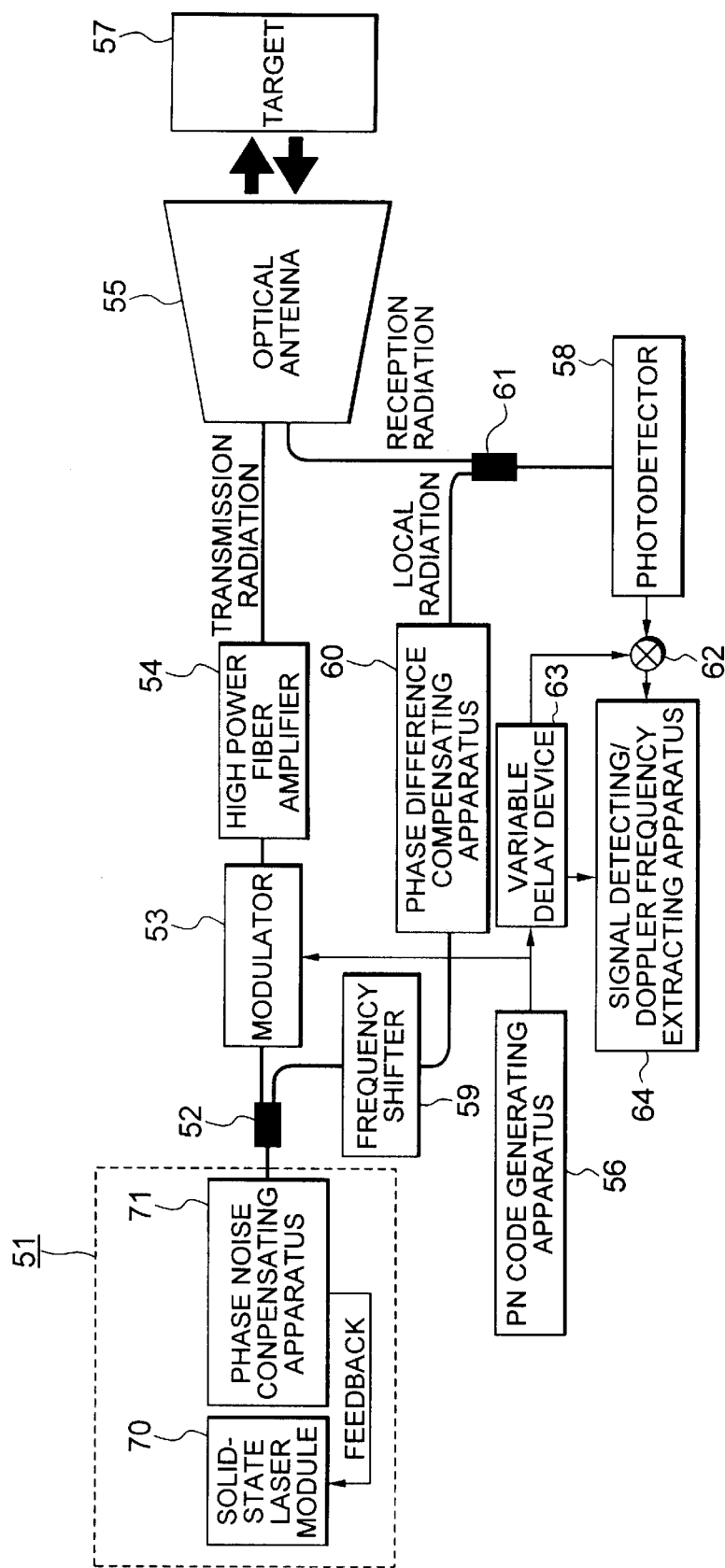
FIG. 6 is a schematic block diagram for indicating a structural example with employment of a CW laser radiation source of a high spectrum purity below a frequency dispersion applied to a reception signal from a target with respect to a CW laser.

FIG. 6 shows a structural example in which a CW laser radiation source having a high spectrum purity lower than or equal to a frequency dispersion applied to a reception signal based upon a target is employed as the CW laser 51.

As indicated in FIG. 6, the CW laser 51 contains a solid-state laser module 70 and a phase noise compensating apparatus 71. The solid-state laser module 70 owns a means for selecting an oscillation wavelength, and is oscillated with having a single wavelength. Also, this solid-state laser module 70 contains a means for fine-controlling all, or a portion of a temperature, a length of a resonator, and an pumping intensity.

Also, the phase noise compensating apparatus 71 is provided between the solid-state laser module 70 and the first fiber type optical coupler 52. This phase noise compensating apparatus 71 contains a means for detecting phase noise of output radiation by using a portion of this output radiation from the solid-state laser module 70, and another means for feeding a feedback signal from the output of this phase noise detecting means to the solid-state laser module 70. Then, the solid-state laser module 70 may eliminate an adverse influence caused by phase noise by employing the means for fine-controlling all, or a portion of the above-explained temperature, length of resonator, and pumping intensity.

As a result, it is possible to obtain such a CW laser radiation source having a high spectrum purity, the line width of which is smaller than or equal to 100 Hz. As a consequence, there is such an effect that a coherent CW laser radar apparatus having either a high reliability or a high S/N ratio can be obtained by employing the CW laser radiation source shown in FIG. 6.

Moreover, the coherent CW laser radar apparatus, according to the embodiment mode 1, is featured by employing a phase difference compensating apparatus 60. This phase difference compensating apparatus 60 is capable of reducing a temporal variation in summations between an optical path length of transmitted radiation and an optical path length of received radiation, and also another temporal variation in differences in optical path lengths of local radiation within the coherent CW laser radar apparatus.

In FIG. 1, the summation between the optical path length defined by that the transmitted radiation is propagated from the CW laser 51 to the optical antenna 55, and the optical path length defined by that the received radiation is propagated from the optical antenna 55 to the photodetector 58, and also the optical path length defined by that the local radiation is propagated from the CW laser 51 to the photodetector 58 are temporal-varied due to temperature variations. When a temporal variation is produced in a difference between the optical path lengths of both the transmitted radiation and the received radiation, this temporal variation may give a temporal variation to a phase item of a reception signal. Thus, there is such an effect that an spectrum width of this reception signal may be widened. The larger the difference between the optical path lengths of both the transmitted radiation and the received radiation is increased, the larger the temporal variation of this difference is increased.

In FIG. 1, the optical fiber amplifier 54 is present within the optical path of the transmitted radiation, and the ion-doped optical fiber having the long length is employed in this optical path. As a consequence, the temporal variation in the difference in the optical lengths between the transmitted radiation and the received radiation becomes large, and therefore, the adverse influence caused by this temperature variation cannot be neglected with respect to the S/N ratio. In order to reduce the temperature variation in the differences of the above-explained optical path lengths, the phase difference compensating apparatus 60 owns such a function capable of sensing the temporal variation in the difference of the above-explained optical path lengths, and also capable of adjusting the optical path length of the local radiation so as to cancel this sensed temporal variation. As a result, the following advantages can be achieved. That is, lowering of the S/N ratio can be avoided, and the highly-reliable coherent CW laser radar apparatus having the high S/N ratio can be obtained.

Figure 7:
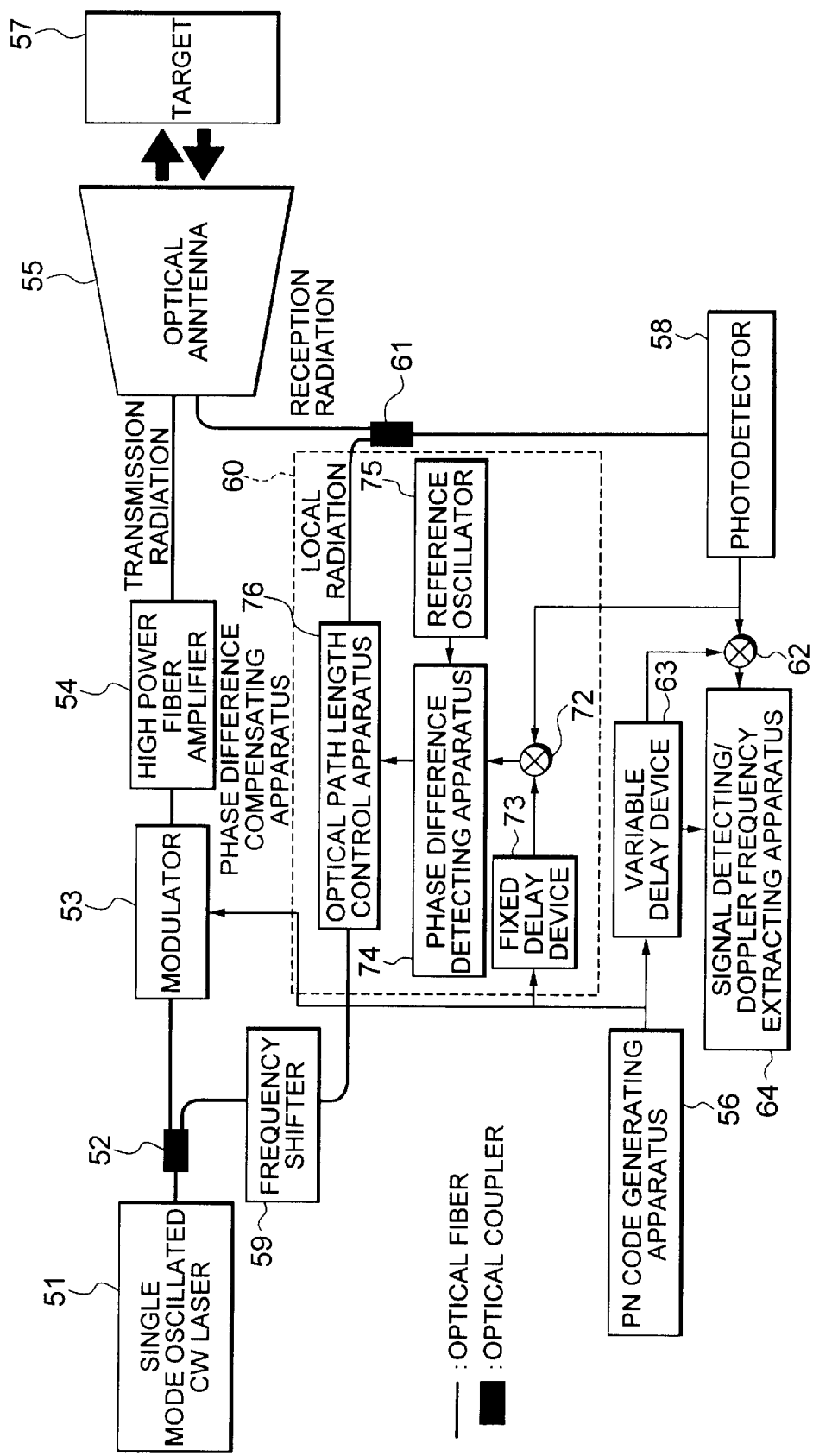
FIG. 7 is a schematic block diagram for showing a structural example of a phase difference compensating apparatus.

FIG. 7 indicates one structural example of the above-explained phase difference compensating apparatus 60.

To sense the temporal variation in the differences between the optical path lengths of the transmitted radiation and the received radiation, the phase difference compensating apparatus 60 having the above-explained structure utilizes internal reflection light in the transmission/reception separating antenna 55, namely utilizes such leakage light that the transmitted radiation is leaked into the optical fiber for directly coupling the received radiation in the transmission/reception separating optical antenna 55. In other words, in order to extract a light component by the above-explained internal reflection light from a beat signal between the received radiation and the local radiation, a portion of such a beat signal between the received radiation and the local radiation derived from the photodetector 58 is entered into a correlating device 72.

Then, a portion of this beat signal is multiplied by such a pseudo-random modulation signal generated from the pseudo-random signal generating apparatus 56 in the correlating device 72 so as to obtain a correlation. This pseudo-random modulation signal is time-delayed by a fixed delay time "$t_{dc}$" by a fixed delay device 73. This delay time $t_{dc}$ is such a time defined by that the internal reflection light is detected by way of the optical heterodyne detecting manner with use of the local radiation in the photodetector 58, while this internal reflection light is propagated from the modulator 53 via the optical antenna 55 to the photodetector 58, and then a portion of this beat signal is reached to the correlating device 72.

Accordingly, only the component of the internal reflection light can be extracted from the above-described beat signal, since the correlation can be completely made coincident to each other, and then is outputted from the correlating device 72. Since the frequency of the extracted component is not Doppler-shifted, this frequency is "$f_{IF}$."

The above-explained temporal variation in the difference between the optical path lengths will appear as a temporal variation of a phase item of the output signal from the correlating device 72. In the phase difference detecting apparatus 74, while monitoring a phase difference between the output signal of the correlating device 72 and a signal of a microwave oscillator having a high spectrum purity and oscillated at the frequency of "$f_{IF}$", the optical path length of the local radiation is adjusted by an optical path length control apparatus 76 provided in the optical path for the local radiation in order that the monitored phase difference continuously becomes constant.

As a consequence, it is possible to suppress the temporal variation in the difference between the above-explained optical path lengths.

As a result, the following advantages can be achieved. That is, lowering of the S/N ratio can be avoided, and the highly-reliable coherent CW laser radar apparatus having the high S/N ratio can be obtained.

In this case, the above-explained optical path length control apparatus 76 may utilize the electric-optic effect of an electro-optical crystal element. In such an electro-optical crystal element, a refractive index within crystal may be changed by applying an electric field to this crystal element. When this electro-optic effect is utilized, an optical path length of laser radiation which passes through the crystal may be readily controlled by controlling the electric field. As a material used to this electro-optical crystal element, there is $LiNbO_3$. The optical path length control apparatus 76 is arbandd by an electric field generating device and a control element. The electric field generating device generates an electric field in such a manner that while the electro-optical crystal element is positioned in the optical path of the local radiation, the refractive index is changed along the optical axis of the local radiation. The control element controls the electric field generated by the above-explained electric field generating device in response to the control signal supplied from the phase difference detecting apparatus 74. When such an electro-optical crystal element as $LiNbO_3$ is employed, there is an advantage that the desirable optical path length control apparatus can be easily obtained.

It should be noted that although the phase difference compensating apparatus 60 is located within the optical path of the local radiation in FIG. 1 and FIG. 7, this phase difference compensating apparatus 60 may be located within the optical path of the transmitted radiation, or the received radiation.

Embodiment Mode 2

Figure 8:
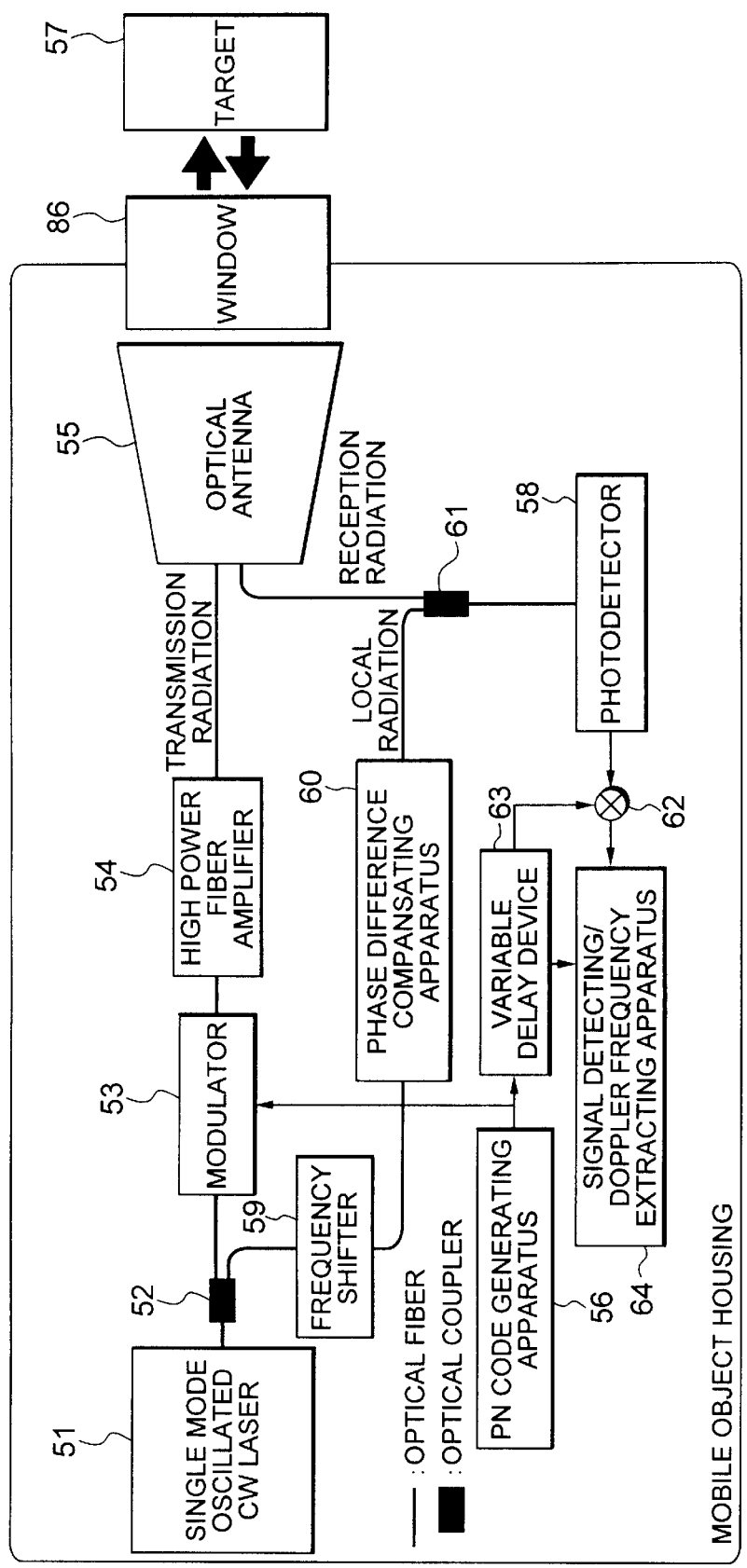
FIG. 8 is a structural diagram for indicating a coherent CW laser radar apparatus, according to an embodiment mode 2 of the present invention, mounted on a mobile object such as an aircraft, a satellite, and a vehicle.

FIG. 8 is a structural diagram for indicating a coherent CW laser radar apparatus, according to an embodiment mode 2 of the present invention, which is mounted on a mobile object such as an aircraft, a satellite, and a vehicle.

The respective structural elements of the coherent CW laser radar apparatus having the arbandment shown in this drawing are installed within a housing 85 of this mobile object. The laser transmitted radiation is projected through a window 86 from the optical antenna 55 to the target 57, and also the received radiation reflected from the target 57 is received via this window 86 formed in an outer wall of the mobile object housing 85. The window 86 owns high transmittance with respect to light having wavelengths in the vicinity of the wavelength of this transmitted radiation. Both the arbandment of this coherent CW laser radar apparatus and the operation thereof are similar to those of the above-described embodiment mode 1.

With respect to an electric appliance mounted on a mobile object, especially both an aircraft and a satellite, compactness, a high reliability, and low electromagnetic noise are required. While the coherent CW laser radar apparatus according to the present invention employs the CW laser 51 having the high spectrum purity, the high power fiber amplifier 54, and the phase difference compensating apparatus 60, and further the optical paths among the optical elements provided in this coherent CW laser radar apparatus are constructed of optical fibers. As a result, there are such advantages that the compact coherent CW laser radar apparatus with the high reliability can be operated under low electromagnetic noise, as compared with the conventional coherent pulse laser radar apparatus with employment of the pulse laser radiation source. Also, such a highly reliable coherent CW laser radar apparatus with a high S/N ratio can be obtained, even in comparison with the conventional coherent CW laser radar apparatus.

In addition, since the optical paths among the optical elements employed in the coherent CW laser radar apparatus are constituted by employing the optical fiber, there are such effects that the structural free degrees of the respective optical elements can be increased and also these optical elements can be readily assembled. This fact may provide great merits in such a case that the coherent CW laser radar apparatus according to this embodiment mode 2 is mounted on the aircraft and the satellite, which require very severe setting conditions.

Figure 9:
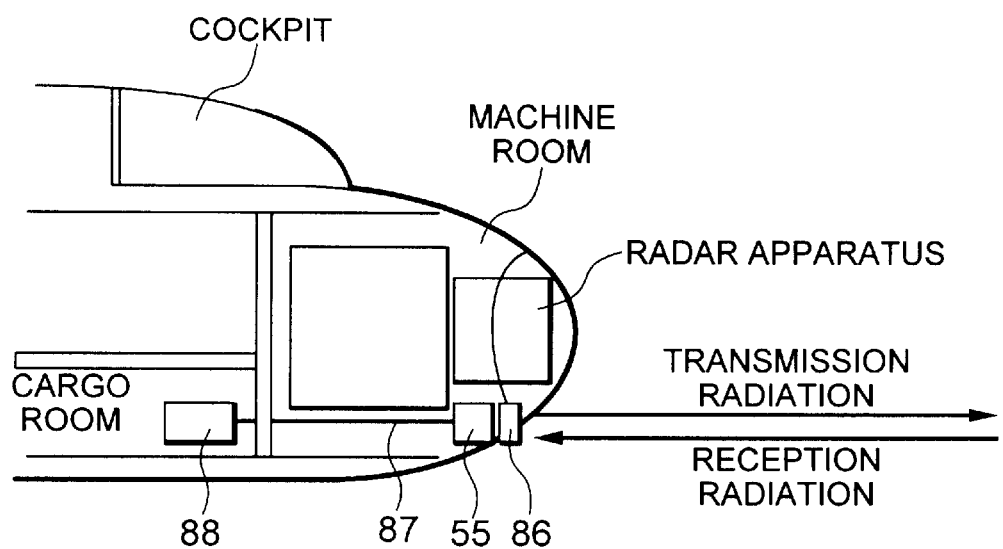
FIG. 9 is an explanatory diagram for explaining an example in the case where the coherent CW laser radar apparatus according to the embodiment mode 2 is mounted on an aircraft.

FIG. 9 illustratively shows an example when the coherent CW laser radar apparatus according to this embodiment mode 2 is mounted on an aircraft.

Since a wind velocity and/or a wind velocity distribution can be measured even in fine weather, the coherent laser radar apparatus mounted on the aircraft may be used as a sensor apparatus capable of sensing obstacles ahead including air turbulence. In this case, as to the mounting position of the coherent CW laser radar apparatus, this laser radar apparatus may be inserted into an exclusively-used pod and then the resulting pod may be mounted outside the aircraft, or may be alternatively set within a nose of this aircraft. In the case that this coherent CW laser radar apparatus is set within the aircraft nose, the following difficulty may be conceived. That is, since the aircraft radar apparatus and the like have already been installed within the aircraft nose, there is no sufficient space for this coherent CW laser radar apparatus. In this coherent CW laser radar apparatus according to the present invention, both the transmitted radiation and the received radiation may be readily propagated over long distances by employing the optical fiber 87. Therefore, only the optical antenna 55 should be installed within the aircraft nose, while other portions 88 may be installed in other installing spaces such as a cargo room.

It should also be noted that although a frequency shifter 59 is employed in the coherent CW laser radar apparatus of FIG. 8, this frequency shifter 59 may be committed in such a case that a Doppler shift caused by the movement of the moving object may be regarded as the intermediate frequency.

Embodiment Mode 3

Similar to the embodiment mode 2, a coherent CW laser radar apparatus, according to an embodiment mode 3 of the present invention, is mounted on a mobile object such as an aircraft, a satellite, and a vehicle. The structure and operations of this coherent CW laser radar apparatus are similar to those of the embodiment mode 2.

This embodiment mode 3 is featured to eliminate adverse influences caused by reflected/scattered radiation (namely internal reflection light) appearing in either the optical antenna 55 or the window 86 employed in the coherent CW laser radar apparatus mounted on the mobile object. More specifically, this coherent CW laser radar apparatus is mounted on such a mobile object moved in a high speed, for instance, an aircraft (airplane), and is effectively operable in measuring a target having a low reflectance as well as a small backward scattering coefficient. For example, this coherent CW laser radar apparatus may cover such a target having a small backward scattering coefficient as aerosol and atmospheric constructive molecule. It is now assumed that the frequency shifter 59 is omitted from this laser radar apparatus.

A frequency of a reception signal received from a target is equal to a summation between a Doppler shift caused when a mobile object is moved, and another Doppler shift caused by a velocity of the target. It is now assumed that a minimum frequency of a measuring frequency band to be measured, or which may be taken by the reception signal, is selected to be "$f_L$", and also a maximum frequency thereof is selected to be "$f_H$."

Figure 10:
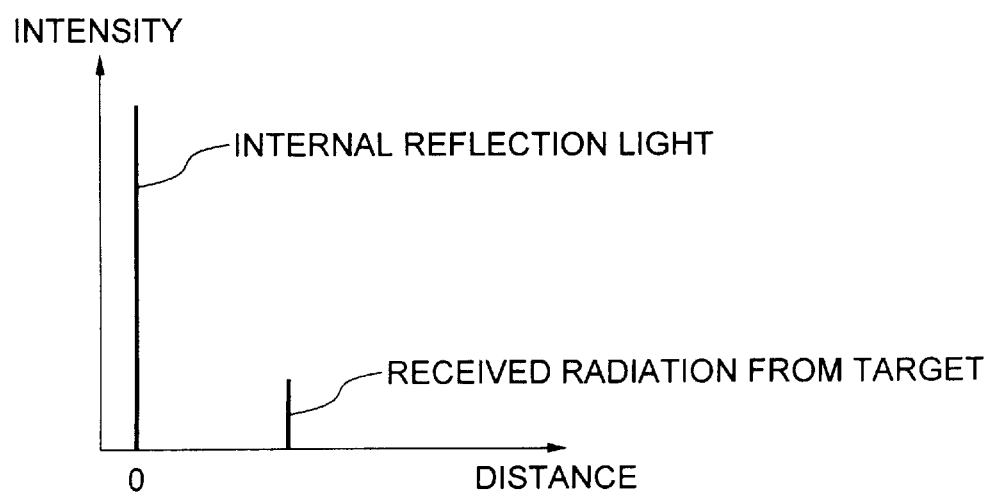
FIG. 10 is an explanatory diagram for explaining an intensity component ratio of received radiation of an optical antenna employed in a coherent CW laser radar apparatus and having a transmission/reception coaxial relationship when a target having a low reflectance is measured.

FIG. 10 graphically represents an intensity component ratio of received radiation in such a case that a target having a low reflectance is measured by a coherent CW laser radar apparatus in which an optical antenna is a transmission/reception coaxial antenna.

In the coherent laser radar apparatus, since a wave front of received radiation is made coincident with a wave front of local radiation, or this received radiation is coupled to an optical fiber, a light receiving field of the optical antenna becomes very narrow. To this end, to achieve a high S/N ratio, or to measure a wide distance band, the transmission/ reception coaxial optical antenna may be usually used.

As a result, the internal reflection light occurred in either the optical antenna or the window is mixed with the received radiation. As represented in FIG. 10, when such internal reflection light that exists in the vicinity of a distance "0" is larger than a signal reflected from a target, there is the following drawback. That is, even when the internal reflection light is spectrum-spread as a non-correlated component by performing the pseudo-random modulation, the spectrum intensity cannot be made sufficiently small, as compared with the peak intensity of the target. As a result, the target cannot be measured with a high S/N ratio. In this embodiment mode 3, since a time width "τ" of a pseudo-random signal per 1 bit is selected to be $\tau > 1/f_L$ (this pseudo-random signal is used in pseudo-random signal generating apparatus 56), the adverse influence caused by the above-explained internal reflection light can be reduced.

FIG. 11 graphically shows a spectrum of a reception signal in the case that the time width "τ" is selected to be $\tau > 1/f_L$, and also a spectrum of a reception signal in the case that time width "τ" is selected to be $\tau > 1/f_L$.

It is now assumed that a correlation relationship between these spectra can be perfectly established with respect to a reception signal component derived from a target. Since a Doppler shift is zero and is not correlated, the spectrum of the internal reflection light becomes such a spectrum that the frequency is spread from 0 to B=1/τ. When the time width "τ" is selected to be $\tau < 1/f_L$, both the spectrum of the reception signal from the target and the spectrum of the reception signal of the internal reflection light are present within the same frequency band.

Figure 11A:
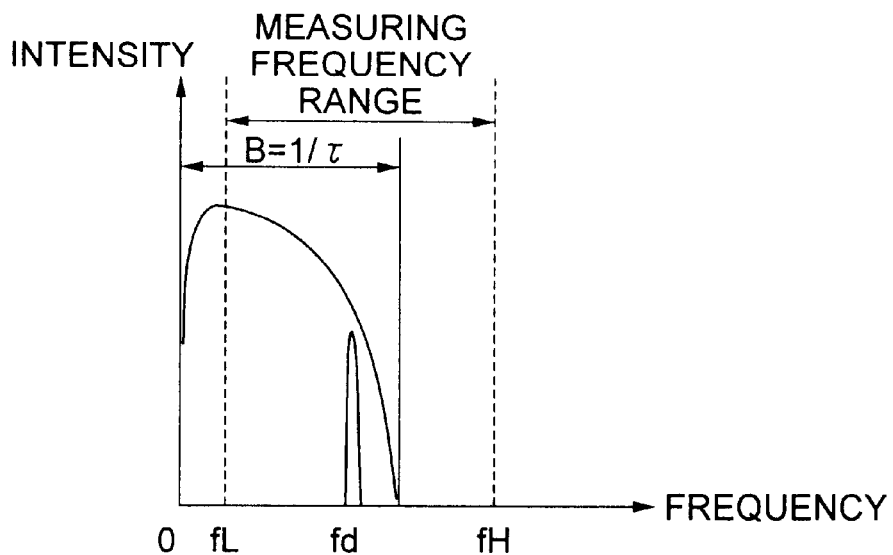
FIGS. 11A and 11B are explanatory diagrams of explaining a spectrum of reception signals in the case that a time width "τ" is set to $\tau<1/f_L$, and $\tau>1/f_L$.
Figure 11B:
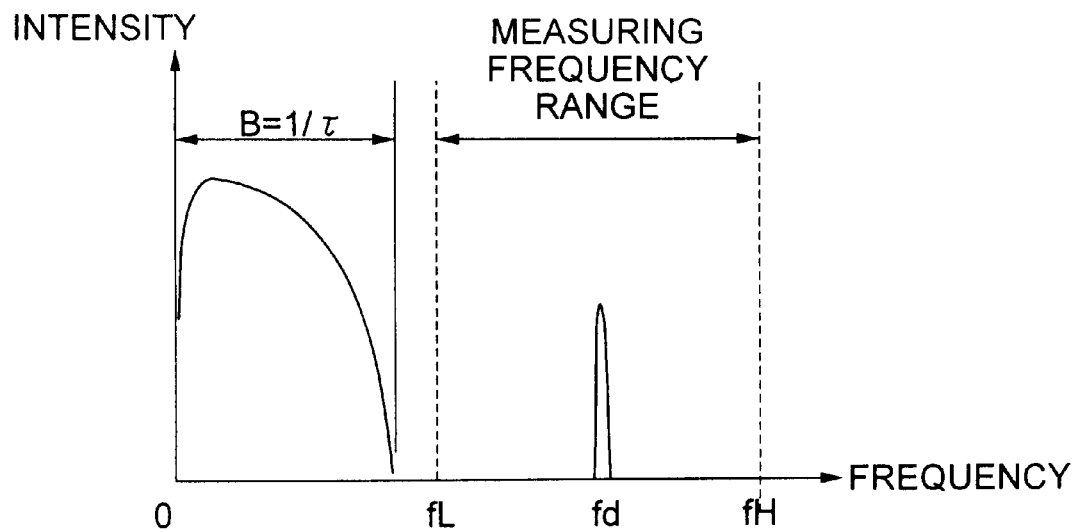

As a consequence, as indicated in FIG. 11A, when the intensity of the internal reflection light is high, the spectrum intensity cannot be made sufficiently small even by the spectrum spread, as compared with the peak intensity of the target, so that the measurement with the high S/N ratio cannot be carried out. To the contrary, when the time width "τ" is selected to be $\tau > 1/f_L$, as shown in FIG. 11B, since the measuring frequency band can be separated from the spectrum band of the internal reflection light, the adverse influence caused by the internal reflection light can be reduced.

As previously explained, there is such an advantage that the above-explained arbandment of the coherent CW laser radar apparatus mounted on the mobile object can reduce the adverse influence given to the S/N ratio, which is caused by the reflected/scattered radiation (will be referred to as "internal reflection light" hereinafter) produced in either the optical antenna 55 or the window 86.

Embodiment Mode 4

Figure 12:
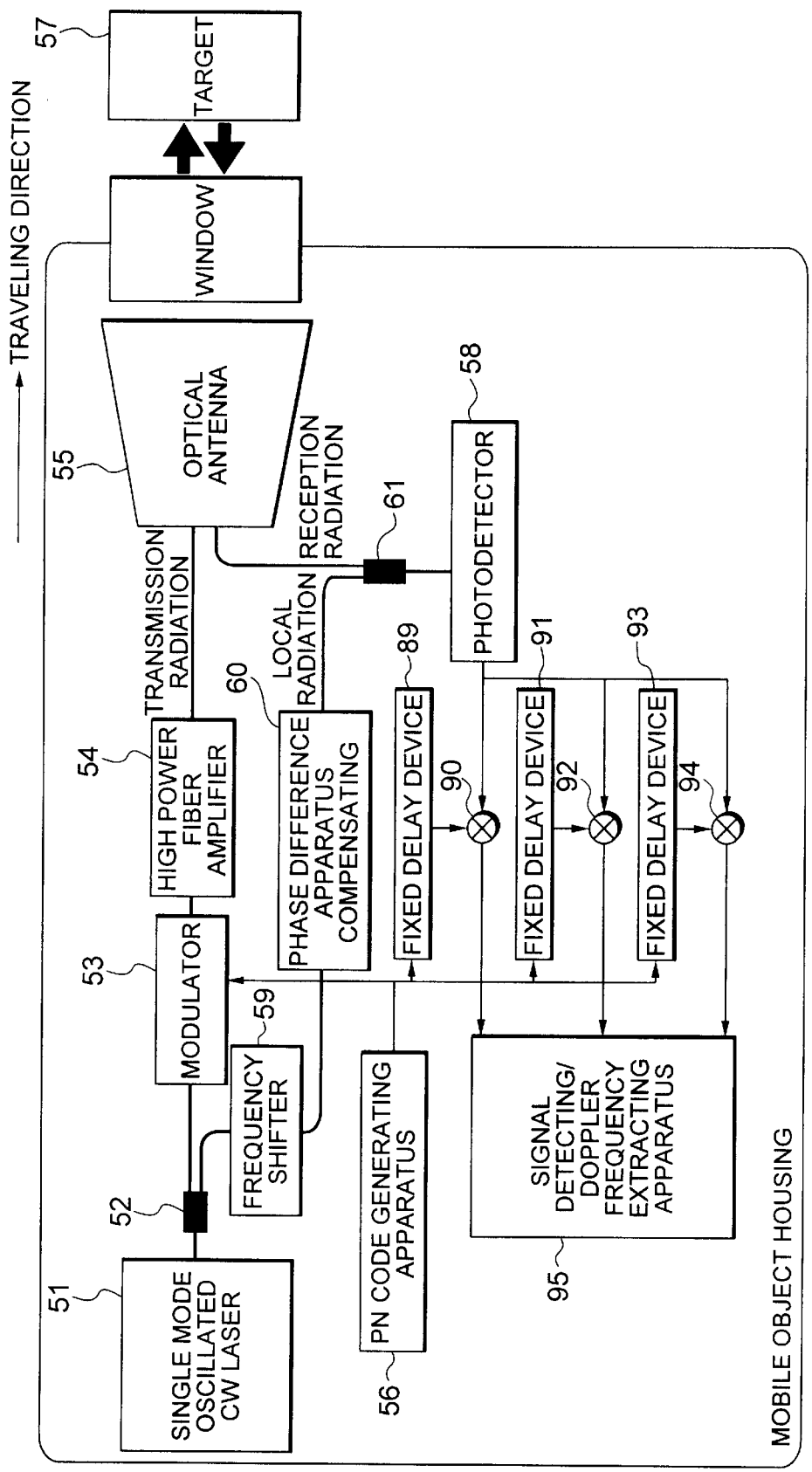
FIG. 12 is a structural diagram for indicating a coherent CW laser radar apparatus, according to an embodiment mode 4 of the present invention, mounted on a mobile object such as an aircraft, a satellite, and a vehicle, similar to the embodiment mode 2.

FIG. 12 is a structural diagram for indicating a coherent CW laser radar apparatus, according to an embodiment mode 4 of the present invention, which is mounted on a mobile object such as an aircraft, a satellite, and a vehicle, similar to the embodiment mode 2.

The arbandment and operations of this coherent CW laser radar apparatus are similar to those of the embodiment mode 2.

The coherent CW laser radar apparatus, according to this embodiment mode 4, owns a function capable of measuring a distribution of physical information such as density of targets and a velocity of target, which are distributed along a travel axis direction of a mobile object. This measuring function may be realized by executing a correlation process operation, while using a combination with a mixer and more than one set of fixed delay device.

FIG. 12 is a structural diagram for showing a coherent CW laser radar apparatus equipped with a combination of a correlating device with 3 sets of fixed delay devices.

A first fixed delay device 89 applies a certain fixed time delay to a pseudo-random modulation signal generated from the pseudo-random signal generating device 56. Next, a first correlating device 90 multiplies an output signal derived from the photodetector 58 by the time-delayed pseudo-random modulation signal so as to acquire correlation between these signals, and thereafter supplies the correlation output signal to a signal processing apparatus 95.

A set device between a second fixed delay device 91 and a second correlating device 92, and also a set device between a third fixed delay device 93 and a third correlating device 94 are operated in a similar manner to the above-described set device. The respective delay time applied by the respective fixed delay devices is different from each other. Each of the delay time may constitute such delay time that a correlation relationship can be established between the pseudo-random modulation signal, time-delayed by the respective fixed delay devices 89, 91, 93 and a reception signal received from a target located at a specific distance from the mobile object.

Figure 13:
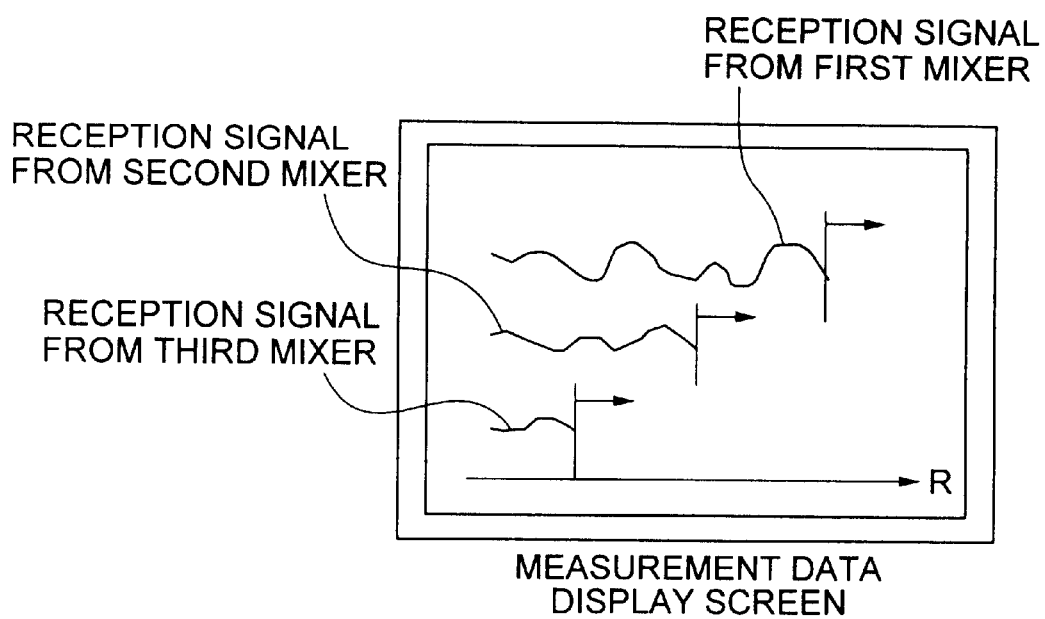
FIG. 13 is an explanatory diagram for explaining a representation example of measurement data.

FIG. 13 indicates a display example of measurement data.

An abscissa of this drawing shows a distance. Since space (distance) of information owned by reception signals derived from the first correlating device 90 is different from each other while the mobile object is moved, if these reception signals are continuously measured, then a spatial distribution of the physical information of the target may be obtained. Furthermore, spatial distributions of physical information of the target may be obtained based upon a reception signal derived from the second correlating device 92 and a reception signal derived from the third correlating device 94 in a similar manner. Since the coherent CW laser radar apparatus is provided with plural sets of the fixed delay devices and the correlating devices, the measuring distance band can be swept within a short time period. The data about the measuring distance band can be updated within a short time period, although a total number of this updating operation is just equal to a total number of these set devices.

In the conventional coherent CW laser radar apparatus, in order to measure the spatial distribution of the physical information of the target, the delay time is varied by the variable delay device having the function capable of varying the delay time, so that the measurement region is swept. However, in the coherent CW laser radar apparatus mounted on the mobile object, since the sweeping operation can be carried out by moving the mobile object, such a variable delay device may be substituted by a simple fixed delay device. As a consequence there is such a merit that the coherent CW laser radar apparatus of the embodiment mode can be made with a simpler structure. Also, there is another merit that the data of the measurement distance band can be updated within a short time period.

Embodiment Mode 5

In accordance with this embodiment mode 5, such a system is accomplished by using a simpler structure, and this system owns two functions, namely a function of a coherent CW laser radar apparatus and another function of an optical space communication.

Figure 14:
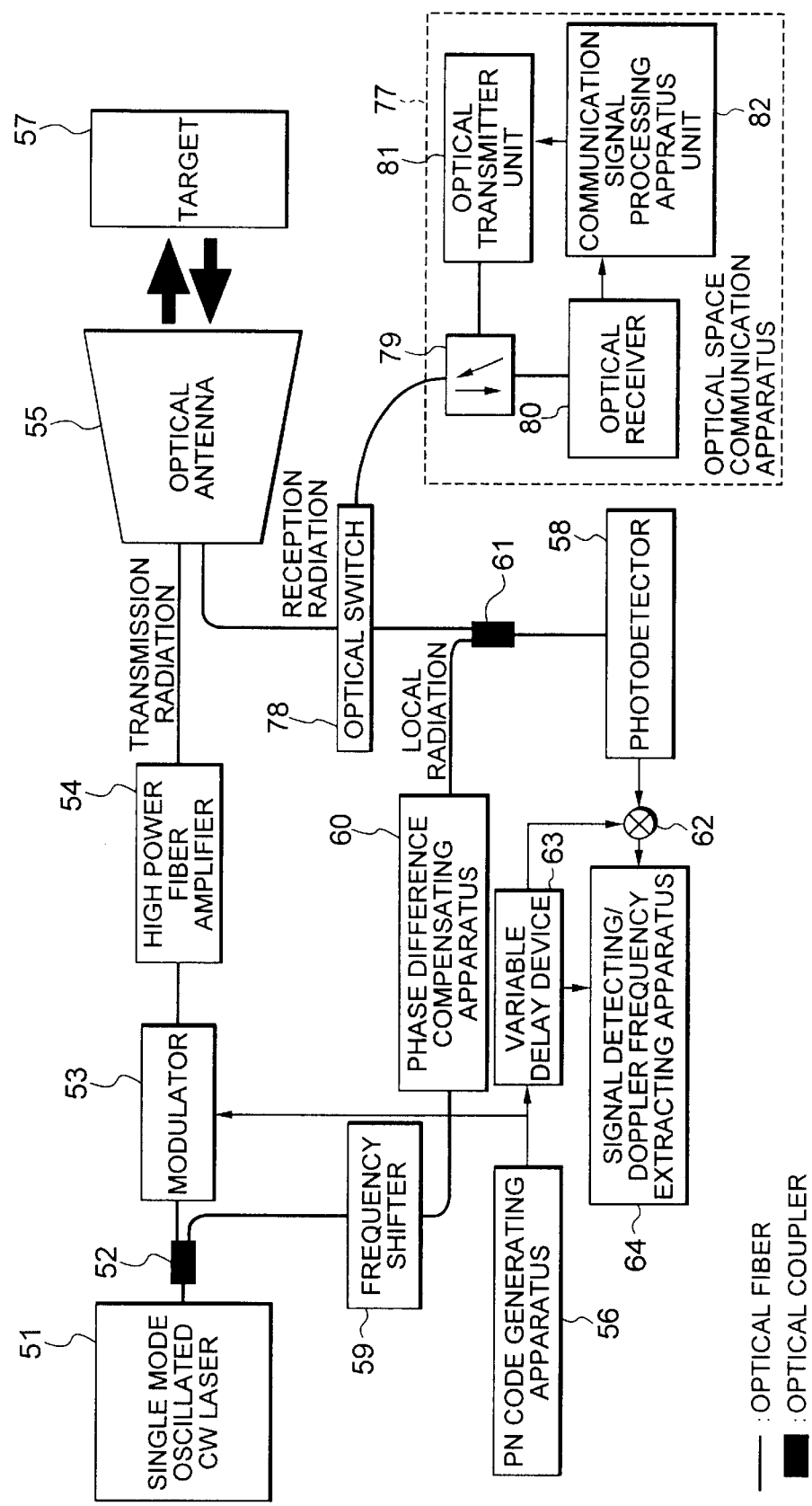
FIG. 14 is a structural diagram of such a system, according to an embodiment mode 5 of the present invention, that a function of an optical space communication apparatus is added to the coherent CW laser radar apparatus according to the embodiment modes 1 through 4.

FIG. 14 indicates a system in which a function of an optical space communication apparatus is additionally provided with the coherent CW laser radar apparatus shown in any one of the embodiment modes 1 to 4. It should be understood that the operation of the coherent CW laser radar apparatus is similar to that of the embodiment modes 1 to 4.

In this arbandment shown in this drawing, an optical space communication apparatus 77 is connected via an optical switch 78 provided in the optical path of the received radiation to the coherent CW laser radar apparatus. This optical space communication apparatus 77 is arbandd by an optical circulator 79, an optical receiver 80 for receiving received radiation of an optical communication, an optical transmitter 81 for outputting transmitted radiation of the optical communication, and a communication signal processing apparatus 82. Since the optical antenna for transmitting/receiving the light is commonly used in both the coherent CW laser radar apparatus and the optical space communication apparatus, the entire system can be made simple and compact by reducing a total number of entire components.

In the case that this system is used as the coherent CW laser radar apparatus, the optical switch 78 is operated in such a manner that the optical path is connected from the optical antenna 55 to the photodetector 58. When this system is used as the optical space communication apparatus, this optical switch 78 is operated in such a manner that the optical path is switched from the photodetector 58 to the optical spacer communication apparatus 77.

The optical circulator 79 owns such a function that the received radiation supplied from the optical switch 78 is traveled to the optical receiver 80, and furthermore, the transmitted radiation for the optical communication purpose supplied from the optical transmitter 81 is traveled to the optical switch 78.

The optical receiver 80 owns such a function capable of detecting the received radiation, and supplying the reception gnal to the communication signal processing apparatus 82.

The communication signal processing apparatus 82 owns a function for demodulating the above-explained reception signal so as to extract communication information, and also another function for producing a modulation signal based upon communication information to be transmitted and for supplying the modulation signal to the optical transmitter 81.

The optical transmitter 81 owns a function for outputting transmitted radiation which is modulated by employing the modulation signal supplied from the communication signal processing apparatus 82. It should be noted that a reception portion of the optical antenna is employed as the transmission/reception optical antenna for the optical space communication.

The received radiation of the optical space communication may achieve the optical space communication function with employment of the above-described structure. As previously explained, in this embodiment mode 5, since the structural components are commonly used, the system can realize both the function of the coherent CW laser radar apparatus and the function of the optical space communication apparatus, while employing such a simpler arbandment. Therefore, there is an advantage that the entire system can be made simple and compact.

Embodiment Mode 6

Figure 15:
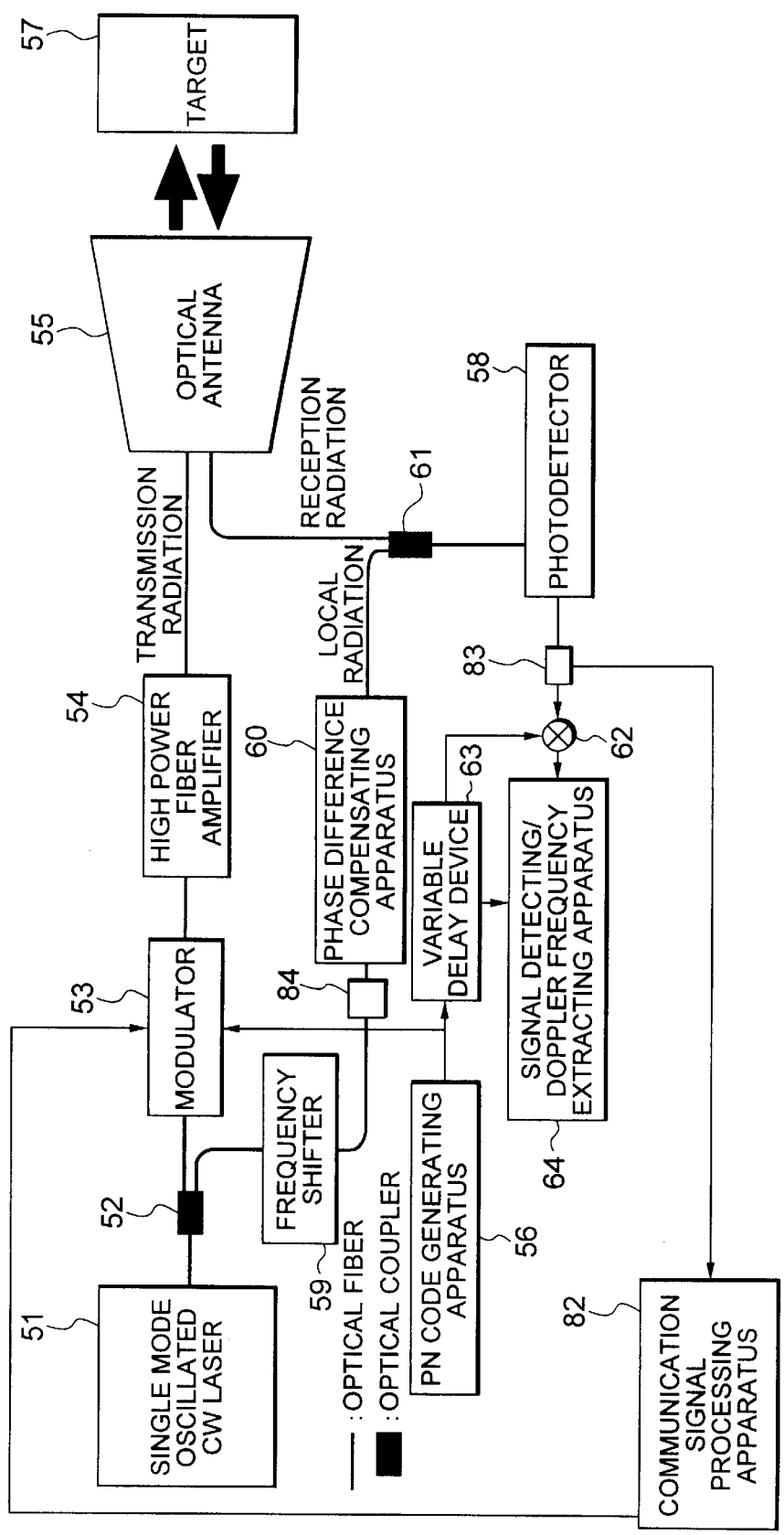
FIG. 15 is a structural diagram of such a system, according to an embodiment mode 6 of the present invention, that a function of an optical space communication apparatus is added to a function of a coherent CW laser radar apparatus.

In accordance with this embodiment mode 5, such a system shown in FIG. 15 is accomplished by using a simpler structure, and this system owns two functions, namely a function of a coherent CW laser radar apparatus and another function of an optical space communication. FIG. 15 indicates the coherent CW laser radar apparatus in which a function of an optical space communication apparatus is additionally provided with the coherent CW laser radar apparatus shown in any one of the embodiment modes 1 to 4. It should be understood that the operation of the coherent CW laser radar apparatus is similar to that of the embodiment modes 1 to 4.

In the case that this system is employed as the optical space communication apparatus, an output signal derived from the photodetector 58 is supplied as a reception signal of an optical communication to the communication signal processing apparatus 82 by manipulating a switch 83. An optical switch 84 turns OFF the local radiation when the detecting system of the optical space communication is the direct detecting system, whereas the optical switch 84 turns ON the local radiation when the detecting system of the physical space communication is the optical heterodyne detecting system. The communication signal processing apparatus 82 owns a function for demodulating the above-explained reception signal so as to extract communication information, and also another function for producing a modulation signal based upon communication information to be transmitted and for supplying the modulation signal to the optical modulator 53. The optical modulator 53 owns a function for outputting transmitted radiation which is modulated by employing the modulation signal supplied from the communication signal processing apparatus 82, to the space via the optical antenna 55.

As previously explained, with employment of the above-described arbandment, the necessary function as the optical space communication apparatus is accomplished as follows: That is, the function of the optical transmitter may be achieved by the CW laser 51, the optical modulator 53, and the optical fiber amplifier 54, whereas the function of the optical receiver may be realized by the photodetector 58, and also the function of the optical antenna for the optical space communication may be achieved by the optical antenna 55. As previously described, since the optical space communication apparatus employs the structural components commonly used in the coherent CW laser radar apparatus, the system can realize both the function of the coherent CW laser radar apparatus and the function of the optical space communication apparatus, while employing such a simpler arbandment. Therefore, there is an advantage that the entire system can be made simple and compact.

Embodiment Mode 7

Figure 16:
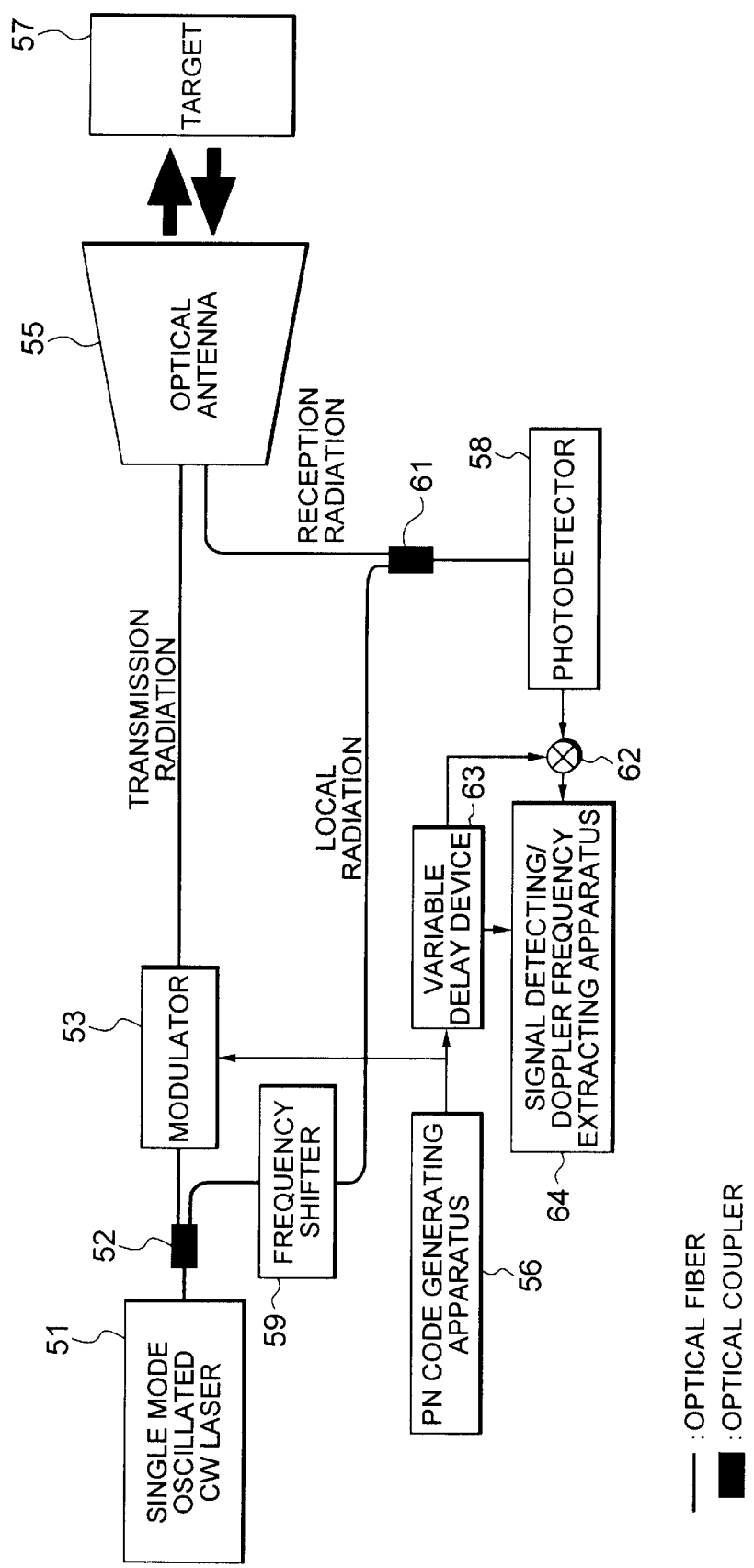
FIG. 16 is a structural diagram for indicating a coherent laser radar apparatus according to an embodiment mode 7 of the present invention.

FIG. 16 is a structural diagram for schematically showing an arbandment of a coherent CW laser radar apparatus according to an embodiment mode 7 of the present invention.

In the coherent CW laser radar apparatus having the arbandment shown in FIG. 16, laser radiation emitted from a CW (continuous wave) laser 51 which is oscillated with having a single wavelength of "$f_0$" is coupled to an optical fiber, and this laser radiation is entered into a first fiber type optical coupler 52, and then is separated into two sets of CW laser radiation. One of the two-divided laser radiation is used as transmitted radiation, and the other of the two-divided laser radiation is employed as local radiation used in an optical heterodyne detection.

The transmitted radiation is traveled via an optical modulator 53 and a high power optical fiber amplifier 54, which are provided in an optical path of the optical fiber, to a optical antenna 55.

The optical modulator 53 modulates transmitted radiation by a pseudo-random modulation signal corresponding to a pseudo-random sequence (PN code) (for example, M sequence) derived from a pseudo-random signal generating apparatus 56. As this modulating method, any one of the intensity modulating method, the frequency modulating method, and the phase modulating method may be employed. In this embodiment mode 7, the M sequence (total sequence being "N" and time width of 1 bit being "τ") is employed as the pseudo-random sequence (PN code), and the phase modulating method is employed as the modulating method.

Figure 17:
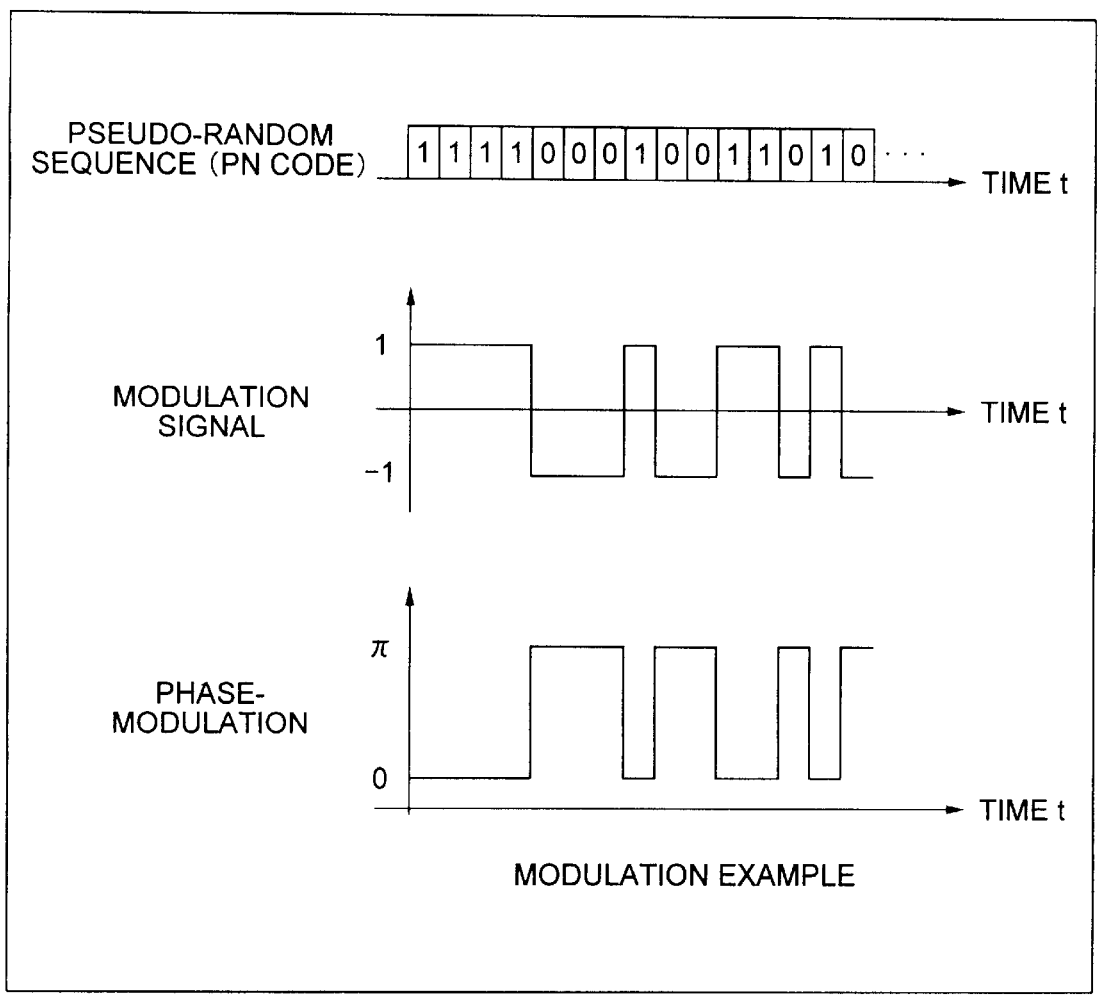
FIG. 17 is an explanatory diagram for explaining a modulation example of transmitted radiation according to the embodiment mode 7 of the present invention.

FIG. 17 represents an example of modulation methods for transmitted radiation.

The pseudo-random signal generating apparatus 56 repeatedly generates a pseudo-random modulation signal in a continuous manner. This pseudo-random modulation signal outputs a voltage of [1, −1] in response to a value [1, 0] of a pseudo-random sequence (PN code) every time τ has passed. The optical modulator 53 phase-modulates the transmitted radiation in response to the value [1, −1] of the pseudo-random modulation signal by using two values of [0, −τ].

The optical antenna 55 owns a first function and a second function. As to this first function, the optical antenna 55 converts the transmitted radiation transmitted from the optical fiber into a laser beam having a beam diameter "$D_r$" and a radial curvature "F" of a wave front, and then projects this converted laser beam toward a target 57. As to the second function, the optical antenna 55 receives a portion of scattered radiation, or reflected light of the above-explained laser beam from the target 57, and then couples the received light to an optical fiber conducted to a photodetector 58 which performs an optical heterodyne detection. When the target 57 is moved with respect to the laser radar apparatus, since the received radiation is Dopper-shifted in response to the moving speed (velocity) of the target 57, the frequency of the received radiation becomes $f_0+f_d$, assuming now that the Doppler frequency is selected to be "$f_d$".

On the other hand, the other laser radiation, which is employed as the above-explained local radiation and is produced by subdividing the laser radiation in 2 by employing the first fiber type optical coupler 52, is processed by a frequency shifter 59 which is provided in the optical path of the optical fiber. Then, the processed laser radiation is mixed with received radiation supplied from the optical antenna 55 by a second fiber type optical coupler 61, and thereafter, the mixed laser radiation is supplied to the photodetector 58.

In the frequency shifter 59, the local radiation is frequency-shifted by a component of an intermediate frequency "$f_{IF}$" and thus, the frequency of this shifted local radiation becomes $f_0+f_{IF}$.

The received radiation mixed with the local radiation is optical-heterodyne-detected by the photodetector 58 in a square detection. As a result, a beat signal between the received radiation and the local radiation is outputted from the photodetector 58. The beat signal between the received radiation and the local radiation is multiplied in a correlating device 62 by such a pseudo-random modulation signal so as to be correlated. This pseudo-random modulation signal is generated from the pseudo-random signal generating apparatus 56, and is time-delayed by arbitrary delay time "$t_d$" by a variable delay device 63. A signal processing apparatus 64 analyzes a signal intensity and a frequency of a correlation signal derived from the correlating device 62 so as to detect the target and also the Doppler frequency.

In this embodiment mode 7, it is now assumed that the following time can be neglected. That is to say, the negligible time is: time required after the pseudo-random modulation signal is generated by the pseudo-random signal generating apparatus 56 and until the transmitted radiation is modulated by the optical modulator 53; and further time required after the pseudo-random modulation signal is generated by the pseudo-random modulation signal and then is reached to the correlating device 62 except for the delay time $t_d$ given by the variable delay device 63; and also time required when the beat signal between the received radiation and the local radiation is reached from the photodetector 58 to the correlating device 62.

A frequency spectrum of an output signal from the correlating device 62 when the target is a soft target is basically equal to the frequency spectrum of the conventional coherent CW laser radar.

The coherent CW laser radar apparatus, according to this embodiment mode 7, is featured by that the below-mentioned pseudo-random modulating signal is employed as the pseudo-random modulation signal generated from the pseudo-random modulation signal generating apparatus 56 in order to increase an S/N ratio, and also to suppress an adverse influence caused by a summation of spread spectra of the plural space layers having no correlation. This pseudo-random modulation signal owns a sufficiently long sequence length of distance equivalent to a time period per one sequence length, as compared with the effective reception distance band. This S/N ratio may express a ratio of a signal intensity to reception system noise such as shot noise and thermal noise.

As a consequence, an occupation ratio of a total number of non-correlative space layers within the effective reception distance band to the entire sequence is decreased, so that the intensity of the summation of the spread spectra of the plural non-correlative space layers can be suppressed.

A frequency spectrum of an output signal derived from the correlating device 62 is acquired.

Figure 18A:
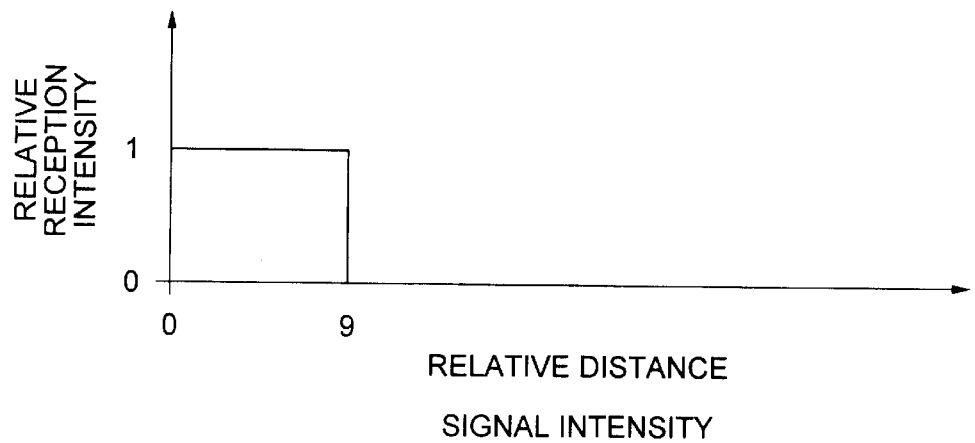
FIGS. 18A and 18B are explanatory diagrams for explaining a sequence length of a pseudo-random modulation signal and a signal intensity according to the embodiment mode 7.
Figure 18B:
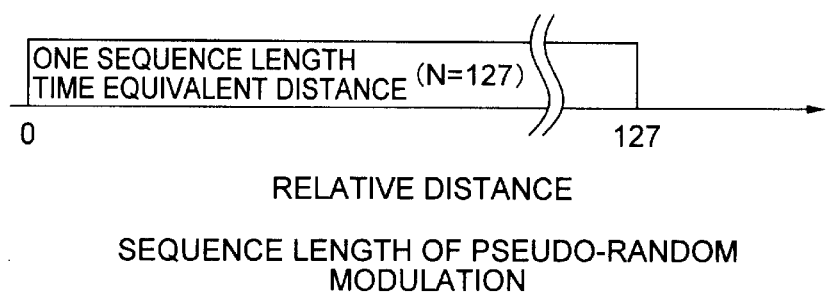

The effective reception instance band is determined based upon the focal distance "F" of the receiver optics and also the aperture radius "$D_r$" of the receiver optics. As indicated in FIGS. 18A and 18B, it is now assumed that the effective reception distance band is 9×ΔR (see FIG. 18A) which is equivalent to 9 bits of the pseudo-random modulation signal. While as the used pseudo-random modulation signal, the pseudo-random sequence (PN code) is equal to 127-bit M sequence, the delay time is set in order for the correlation to be made coincident with a reception signal from one space layer that exists in the effective reception distance band (see FIG. 18B). This is such a relationship that a ratio of the effective reception distance band to the one sequence length time equivalent distance is substantially equal to 1:14.

Figure 19:
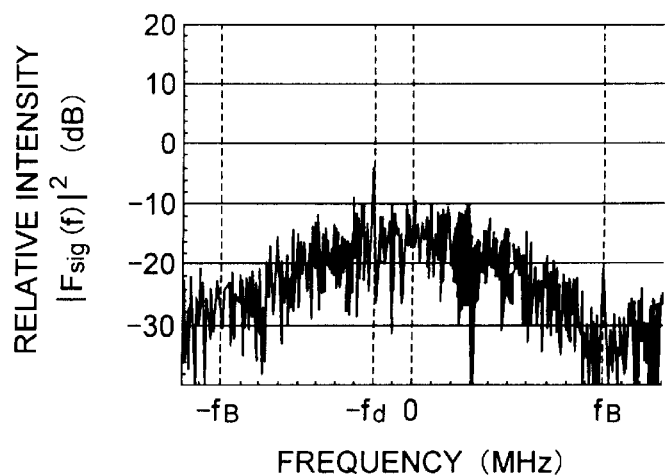
FIG. 19 is an explanatory diagram for explaining a frequency spectrum of a reception signal under the condition shown in FIG. 18.

FIG. 19 graphically shows the frequency spectrum of the output signal at this time.

Figure 37:
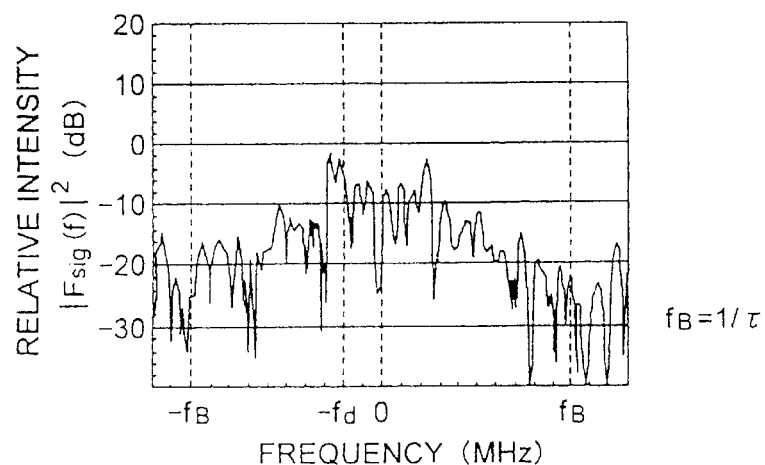
FIG. 37 is an explanatory diagram for explaining the frequency spectrum of the reception signal obtained in the FFT circuit 102 under the condition shown in FIGS. 36A and 36B.

Apparent from the comparison between this embodiment mode and the prior art shown in FIG. 37, while the intensity of the summation of the spread spectra of the plural space layers having no correlation can be suppressed, with respect to the spectrum of the reception signal from the space layer having a correlation coincident with pseudo-random modulation signal, a single sharp peak appears at a frequency of "−$f_d$."

Figure 20A:
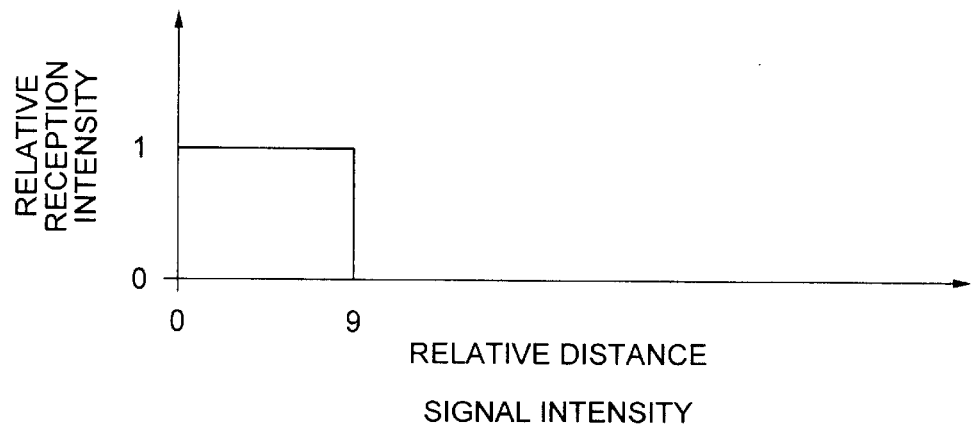
FIGS. 20A and 20B are explanatory diagrams for explaining a signal intensity and a sequence length of a pseudo-random-modulation signal in the case that a ratio of an effective reception distance band and a distance equivalent to one sequence length time is increased.
Figure 20B:
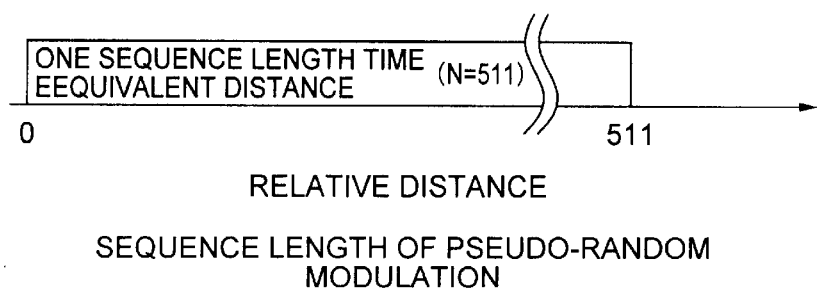
Figure 21:
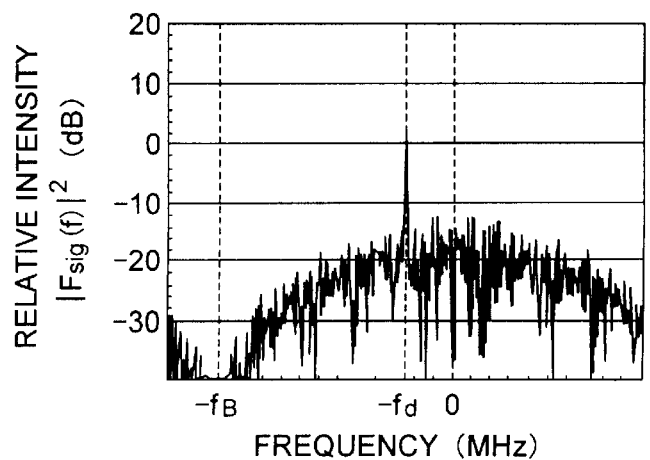
FIG. 21 is an explanatory diagram for explaining a frequency spectrum of a reception signal under the condition shown in FIGS. 20A and 20B.

Furthermore, as indicated in FIG. 20A and FIG. 20B, under such a condition that the ratio of the effective reception distance band to the one sequence length time equivalent distance is increased, a frequency spectrum of an output signal is represented in FIG. 21. At this time, the ratio of the effective reception distance band to the one sequence length time equivalent distance is nearly equal to 1:57. The employed pseudo-random modulation signal is the pseudo-random sequence (PN code) equal to 511-bit M sequence. The intensity of the summation of the spread spectra of the plural space layers having no correlation can be furthermore suppressed, as compared with that of FIGS. 19A and 19B. A ratio of this intensity of the spread spectra summation to the intensity of the spectrum of the reception signal received from the space layer having a correlation coincident with pseudo-random modulation signal, appeared in the frequency becomes larger than or equal to 12 dB, while comparing the maximum values with each other.

If such a condition is established by that a ratio of a peak value of spectra of reception signals received from the space layer having a correlation coincident with pseudo-random modulation signal, appearing in the frequency "$-f_d$" to maximum intensity of summations of spread spectra of the plural space layers having no correlation becomes larger than or equal to 10 dB, then the one sequence length time equivalent distance is made more than 30 times larger than the effective reception distance band.

As previously explained, in accordance with the coherent CW laser radar apparatus of this embodiment mode 7, since such a pseudo-random modulation signal is employed which has a sufficiently long sequence length of the one series time equivalent distance, as compared with the effective reception distance band, there is an effect. That is, it is possible to suppress the adverse influence caused by the summation of the spread spectra of the plural non-correlative space layers even when the soft target is measured. As a result, a high precision measurement can be carried out. Since the one sequence length time equivalent distance is made more than 30 times larger than the effective reception distance band, the ratio of the peak value of the spectra of the reception signals received from the correlative space layer to the maximum intensity of the summations of the spread spectra of the plural non-correlative space layers can become larger than or equal to 10 dB.

In addition, since the pseudo-random modulation signal with a long one sequence length time is used, there is such an advantage that the high S/N ratio can be achieved.

Embodiment Mode 8

Figure 22:
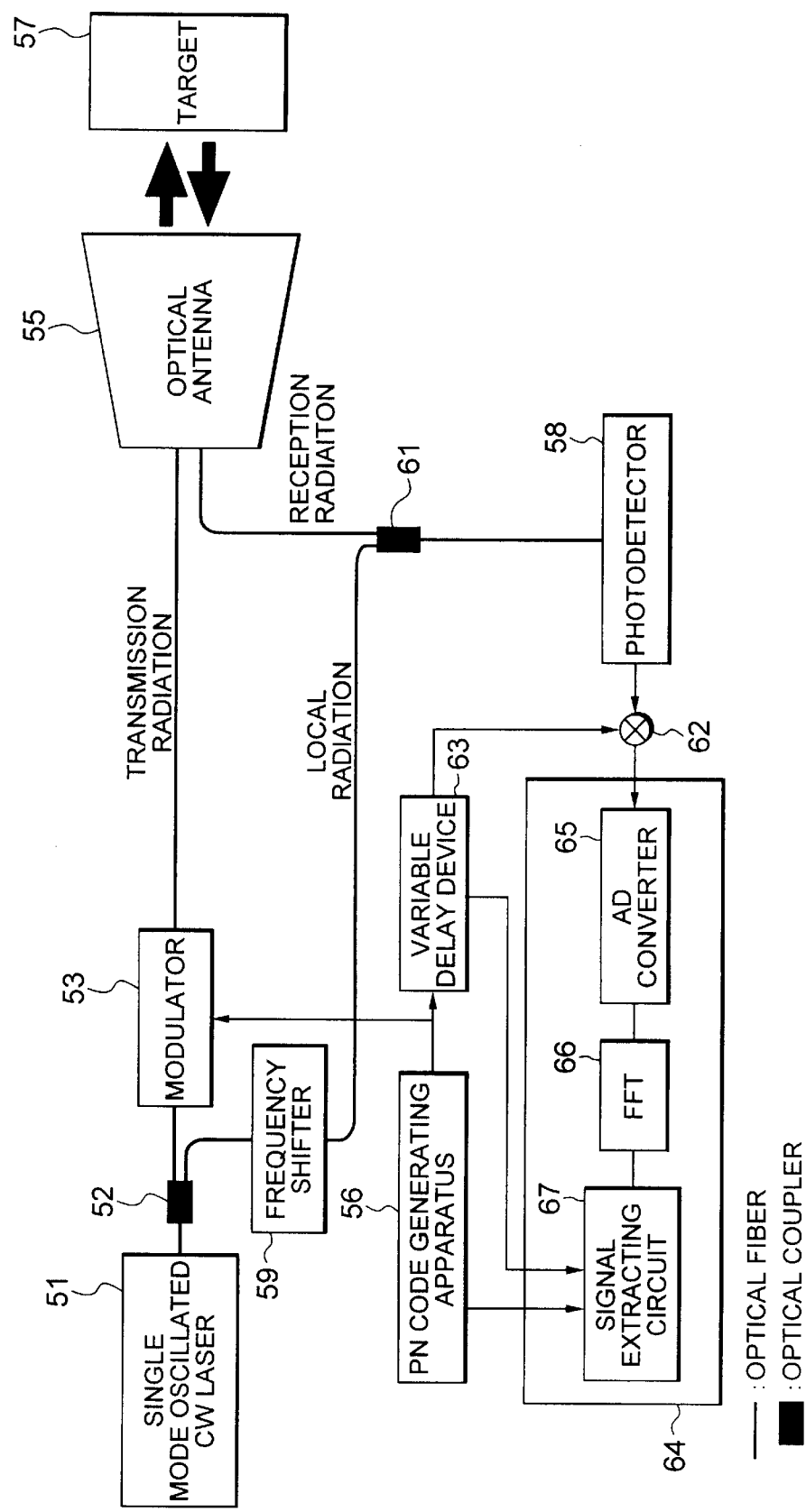
FIG. 22 is a structural diagram for showing a coherent laser radar apparatus according to an embodiment mode 8 of the present invention.

FIG. 22 is a structural diagram for schematically showing an arbandment of a coherent CW laser radar apparatus according to an embodiment mode 8 of the present invention.

In the coherent laser radar apparatus having the arbandment shown in this drawing, laser radiation emitted from a CW (continuous wave) laser 51 which is oscillated with having a single wavelength of "$f_0$" is coupled to an optical fiber, and then this laser radiation is entered into a first fiber type optical coupler 52, and then is separated into two sets of CW laser radiation. One of the two-divided laser radiation is used as transmitted radiation, and the other of the two-divided laser radiation is employed as local radiation used in an optical heterodyne detection.

The transmitted radiation is traveled via an optical modulator 53 and a high power optical fiber amplifier 54, which are provided in an optical path of the optical fiber, to a optical antenna 55.

The optical modulator 53 modulates transmitted radiation by a pseudo-random modulation signal corresponding to a pseudo-random sequence (PN code) (for example, M sequence) derived from a pseudo-random signal generating apparatus 56. As this modulating method, any one of the intensity modulating method, the frequency modulating method, and the phase modulating method may be employed. In this embodiment mode 8, the M sequence (total sequence being "N" and time width of 1 bit being "τ") is employed as the pseudo-random sequence (PN code), and the phase modulating method is employed as the modulating method.

An example of modulation methods for transmitted radiation is shown in FIG. 2.

The transmission/reception separating optical antenna 55 owns a first function and a second function. As to this first function, the optical antenna 55 converts the transmitted radiation transmitted from the optical fiber into a laser beam having a beam diameter "$D_r$" and a radial curvature "F" of a wave front, and then irradiates this converted laser beam toward a target 57. As to the second function, optical antenna 55 receives a portion of scattered radiation, or reflected light of the above-explained laser beam from the target 57, and then couples the received light to an optical fiber conducted to a photodetector 58 which performs an optical heterodyne detection. When the target 57 moved with respect to the laser radar apparatus, since the received radiation is Dopplr-shifted in response to the moving speed (velocity) of the target 57, the frequency of the received radiation becomes $f_0+f_d$, assuming now that the Doppler frequency is selected to be "$f_d$".

On the other hand, the other laser radiation, which is employed as the above-explained local radiation and is produced by subdividing the laser radiation into 2 by employing the first fiber type optical coupler 52, is processed by a frequency shifter 59 which is provided in the optical path of the optical fiber. Then, the processed laser radiation is combined with the received radiation supplied from the optical antenna 55 by a second fiber type optical coupler 61, and thereafter, the mixed laser radiation is supplied to the photodetector 58. In the frequency shifter 59, the local radiation is frequency-shifted by a component of an intermediate frequency "$f_{IF}$", and thus, the frequency of this shifted local radiation becomes $f_0+f_{IF}$.

The received radiation combined with the local radiation is optical-heterodyne-detected by the photodetector 58 in a square detection. As a result, a beat signal between the received radiation and the local radiation is outputted from the photodetector 58. The beat signal between the received radiation and the local radiation is multiplied in a correlating device 62 by such a pseudo-random modulation signal so as to be correlated. This pseudo-random modulation signal is generated from the pseudo-random signal generating apparatus 56, and is time-delayed by arbitrary delay time "$t_d$" by a variable delay device 63.

A signal processing apparatus 64 analyzes a signal intensity and a frequency of a correlation signal derived from the correlating device 62, so as to detect the target and also the Doppler frequency. The signal processing apparatus 64 is arbandd by an A/D converter 65, an FFT circuit 66, and a signal extracting circuit 67. In this embodiment mode 8, it is now assumed that the following time can be neglected. That is to say, the negligible time is: time required after the pseudo-random modulation signal is generated by the pseudo-random signal generating apparatus 56 and until the transmitted radiation is modulated by the optical modulator 53; and further time required after the pseudo-random modulation signal is generated by the pseudo-random generating apparatus 56 and then is reached to the correlating device 62 except for the delay time $t_d$ given by the variable delay device 63; and also time required when the beat signal between the received radiation and the local radiation is reached from the photodetector 58 to the correlating device 62.

A frequency spectrum of an output signal derived from the correlating device 62 in such a case that the target is a soft target is basically equal to that of the conventional coherent CW laser radar.

The coherent CW laser radar apparatus, according to this embodiment mode 8, is featured by the pseudo-random modulation signal that is formed by a series of modulation signals based upon a plurality of different pseudo-random sequence (PN code), and this pseudo-random modulation signal corresponds to the monitoring time per 1 measuring operation required to obtain a sufficiently large S/N ratio. As a result, the FFT (fast Fourier transform) calculation may be carried out in the unit of such a modulation signal formed based upon each of the pseudo-random sequence (PN code) of the above-explained plural modulation signals. Finally, the spectrum of the reception signal can be obtained by summing the respective frequency spectra which is obtained by executing the FFT calculation. As a consequence, since the FFT calculations are carried out by subdividing a total number of measurement data, a total calculation amount can be reduced.

Figure 23:
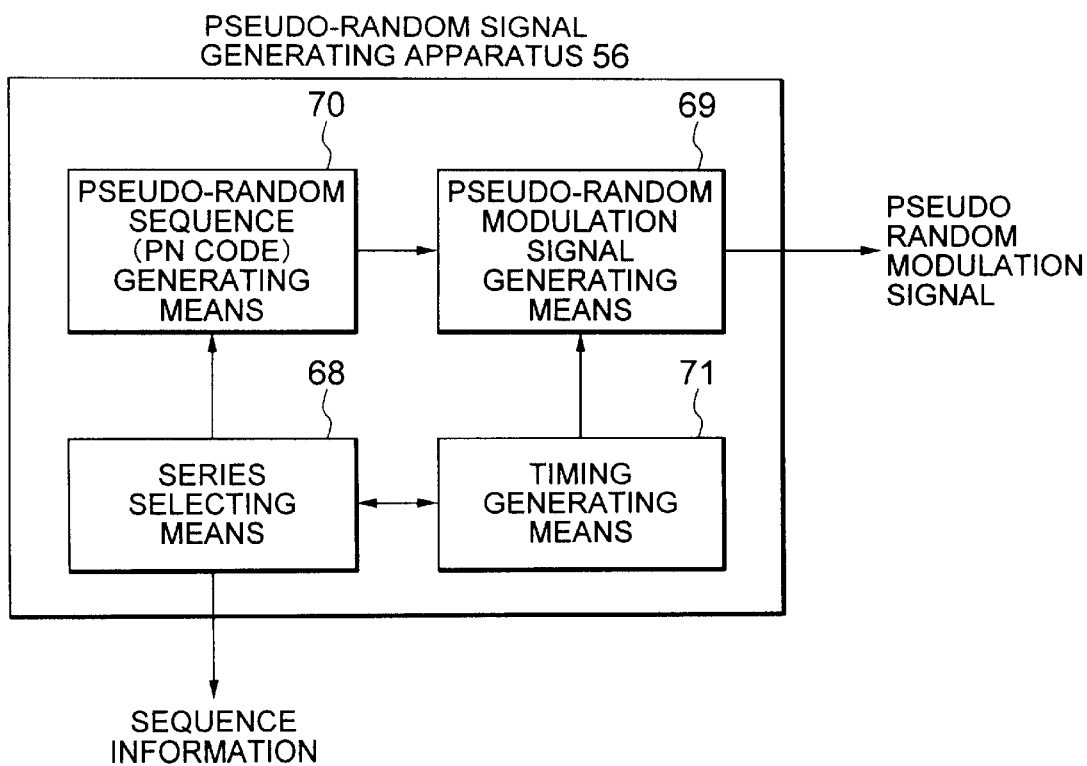
FIG. 23 is an internal structural diagram for representing a pseudo-random signal generating apparatus according to the embodiment mode 8 of the present invention.

The pseudo-random signal generating apparatus 56 for generating the modulation signal based upon a plurality of different pseudo-random sequence (PN code) is equipped with an arbandment shown in FIG. 23.

That is, this pseudo-random signal generating apparatus 56 is arbandd by series selecting means 68, pseudo-random modulation signal generating means 69, pseudo-random sequence (PN code) generating means 70, and timing generating means 71. The pseudo-random sequence (PN code) generating means 70 owns a plurality of different pseudo-random sequence (PN code), and supplies an arbitrary pseudo-random sequence (PN code) to the pseudo-random modulation signal generating means 69 in response to the signal sent from the series selecting means 68. The timing generating means 71 generates a timing signal having an arbitrary time interval in response to the signal sent from the series selecting means 68. The series selecting means 68 selects both the pseudo-random sequence (PN code) and the time width "τ" of the modulation signal per 1 bit, so as to generate the pseudo-random modulation signal from the pseudo-random modulation signal generating means 69.

Figure 24:
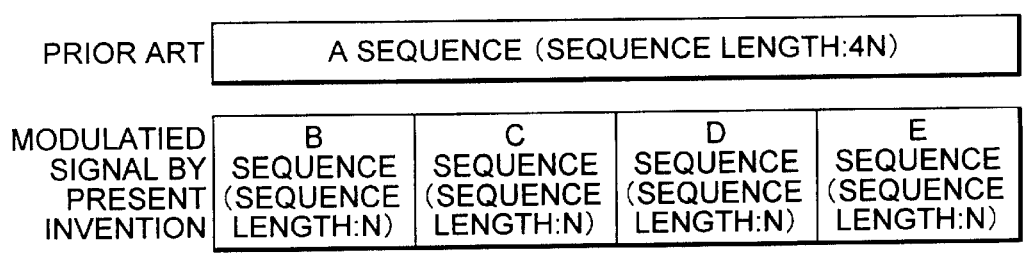
FIG. 24 is an explanatory diagram for explaining an example of a pseudo-random modulation signal.

FIG. 24 indicates an example of the pseudo-random modulation signal produced in this embodiment mode 8.

A conventional pseudo-random sequence (PN code) employed in a pseudo-random modulation signal is set as an A sequence, in which a time period per 1 sequence length corresponds to the monitoring time per 1 measuring operation.

The pseudo-random modulation signal, according to this embodiment mode 8, is constructed of 4 sets of pseudo-random sequence (PN code) B, C, D, and E which are different from each other, and each of these sequence lengths is nearly equal to ¼ of the A sequence. The frequency analyzing operation for the reception signal is carried out as follows: That is, the FFT circuit performs the FFT calculations of this reception signal 4 times in each unit of these four pseudo-random sequence (PN code) B, C, D, E. Then, the signal extracting circuit 67 sums four sets of frequency spectra so as to acquire such a spectrum equivalent to the frequency spectrum which is acquired by FFT-calculating the reception signal in a batch mode by the pseudo-random modulation signal with employment of the A sequence.

Figure 25:
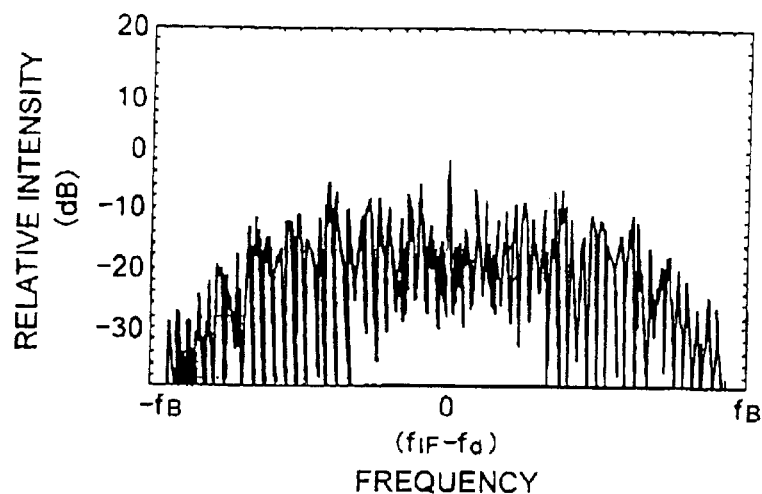
FIG. 25 is an explanatory diagram for explaining an example of a frequency spectrum of a reception signal in the case that a pseudo-random modulation signal is employed and is constituted by 4 sets of the pseudo-random sequence (PN code) shown in FIG. 24.

FIG. 25 graphically represents an example of a frequency spectrum of a reception signal in the case that a pseudo-random modulation signal constituted by four pseudo-random sequence (PN code) B, C, D, E is employed.

Figure 36A:
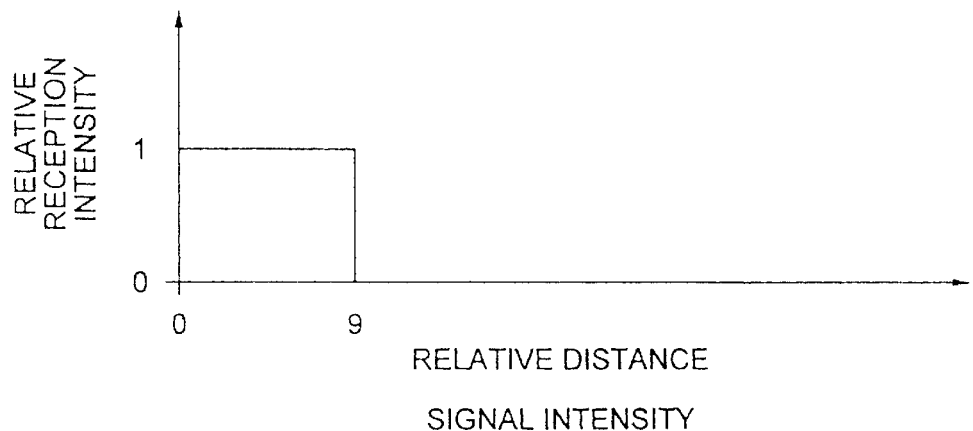
FIGS. 36A and 36B are explanatory diagrams for explaining the signal intensity and the sequence length of the pseudo-random modulation signal in the prior art.
Figure 36B:
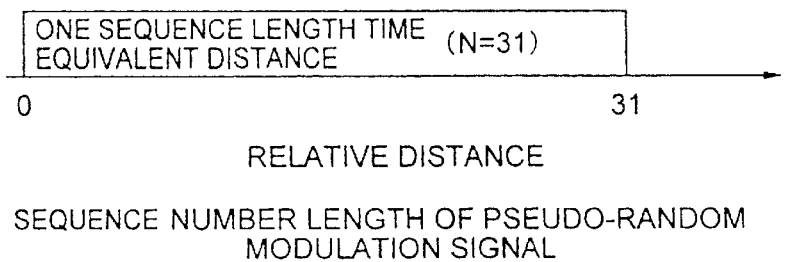
Figure 38:
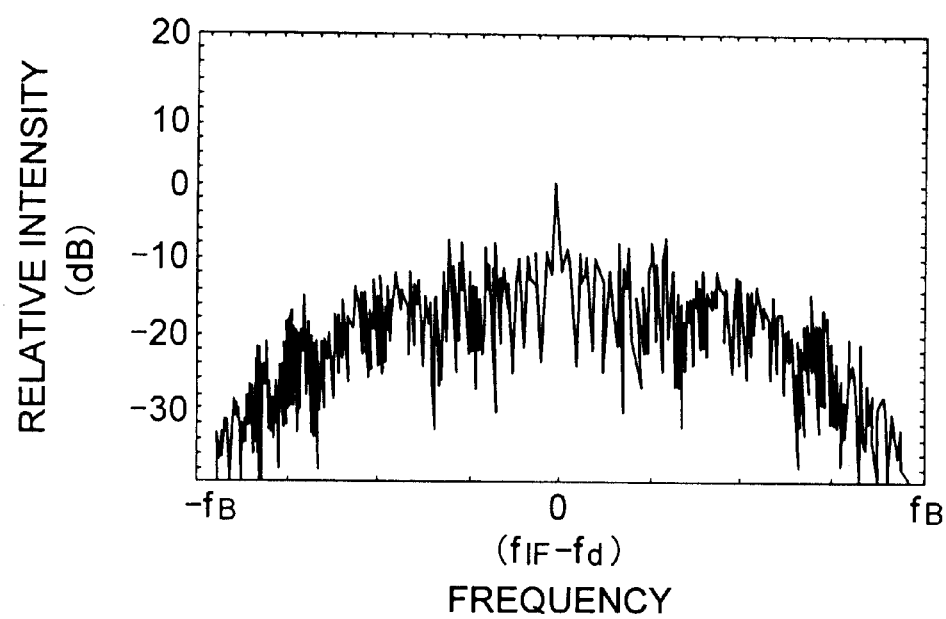
FIG. 38 is an explanatory diagram for explaining the spectrum of the reception signal in the case that the uniform soft target is measured by employing the pseudo-random series having the sequence length of 127 bits in the prior art.

In this frequency spectrum example, sequence lengths of these four pseudo-random sequence (PN code) B, C, D, E are selected to be 31. Also, the time width "τ" per 1 bit is equal to the pseudo-random sequence (PN code) used in FIG. 36. Similar to the frequency spectrum of the prior art as shown in FIG. 38, it can obtain such a frequency spectrum of the reception signal in accordance with this embodiment mode 8.

Figure 26:
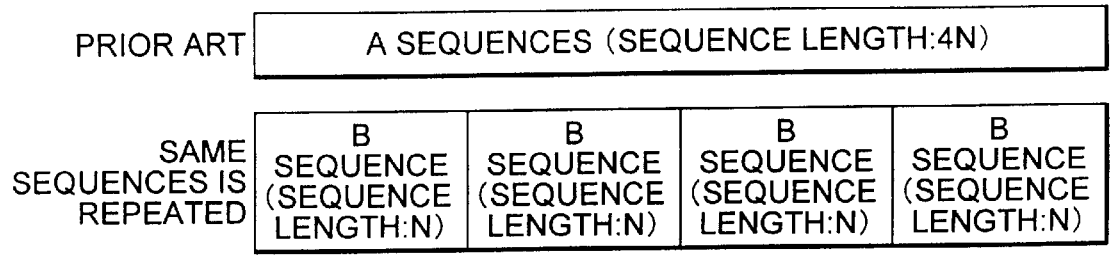
FIG. 26 is an explanatory diagram for explaining an example of a pseudo-random modulation signal by repeatedly employing the same pseudo-random sequence (PN code)

On the other hand, as shown in FIG. 26, another example will now be considered in which the same pseudo-random sequence (PN code) is repeatedly employed. As indicated in this drawing, the pseudo-random modulation signal corresponds to a reception of B sequence.

Figure 27:
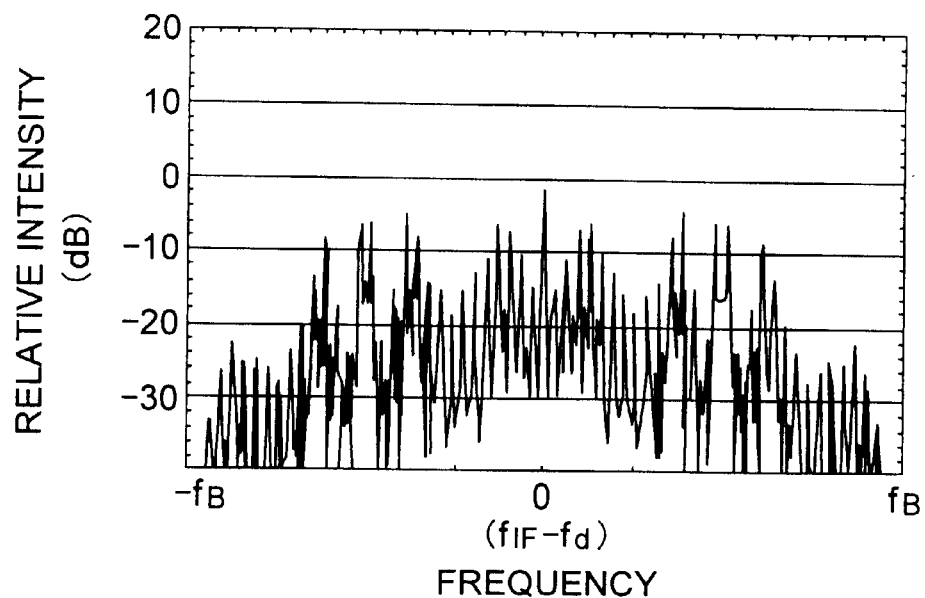
FIG. 27 is an explanatory diagram for explaining an example of a frequency spectrum of a reception signal in the case that a pseudo-random modulation signal is employed and is made by repeatedly using the B-series shown in FIG. 26 four times.

FIG. 27 graphically indicates a frequency spectrum of a reception signal in the case that a pseudo-random modulation signal formed by repeating the B sequence 4 times is employed. A sequence length of this B sequence is similarly selected to be 31. As apparent from this drawing, when the same sequence is repeatedly used even in the same monitoring time, since the spectrum is spread, the intensitys of the reception signals (correlation of a frequency $f_{IF}-f_d$ is not coincident) received a spectrum spread from the entire non-correlative distance within the distance band cannot be sufficiently suppressed. This distance band is extended over such a wide frequency band defined from "$-f_B$" to "$f_B$", in which the effective received radiation intensity can be obtained. Moreover, such a reception signal received from a distance where a correlation of a frequency $f_{IF}-f_d$ is made coincident cannot be detected in high precision.

Figure 28:
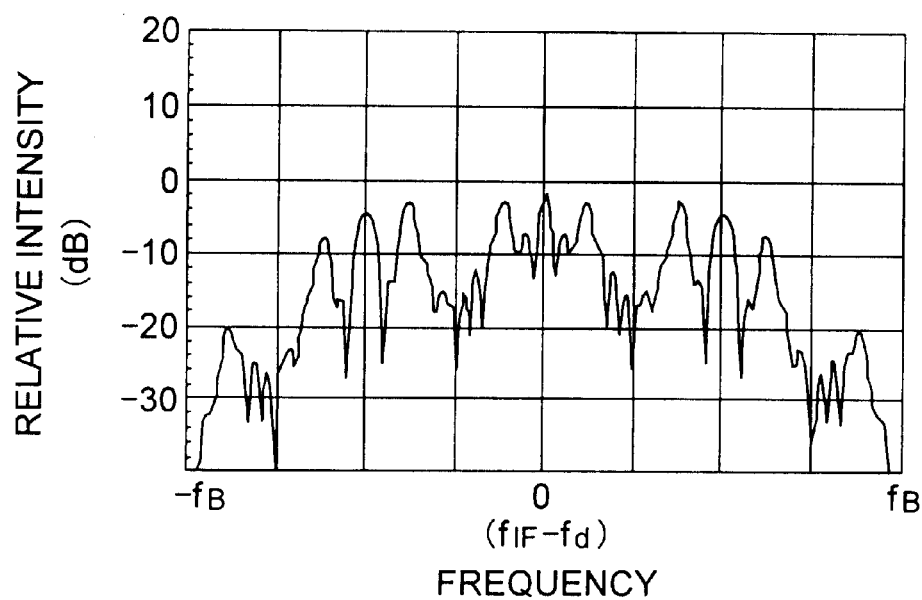
FIG. 28 is an explanatory diagram for explaining a frequency spectrum of a reception signal received once for the B series indicated in FIG. 26.
Figure 29:
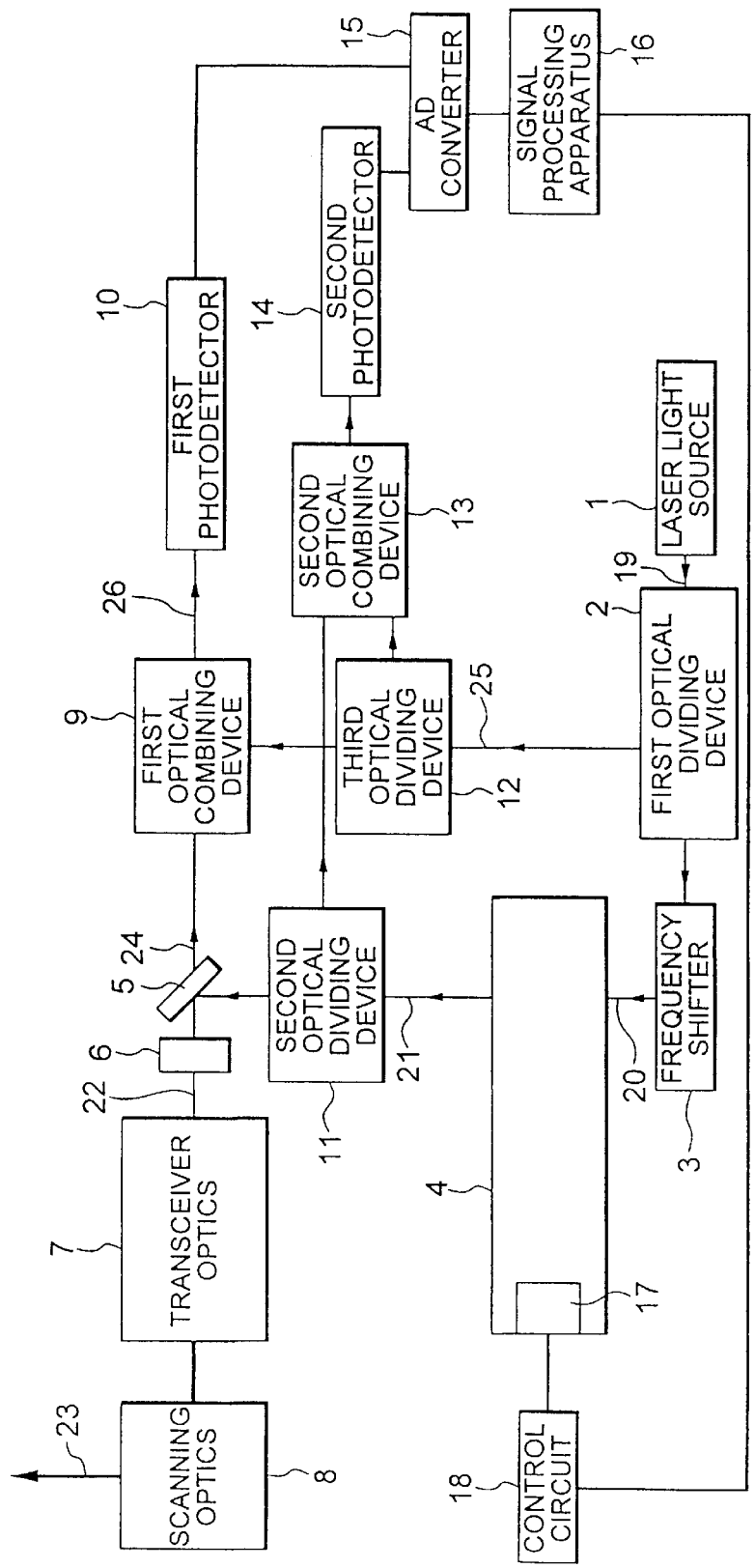
FIG. 29 is a structural diagram of the coherent laser radar apparatus with employment of the injection-seeded pulse laser apparatus as the light source, described in U.S. Pat. No. 5,237,331 entitled to Sammy W. Henderson et al.
Figure 30:
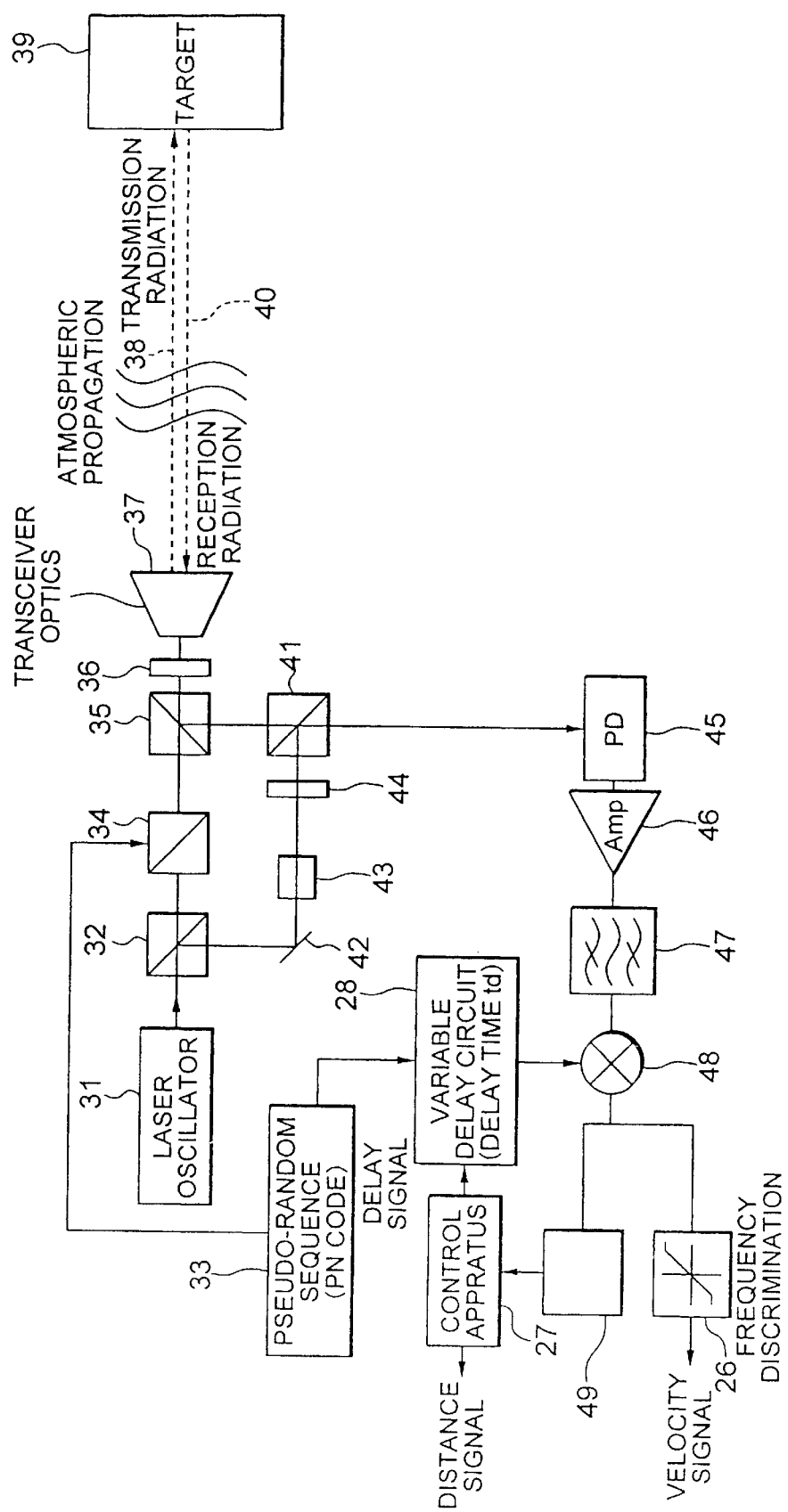
FIG. 30 is a structural diagram for indicating the coherent CW laser radar apparatus with employment of the CW laser oscillating a laser radiation having a single wavelength as the light source, described in Japanese Patent Application Laid-open No. Hei 2-284087 filed by HIRANO et al.
Figure 31:
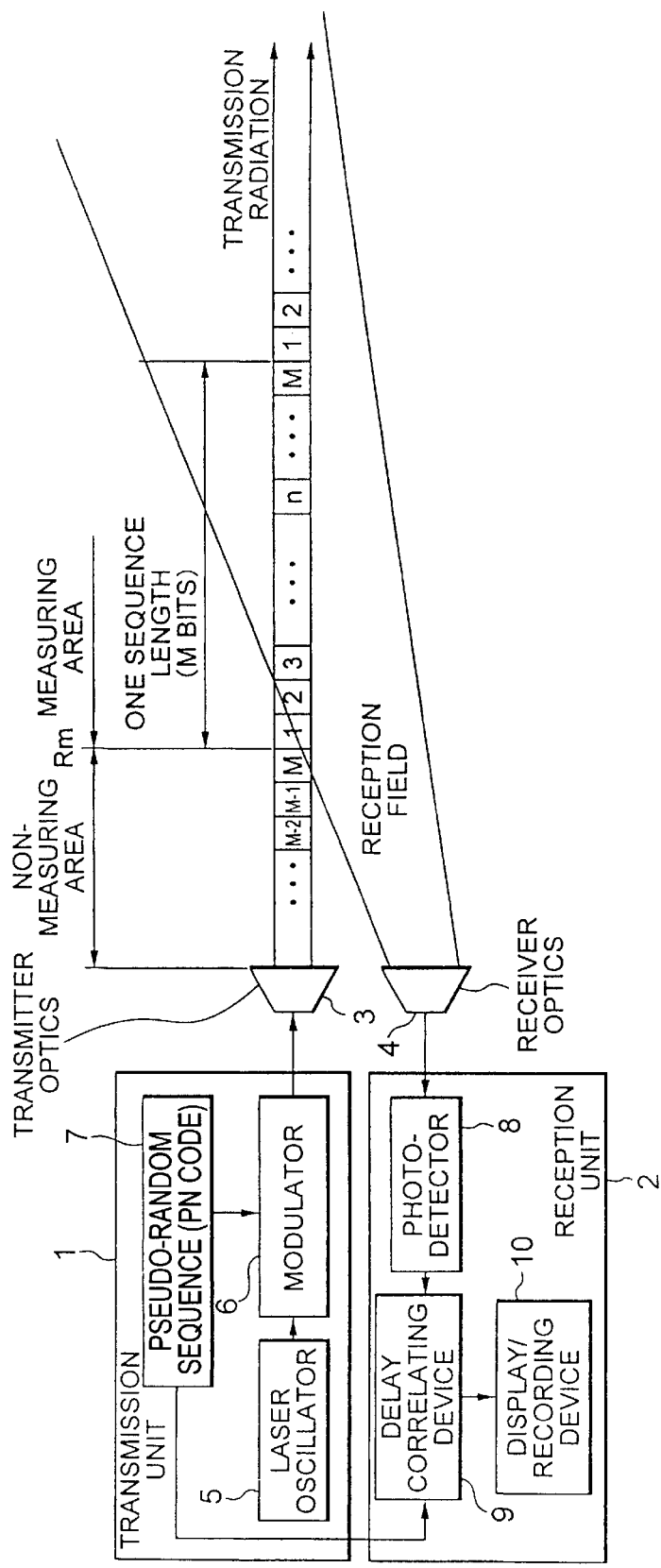
FIG. 31 is a structural diagram for showing the laser radar apparatus described in Japanese Examined Patent Publication No. Sho 64-2903.
Figure 32:
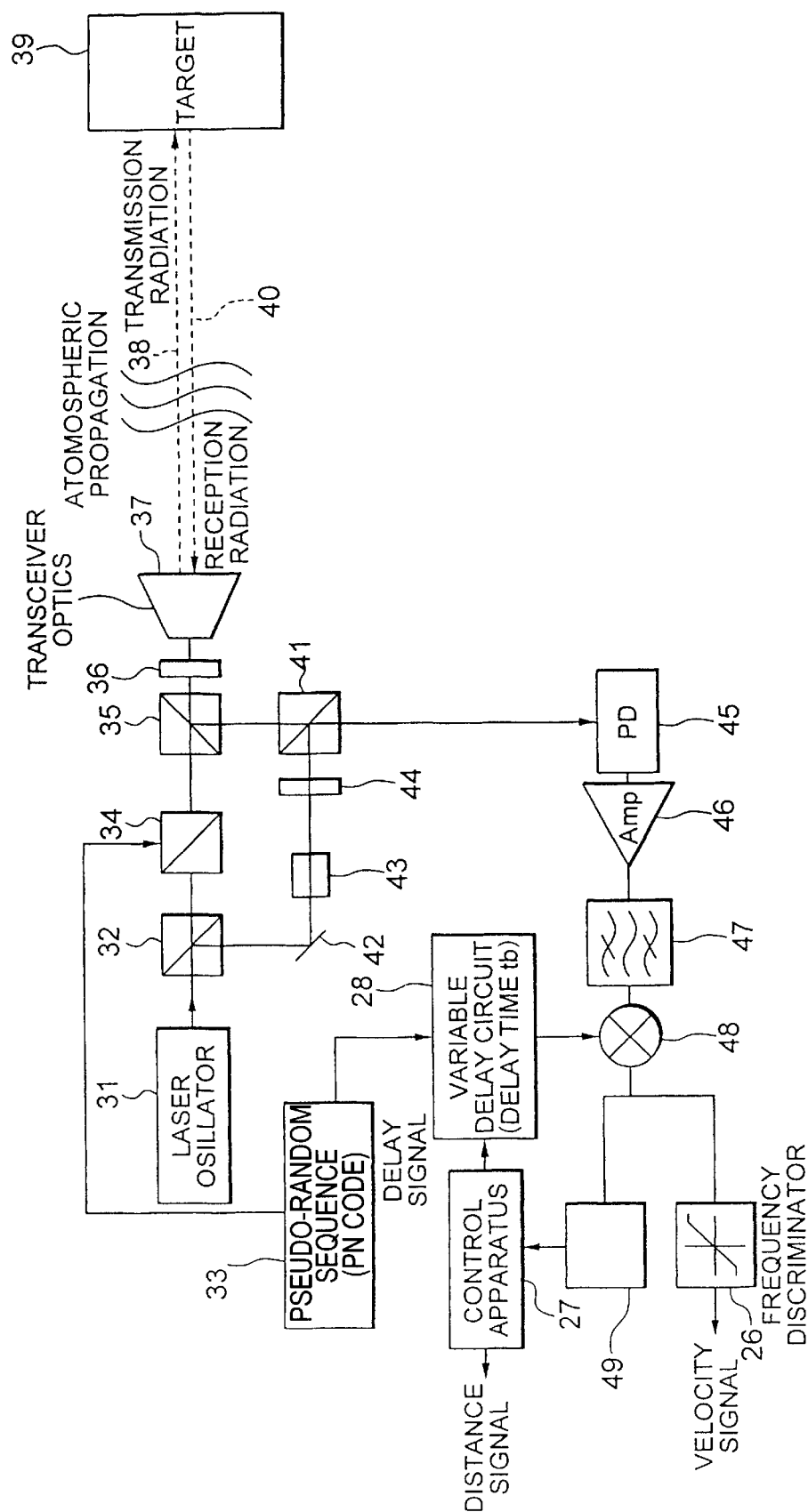
FIG. 32 is a structural diagram for representing the coherent CW laser radar apparatus described in Japanese Patent Application Laid-open No. Hei 2-284087.
Figure 33:
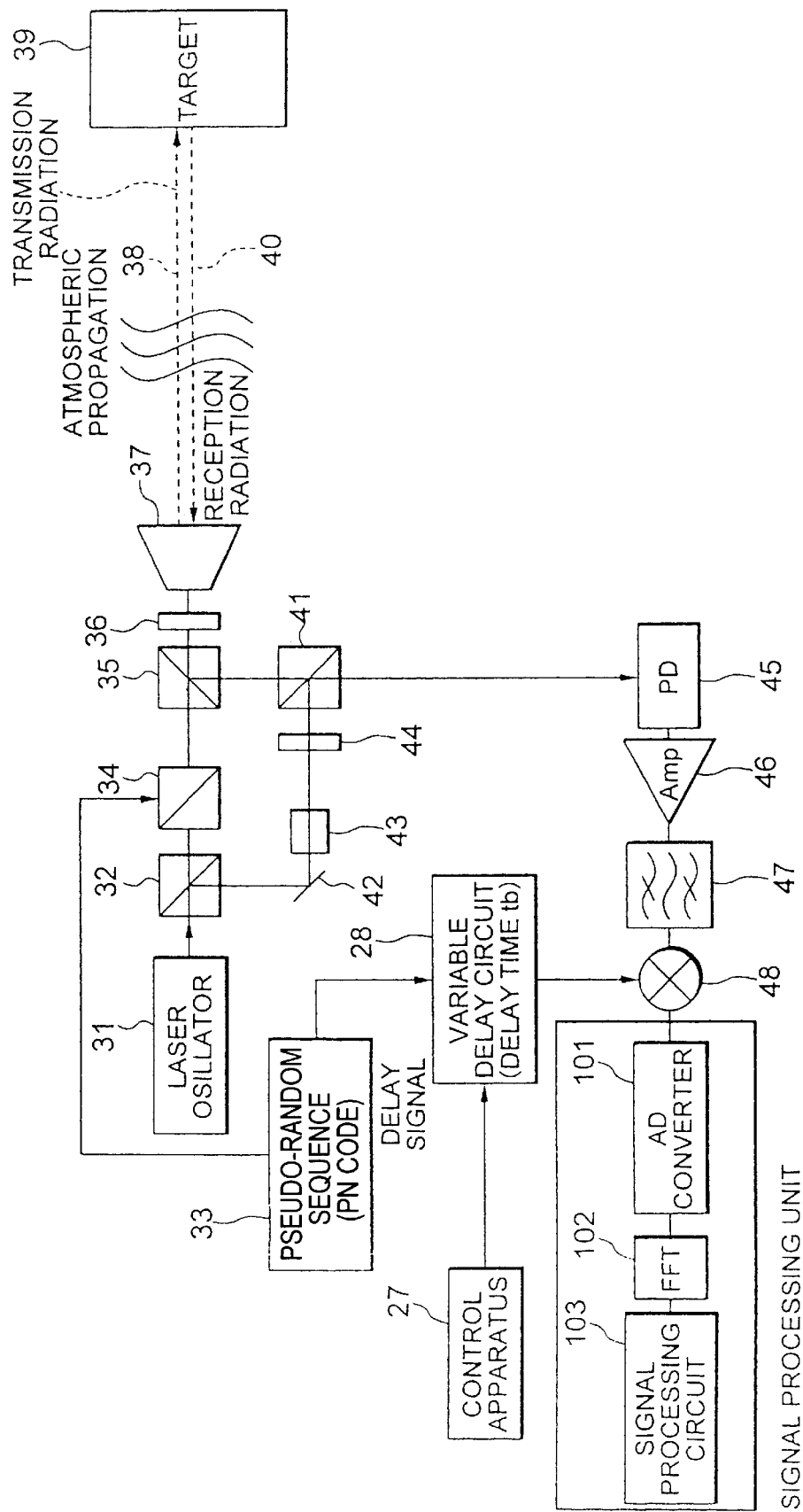
FIG. 33 indicates the conventional radar structural diagram in the case that the soft target is measured.
Figure 34:
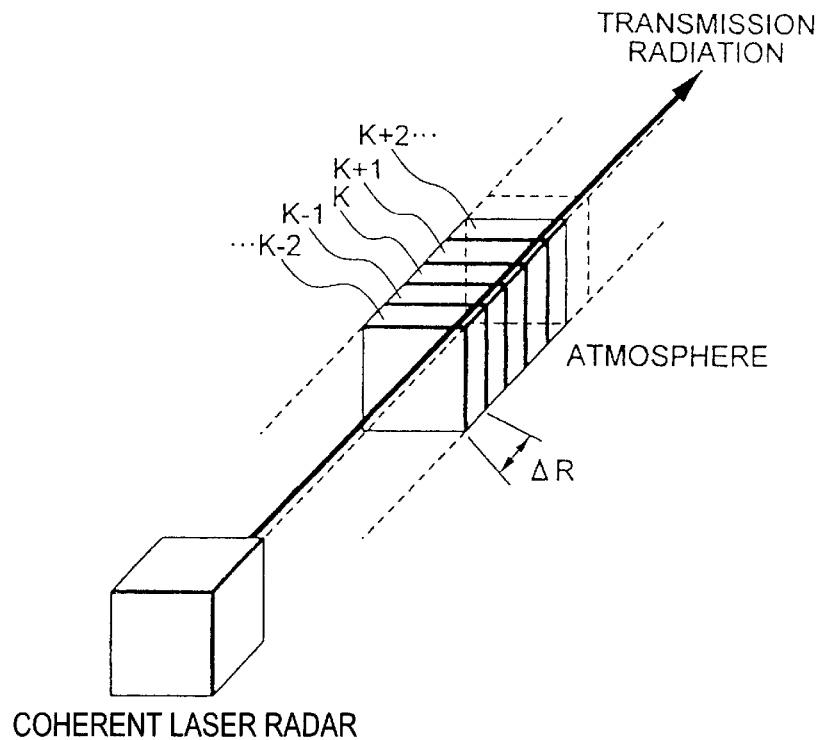
FIG. 34 is an explanatory diagram for explaining such a case that soft targets distributed in a space such as the atmosphere is measured by using the CW laser radiation.
Figure 35:
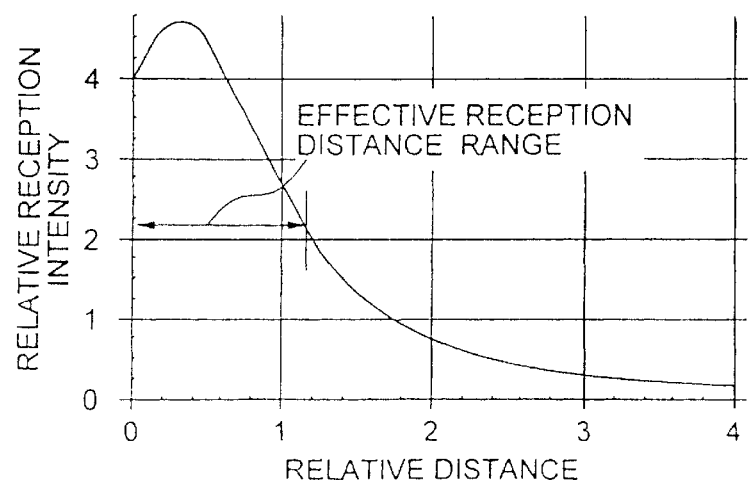
FIG. 35 is an explanatory diagram for explaining an example of the distance dependent characteristic of the reception intensity of the coherent CW laser radar apparatus, which is calculated by employing the formula (7)

FIG. 28 graphically shows a frequency spectrum of a reception signal in the case that a pseudo-random modulation signal formed by repeating the B sequence one time is employed.

The spread spectrum owns such a distribution that a frequency spectrum of a rectangular wave having a time width "τ" is used as an envelope line. A position of a peak owned by the spread spectrum is influenced by a sort of pseudo-random series used in a modulation signal. As a consequence, in the case that the same sequence is repeatedly employed, as indicated in FIG. 7, the intensity of spread spectrum cannot be sufficiently dropped. In the case that different pseudo-random sequence (PN code) are employed. Since positions of peaks are different from each other as to the respective different pseudo-random sequence (PN code), a summation is made of these different peaks so as to average these peaks, thereby reducing a maximum value of the speed spectra.

As previously explained, in accordance with the embodiment mode 8, the coherent CW laser apparatus employs such a means for continuously switching the modulation signals formed based upon a plurality of different pseudo-random sequence (PN code) to produce the switched modulation signal. As a result, the maximum of the spread spectrum can be reduced, as compared with a case where the same pseudo-random sequence (PN code) is repeatedly employed, so that the following effect can be achieved. That is, the peaks of the reception signals received from the distances where the correlation is made coincident, can be detected in high precision. Also, there is another effect that a total calculation amount performed in the FFT calculations can be reduced, since the pseudo-random modulation signal is formed by a series of modulation signals based upon a plurality of different pseudo-random sequence (PN code), and this pseudo-random modulation signal corresponds to the monitoring time per 1 measuring operation required to obtain a sufficiently large S/N ratio.

It should be understood that in the above-described embodiment mode 8, the time of the modulation signal per 1 bit is equal to each other. Alternatively, the timing generating means 71 may generate such a modulation signal whose time per 1 bit is made different from each other. When the time per 1 bit is made different from each other, the pseudo-random modulation signal using the same pseudo-random sequence (PN code) may be recognized as different pseudo-random modulation signals, because the peak positions of the spread spectra made by the reception signals received from the entire non-correlative distance within the distance band from which the effective received radiation intensity is obtained. As a consequence, even when the modulation signal with time per 1 bit that is different from each other is employed, a similar effect to the above-explained effect may be obtained.

As previously explained, in accordance with the present invention, since the optical paths among these optical elements are constituted by the optical fibers, there are such effects that the structural free degrees of the respective optical elements can be increased, and these optical elements can be readily assembled, and furthermore, the higher reliabilities of these optical elements can be realized.

Also, since the optical fiber amplifier is provided in the optical fiber constituting the optical path of the transmitted radiation, power of the transmitted radiation which is projected to the target can be amplified. As a consequence, there is such an advantage that the higher S/N ratio can be achieved in the coherent CW laser radar apparatus according to the present invention, as compared with that of the coherent CW laser radar apparatus having the conventional structure.

Also, the CW laser corresponds to the CW laser oscillating a laser radiation having the single wavelength, the oscillation wavelength of which is the 1.5 μm band, whereas the optical fiber amplifier corresponds to the optical fiber amplifier with employment of the $Er^{3+}$ ion-doped optical fiber having the gain in the 1.5 μm band. As a consequence, there is such an advantage that the higher S/N ratio can be achieved in the coherent CW laser radar apparatus according to the present invention, as compared with that of the coherent CW laser radar apparatus having the conventional structure.

Also, the CW laser corresponds to the CW laser oscillating a laser radiation having the single wavelength, the oscillation wavelength of which is any one of the 1.06 μm band, the 0.98 μm band, and the 1.3 μm band, whereas the optical fiber amplifier is the optical fiber amplifier with employment of the $Nd^{3+}$ ion-doped optical fiber having the gain in any one of the 1.06 μm band, 0.98 μm band, and 1.3 μm band. As a consequence, there is such an advantage that the higher S/N ratio can be achieved in the coherent CW laser radar apparatus according to the present invention, as compared with that of the coherent CW laser radar apparatus having the conventional structure.

Also, the CW laser corresponds to the CW laser oscillating a laser radiation having the single wavelength, the oscillation wavelength of which is the 1.3 μm band, whereas the optical fiber amplifier corresponds to the optical fiber amplifier with employment of the $Pr^{3+}$ ion-doped optical fiber having the gain in the 1.3 μm band. As a consequence, there is such an advantage that the higher S/N ratio can be achieved in the coherent CW laser radar apparatus according to the present invention, as compared with that of the coherent CW laser radar apparatus having the conventional structure.

Also, the CW laser corresponds to the CW laser oscillating a laser radiation having the single wavelength, the oscillation wavelength of which is the 1 μm band, whereas the optical fiber amplifier corresponds to the optical fiber amplifier with employment of the $Yb^{3+}$ ion-doped optical fiber having the gain in the 1 μm band. As a consequence, there is such an advantage that the higher S/N ratio can be achieved in the coherent CW laser radar apparatus according to the present invention, as compared with that of the coherent CW laser radar apparatus having the conventional structure.

Also, the CW laser corresponds to the CW laser oscillating a laser radiation having the single wavelength, the oscillation wavelength of which is the 2.1 μm band, whereas the optical fiber amplifier corresponds to the optical fiber amplifier with employment of the $Ho^{3+}$ ion-doped optical. fiber having the gain in the 2.1 μm band. As a consequence, there is such an advantage that the higher S/N ratio can be achieved in the coherent CW laser radar apparatus according to the present invention, as compared with that of the coherent CW laser radar apparatus having the conventional structure.

Also, the CW laser corresponds to the CW laser oscillating a laser radiation having the single wavelength, the oscillation wavelength of which is the 2.0 μm band, whereas the optical fiber amplifier corresponds to the optical fiber amplifier with employment of the $Tm^{3+}$ ion-doped optical fiber having the gain in the 2.0 μm band. As a consequence, there is such an advantage that the higher S/N ratio can be achieved in the coherent CW laser radar apparatus according to the present invention, as compared with that of the coherent CW laser radar apparatus having the conventional structure.

Also, the CW laser corresponds to the CW laser radiation source having the high spectrum purity, in which the line width of oscillated laser radiation is made narrower than the width of the frequency dispersion which is applied to the received radiation and is caused by the target. As a result, the monitoring time up to the inverse umber of the frequency dispersion can be prolonged, and power of the CW laser can be reduced. Therefore, there are such effects that the reliabilities of the CW laser and of the optical components can be increased, and also the S/N ratio can be improved.

Also, the CW laser radiation source having the high spectrum purity includes: the solid-state laser module oscillated having the single wavelength, which contains the means for fine-controlling all, or any one of the temperature, the resonator length, and pumping intensity; and phase noise compensating means for detecting phase noise of output radiation from the solid-state laser module by using the portion of the output radiation thereof, and for supplying the feedback signal used to fine-control all, or any one of the temperature, the resonator length, and the pumping intensity from the phase noise detection output to the solid-state laser module. As a consequence, it is possible to obtain the CW laser radiation source having the high spectrum purity whose line width is smaller than or equal to a predetermined value. As a result, such a highly-reliable coherent CW laser radar apparatus with the high S/N ratio can be obtained.

Also, the coherent laser radar apparatus is further comprised of: means for detecting the time change in the summation between the optical path length of the transmitted radiation and the optical path length of the received radiation, and also for detecting the time change in the difference between the optical path length of the local radiation and the optical path lengths of the transmission/received radiation; and means for controlling the optical path length of any one of the transmitted radiation, the received radiation, and the local radiation based upon the output signal derived from the means for detecting the time change in the difference of the optical path lengths. As a consequence, the following advantages can be obtained. That is, the time change in the difference between the optical path lengths can be suppressed, lowering of the S/N ratio can be avoided, and thus, such a highly reliable coherent CW laser radar apparatus with the high S/N ratio can be obtained.

Also, the means for detecting the time change in the difference of the optical path lengths is arbandd by: the fixed delay device for applying the constant time delay to the portion of the pseudo-random modulation signal generated from the pseudo-random modulation signal generator; the correlating device for multiplying the output signal of the photodetector by the time-delayed modulation signal derived from the fixed delay device; the microwave reference oscillator having the high spectrum purity; and means for detecting the phase difference between the output signal of the correlating device and the output signal of the microwave reference oscillator. As a consequence, the following advantages can be obtained. That is, lowering of the S/N ratio can be avoided, and thus, such a highly reliable coherent CW laser radar apparatus with the high S/N ratio can be obtained.

Also, the means for controlling the optical path length is arbandd by: the electro-optical crystal element positioned in the optical path; and means for applying the electric field to the electro-optical crystal element. As a result, the refractive index within the crystal can be changed by applying the electric field to this crystal, and also the optical path length of the laser radiation which passes through the crystal can be easily controlled by controlling the electric field.

Also, the respective structural elements of the coherent laser radar apparatus are set on the mobile object such as the aircraft, the satellite, and the vehicle. As a result, it is possible to accomplish such a compact and highly reliable coherent laser radar apparatus which is mounted on the mobile object.

Also, the pseudo-random signal generator generates the pseudo-random signal as the modulation signal in such the manner that the time width "τ" of the pseudo-random signal per 1 bit is set to ($\tau > 1/f_L$) in the case that the minimum frequency of the measuring frequency band to be measured is selected to be "$f_L$". As a result, the adverse influence given to the S/N ratio can be reduced by lowering the adverse influence caused by the internal reflection light.

Also, the coherent laser radar apparatus includes at least one set of such the combination between the fixed delay device and the mixer, instead of both the variable delay device and the correlating device; the fixed delay device applies the constant time delay to the portion of the pseudo-random modulation signal of the pseudo-random modulation signal generator; and the mixer multiplies the output signal derived from the photodetector by the output signal derived from the fixed delay device. As a consequence, the below-mentioned effects can be achieved: That is, the coherent CW laser radar apparatus with employment of the simple structure can be obtained, and furthermore, the data about the measuring distance band can be updated within a short time period.

Also, the coherent laser radar apparatus is further comprised of the optical space communication apparatus including: the optical switch provided in the reception optical path from the optical antenna, for switching the optical paths; the optical receiver for receiving received radiation of the optical communication from the optical switch via the optical circulator; the optical transmitter for outputting transmitted radiation for the optical communication via the optical circulator to the optical switch; and the communication signal processing apparatus for demodulating the optical communication received radiation received from the optical receiver so as to extract communication information therefrom, and also for producing the modulation signal based upon communication information to be transmitted so as to output the produced modulation signal to the optical transmitter; and wherein: the optical antenna functions as the optical antenna for the optical communication purpose by switching the optical path by the optical switch, whereby the function of the optical space communication is additionally provided with the coherent laser radar apparatus. As previously explained, since the function of the optical space communication is added to the entire system, both the function of the coherent CW laser radar apparatus and the function of the optical space communication apparatus can be achieved with employment of the simple structure. Therefore, there are merits that the overall system can be made simple and compact.

The coherent laser radar apparatus is further comprised of: the communication signal processing apparatus for demodulating the received optical communication received radiation so as to extract communication information therefrom, and also for producing the modulation signal based upon communication information to be transmitted so as to output the produced modulation signal; and wherein: the optical modulator modulates transmitted radiation for the optical communication by the modulation signal outputted from the communication signal processing apparatus; and the function of the optical space communication is added to the coherent laser radar apparatus by employing the function of the optical transmitter in which optical communication transmitted radiation is outputted by the CW laser and the optical modulator; the function as the optical communication optical antenna to the optical antenna; and the function as the optical receiver for receiving the optical communication received radiation to the photodetector. As previously explained, since the function of the optical space communication is added to the entire system, both the function of the coherent CW laser radar apparatus and the function of the optical space communication apparatus can be achieved with employment of the simple structure. Therefore, there are merits that the overall system can be made simple and compact.

Also, the coherent laser radar apparatus, according to another aspect of the present invention, is arbandd by comprising: as the optical component, the CW laser oscillating a laser radiation having the single wavelength; the dividing means for dividing laser radiation derived from the CW laser; the optical modulator for modulating one of the laser radiation divided by the dividing means; the optical antenna for projecting the modulated laser radiation as transmitted radiation toward the target, and also for receiving scattered radiation from the target as received radiation; combining means for combining the other of the laser radiation divided by the dividing means as local radiation with the received radiation received from the optical antenna; and the photodetector for optical-heterodyne-detecting the combined radiation; and also comprising: as the electric component, the pseudo-random modulation signal generator for supplying the pseudo-random modulation signal to the optical modulator; the time delay device for time-delaying the portion of the pseudo-random modulation signal generated from the pseudo-random modulation signal generator; the correlating device for multiplying the output signal of the photodetector by the pseudo-random modulation signal time-delayed by the time delay device; and signal processing means for acquiring physical information such as the distance of the target and the velocity of the target based upon the intensity and the frequency of the output signal from the correlating device, and also the delay time set by the time delay device; wherein: the pseudo-random modulation signal generator employs as the pseudo-random modulation signal, such the pseudo-random sequence (PN code) that time required for one sequence length is sufficiently longer than time required for light which is reciprocated within the distance band where received radiation having sufficiently high intensity can be obtained by the optical antenna. As a result, even when the soft target is measured, it is possible to suppress the adverse influence caused by the summation of the spread spectra of a plurality of non-correlative space layers, and also to perform the high precision measurement. Since the pseudo-random modulation signal having the longer one sequence length time is used, there is such a merit that the high S/N ratio can be obtained.

Also, the pseudo-random modulation signal generator generates the pseudo-random modulation signal in such a manner that the time required for the one sequence length is made 30 times longer than the time required for the light which is reciprocated within the distance band where the received radiation having the sufficiently high intensity can be obtained by the optical antenna. As a result, the following effect can be achieved. That is, the ratio of the peak value of the spectra of the reception signals which are received from the correlative space layer to the maximum intensity of the summation of the spread spectra of the plural non-correlative space layers can be made more than 10 dB.

Also, in accordance with the present invention, the pseudo-random modulation signal generator owns the function capable of switching pseudo-random modulating signals produced based on the plurality of pseudo-random sequence (PN code) different from each other to thereby produce the switched pseudo-random modulating signal. As a result, the peaks of the reception signals received from the distances where the correlation is made coincident can be detected in high precision, as compared with such a case that the same sequence is repeatedly employed.

Also, since the pseudo-random modulation signal generator includes means capable of varying the time interval of the timing signal used to generate the pseudo-random modulation signal, the time width per 1 bit is selected, and the pseudo-random modulation signal can be produced.

Furthermore, the pseudo-random modulation signal generator constitutes such pseudo-random modulation signal corresponding to monitoring time per one measuring operation by which the sufficiently high S/N ratio can be achieved, by the series of modulation signals produced based upon the plurality of pseudo-random sequence (PN code) different from each other, or modulation signals in which time intervals of timing signals are different from each other. Also, the pseudo-random modulation signal generator constitutes such the pseudo-random modulation signal corresponding to monitoring time per one measuring operation by which the sufficiently high S/N ratio can be achieved, by the series of modulation signals produced based upon the plurality of pseudo-random sequence (PN code) different from each other. As a result, there is such an effect that a total amount of the FFT calculating operations can be decreased.

What is claimed is:

1. A coherent laser radar apparatus comprising:
    as an optical component,
    a CW laser oscillating a laser radiation having a single wavelength;
    a dividing means for dividing laser radiation derived from said CW laser;
    an optical modulator for modulating one of said laser radiation divided by said dividing means;
    an optical antenna for projecting said modulated laser radiation as transmitted radiation toward a target, and also for receiving scattered radiation from the target as received radiation;
    combining means for combining the other of said laser radiation divided by said dividing means as local radiation with said received radiation; and
    a photodetector for optical-heterodyne-detecting said combined radiation and outputting a beat signal between said received radiation and said local radiation; and also comprising:
    as an electric component,
    a pseudo-random modulation signal generator for supplying a pseudo-random modulation signal to said optical modulator;
    a variable delay device for time-delaying a portion of the pseudo-random modulation signal generated from said pseudo-random modulation signal generator;
    a correlating device for multiplying the output signal of said photodetector by the pseudo-random modulation signal, time-delayed by said variable delay device; and
    signal processing means for acquiring physical information such as a distance of said target and a velocity of said target based upon a intensity and a frequency of the output signal from said correlating device, and also the delay time set by said variable delay device; wherein:
        an optical path between said optical components is constituted by an optical fiber.

2. A coherent laser radar apparatus as claimed in claim 1 wherein:
    an optical fiber amplifier having a gain in the vicinity of a wavelength of the modulated laser radiation is further provided in the optical path between said optical modulator and said optical antenna.

3. A coherent laser radar apparatus as claimed in claim 2 wherein:
    said CW laser corresponds to a CW laser oscillating a laser radiation having a single wavelength, the oscillation wavelength of which is a 1.5 $\mu$m band, whereas
    said optical fiber amplifier corresponds to an optical fiber amplifier with employment of an $Er^{3+}$ ion-doped optical fiber having a gain in the 1.5 $\mu$m band.

4. A coherent laser radar apparatus as claimed in claim 2 wherein:
    said CW laser corresponds to a CW laser oscillating a laser radiation having a single wavelength, the oscillation wavelength of which is any one of a 1.06 $\mu$m band, a 0.98 $\mu$m band, and a 1.3 $\mu$m band, whereas
    said optical fiber amplifier is an optical fiber amplifier with employment of an $Nd^{3+}$ ion-doped optical fiber having a gain in any one of the 1.06 $\mu$m band, 0.98 $\mu$m band, and 1.3 $\mu$m band.

5. A coherent laser radar apparatus as claimed in claim 2 wherein:
    said CW laser corresponds to a CW laser oscillating a laser radiation having a single wavelength, the oscillation wavelength of which is a 1.3 $\mu$m band, whereas
    said optical fiber amplifier corresponds to an optical fiber amplifier with employment of a $Pr^{3+}$ ion-doped optical fiber having a gain in the 1.3 $\mu$m band.

6. A coherent laser radar apparatus as claimed in claim 2 wherein:
    said CW laser corresponds to a CW laser oscillating a laser radiation having a single wavelength, the oscillation wavelength of which is a 1 $\mu$m band, whereas
    said optical fiber amplifier corresponds to an optical fiber amplifier with employment of a $Yb^{3+}$ ion-doped optical fiber having a gain in the 1 $\mu$m band.

7. A coherent laser radar apparatus as claimed in claim 2 wherein:
said CW laser corresponds to a CW laser oscillating a laser radiation having a single wavelength, the oscillation wavelength of which is a 2.1 μm band, whereas said optical fiber amplifier corresponds to an optical fiber amplifier with employment of an $Ho^{3+}$ ion-doped optical fiber having a gain in the 2.1 μm band.

8. A coherent laser radar apparatus as claimed in claim 2 wherein:
said CW laser corresponds to a CW laser oscillating a laser radiation having a single wavelength, the oscillation wavelength of which is a 2.0 μm band, whereas said optical fiber amplifier corresponds to an optical fiber amplifier with employment of an $Tm^{3+}$ ion-doped optical fiber having a gain in the 2.0 μm band.

9. A coherent laser radar apparatus as claimed in claim 1 wherein:
said CW laser corresponds to a CW laser radiation source having a high spectrum purity, in which a line width of oscillated laser radiation is made narrower than a width of a frequency dispersion which is applied to said received radiation and is caused by the target.

10. A coherent laser radar apparatus as claimed in claim 9 wherein:
said CW laser radiation source having the high spectrum purity includes:
a solid-state laser module oscillated having a single wavelength, which contains a means for fine-controlling all, or any one of a temperature, a resonator length, and pumping intensity; and
phase noise compensating means for detecting phase noise of output radiation from said solid-state laser module by using a portion of said output radiation thereof, and for supplying a feedback signal used to fine-control all, or any one of said temperature, said resonator length, and said pumping intensity from the phase noise detection output to said solid-state laser module.

11. A coherent laser radar apparatus as claimed in claim 1, further comprising:
means for detecting a time change in a difference between a summation of an optical path length of the transmitted radiation from the CW laser in the apparatus to the optical antenna and an optical path length of the received radiation from the optical antenna to the optical detector; and
means for controlling the optical path length of any one of said transmitted radiation, said received radiation, and said local radiation based upon the output signal derived from said means for detecting the time change in the difference of said optical path lengths.

12. A coherent laser radar apparatus as claimed in claim 11, wherein:
said means for detecting the time change in the difference of the optical path lengths is arranged by:
a fixed delay device for applying a constant time delay to a portion of the pseudo-random modulation signal generated from said pseudo-random modulation signal generator;
a correlating device for multiplying the output signal of said photodetector by the time-delayed modulation signal derived from said fixed delay device;
a microwave reference oscillator having a high spectrum purity; and
means for detecting a phase difference between the output signal of said correlating device and the output signal of said microwave reference oscillator.

13. A coherent laser radar apparatus as claimed in claim 11, wherein:
said means for controlling the optical path length is arranged by:
an electro-optical crystal element positioned in an optical path; and
means for applying an electric field to said electro-optical crystal element.

14. A coherent laser radar apparatus as claimed in claim 1 wherein:
the respective structural elements of said coherent laser radar apparatus are set on a mobile object such as an aircraft, a satellite, and a vehicle.

15. A coherent laser radar apparatus as claimed in claim 14 wherein:
said pseudo-random signal generator generates a pseudo-random signal as a modulation signal in such a manner that a time width "τ" of the pseudo-random signal per 1 bit is set to $(\tau>1/f_L)$ in the case that a minimum frequency of a measuring frequency band to be measured is selected to be "$f_L$."

16. A coherent laser radar apparatus as claimed in claim 14 wherein:
said coherent laser radar apparatus includes at least one set of such a combination between a fixed delay device and a correlating device, instead of both said variable delay device and said correlating device;
said fixed delay device applies a constant time delay to a portion of the pseudo-random modulation signal of said pseudo-random modulation signal generator; and
said correlating device multiples the output signal derived from said photodetector by the output signal derived from said fixed delay device.

17. A coherent laser radar apparatus as claimed in claim 1 wherein:
said coherent laser radar apparatus is further comprised of an optical space communication apparatus including:
an optical switch provided in a reception optical path from said optical antenna, for switching the optical paths;
an optical receiver for receiving received radiation of an optical communication from said optical switch via an optical circulator;
an optical transmitter for outputting transmitted radiation for the optical communication via said optical circulator to said optical switch; and
a communication signal processing apparatus for demodulating the optical communication received radiation received from said optical receiver so as to extract communication information therefrom, and also for producing a modulation signal based upon communication information to be transmitted so as to output said produced modulation signal to said optical transmitter; and wherein:
said optical antenna functions as an optical antenna for an optical communication purpose by switching the optical path by said optical switch, whereby a function of an optical space communication is additionally provided with said coherent laser radar apparatus.

18. A coherent laser radar apparatus as claimed in claim 1 wherein:
said coherent laser radar apparatus is further comprised of:
a communication signal processing apparatus for demodulating the received optical communication received radiation so as to extract communication information therefrom, and also for producing a modulation signal based upon communication information to be transmitted so as to output the produced modulation signal; and wherein:

said optical modulator modulates transmitted radiation for an optical communication by the modulation signal outputted from said communication signal processing apparatus; and a function of an optical space communication is added to said coherent laser radar apparatus by employing a function of an optical transmitter in which optical communication transmitted radiation is outputted by said CW laser and said optical modulator; a function as an optical communication optical antenna to said optical antenna; and a function as an optical receiver for receiving the optical communication received radiation to said photodetector.

19. A coherent laser radar apparatus comprising:

as an optical component, a CW laser oscillating a laser radiation with a single wavelength;

a dividing means for dividing laser radiation derived from said CW laser;

an optical modulator for modulating one of said laser radiation divided by said dividing means;

an optical antenna for projecting said modulated laser radiation as transmitted radiation toward a target, and also for receiving scattered radiation from the target as received radiation;

combining means for combining the other of said laser radiation divided by said dividing means as local radiation with said received radiation; and a photodector for optical-heterodyne-detecting said combined radiation and outputting a beat signal between said received radiation and said local radiation; and also comprising:

as an electric component, a pseudo-random modulation signal generator for supplying a pseudo-random modulation signal to said optical modulator;

a time delay device for time-delaying a portion of the pseudo-random modulation signal generated from said pseudo-random modulation signal generator;

a correlating device for multiplying the output signal of said photodetector by the pseudo-random modulation signal time-displayed by said time delay device; and signal processing means for acquiring physical information such as a distance of said target and a velocity of said target based upon a intensity and a frequency of the output signal from said correlating device, and also the delay time set by said time delay device; wherein:

said pseudo-random modulation signal generator employs as a pseudo-random modulation signal, such a pseudo-random sequence (PN code) that time required for one sequence length is sufficiently longer than time required for laser radiation which is reciprocated within a distance band where received radiation having sufficiently high intensity can be obtained by said optical antenna.

20. A coherent laser radar apparatus comprising:

as an optical component, a CW laser oscillating a laser radiation having a single wavelength;

a dividing means for dividing laser radiation derived from said CW laser;

an optical modulator for modulating one of said laser radiation divided by said dividing means;

an optical antenna for projecting said modulated laser radiation as transmitted radiation toward a target, and also for receiving scattered radiation from the target as received radiation;

combining means for combining the other of said laser radiation divided by said dividing means as local radiation with said received radiation; and a photodetector for optical-heterodyne-detecting said combined radiation and outputting a beat signal between said received radiation and said local radiation; and also comprising:

as an electric component, a pseudo-random modulation signal generator for supplying a pseudo-random modulation signal to said optical modulator;

a time delay device for time-delaying a portion of the pseudo-random modulation signal generated from said pseudo-random modulation signal generator;

a correlating device for multiplying the output signal of said photodetector by the pseudo-random modulation signal time-delayed by said time delay device; and signal processing means for acquiring physical information such as a distance of said target and a velocity of said target based upon a intensity and a frequency of the output signal from said correlating device, and also the delay time set by said time delay device; wherein:

said pseudo-random modulation signal generator owns a function capable of switching pseudo-random modulating signals produced based on a plurality of pseudo-random sequence (PN code) different from each other to thereby produce the switched pseudo-random modulating signal.

* * * * *